(12) United States Patent
Salimi Jazi

(10) Patent No.: US 11,909,740 B2
(45) Date of Patent: *Feb. 20, 2024

(54) AUTHORIZATION AND CONTENT MANAGEMENT IN AUTHORIZED PROFILES BASED ON ASSOCIATED STANDARDIZED HIERARCHICAL IDENTIFICATION

(71) Applicant: Farzad Salimi Jazi, San Jose, CA (US)

(72) Inventor: Farzad Salimi Jazi, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/827,616

(22) Filed: May 27, 2022

(65) Prior Publication Data

US 2022/0294798 A1 Sep. 15, 2022

Related U.S. Application Data

(63) Continuation-in-part of application No. 17/100,940, filed on Nov. 22, 2020, now Pat. No. 11,457,075.
(Continued)

(51) Int. Cl.
*H04L 9/40* (2022.01)
*H04L 67/303* (2022.01)
(Continued)

(52) U.S. Cl.
CPC ........ *H04L 63/102* (2013.01); *H04L 61/5007* (2022.05); *H04L 61/5053* (2022.05); *H04L 63/0876* (2013.01); *H04L 67/303* (2013.01)

(58) Field of Classification Search
CPC ....... H04L 67/303; H04L 63/10; H04L 67/16; H04L 61/2007; H04L 61/6004; H04L 63/102
See application file for complete search history.

(56) References Cited

U.S. PATENT DOCUMENTS 7,193,974 B2* 3/2007 Eatough ................ H04L 12/185
370/254
8,984,149 B1* 3/2015 Martini ................ H04L 43/065
709/228

(Continued)

OTHER PUBLICATIONS

Portions of prosecution history of U.S. Appl. No. 17/100,476, filed Aug. 7, 2022.

*Primary Examiner* — David R Lazaro
(74) *Attorney, Agent, or Firm* — Makoui Law, PC; Ali Makoui

(57) ABSTRACT

A method of accessing and managing content in a network based on unique standardized hierarchical identifications of products is provided. The method receives a notification that a first electronic device has completed an ownership event associated with a first product that includes a unique standardized hierarchical identification comprising a plurality of hierarchical sections. A first plurality of temporarily owned profiles is assigned to the first electronic device. Each profile in the first plurality of temporarily owned profiles is associated with one hierarchical section in the plurality of hierarchical sections of the first product. A temporarily owned profile associated with the lowest level in the first unique standardized hierarchical identification is associated with an item identification of the first product. Each profile associated with a hierarchical level of the first unique standardized hierarchical identification other than the lowest hierarchical level is associated with a hierarchical subsection of the network.

20 Claims, 36 Drawing Sheets

Related U.S. Application Data

(60) Provisional application No. 62/938,337, filed on Nov. 21, 2019.

(51) Int. Cl.
*H04L 61/5053* (2022.01)
*H04L 61/5007* (2022.01)

(56) References Cited

U.S. PATENT DOCUMENTS

| | | | |
|---|---|---|---|
| 11,457,075 B2* | 9/2022 | Salimi Jazi | H04L 67/303 |
| 2008/0133716 A1* | 6/2008 | Rao | H04L 67/306 |
| | | | 709/227 |
| 2014/0019542 A1* | 1/2014 | Rao | G06Q 30/0269 |
| | | | 709/204 |
| 2014/0181274 A1* | 6/2014 | Bazin | H04L 61/5014 |
| | | | 709/220 |
| 2014/0330833 A1* | 11/2014 | Miyazaki | H04L 67/10 |
| | | | 707/740 |
| 2018/0343317 A1* | 11/2018 | Lakunishok | H04L 43/04 |
| 2019/0347302 A1* | 11/2019 | Walters | G06F 16/9024 |
| 2020/0067819 A1* | 2/2020 | Basavaraj | H04L 45/026 |
| 2020/0382527 A1* | 12/2020 | Mitelman | G06N 20/20 |
| 2021/0160339 A1* | 5/2021 | Salimi Jazi | H04L 61/5007 |
| 2022/0294798 A1* | 9/2022 | Salimi Jazi | H04L 61/5007 |

* cited by examiner

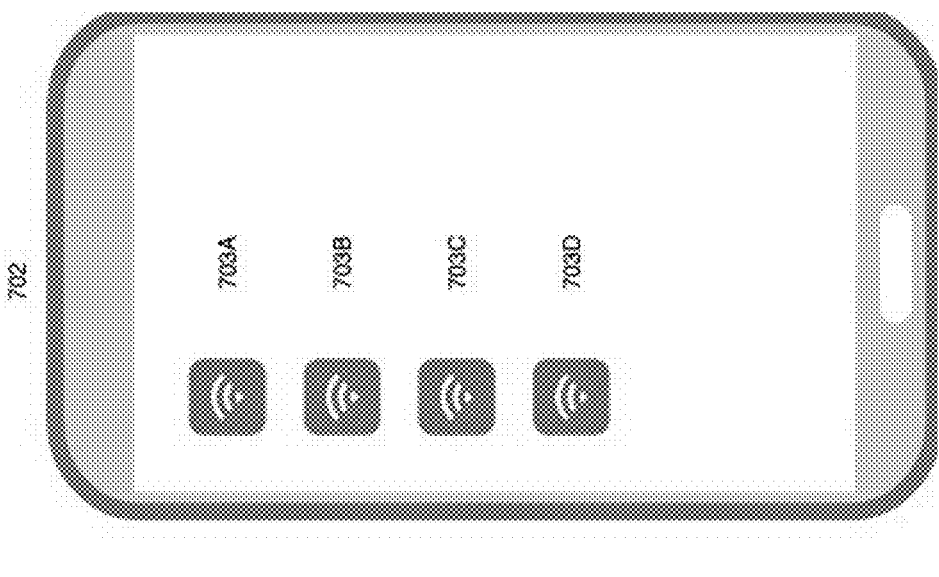
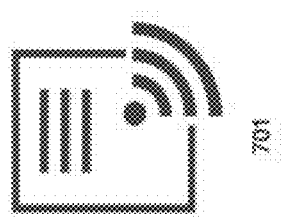
FIG. 7

FIG. 15

192.168.0.5 Profile Page — Managing as Adam

Adam left this (You) — Public
Lorem ipsum dolor sit amet, consectetur adipisicing elit, sed do eiusmod tempor incididunt ut labore et dolore magna aliqua.
[Edit] [Delete] — Today

Jenifer left this — Public
Lorem ipsum dolor sit amet, consectetur adipisicing elit, sed do eiusmod tempor incididunt ut labore et dolore magna aliqua.
Yesterday

Sara left this — Private
Lorem ipsum dolor sit amet, consectetur adipisicing elit, sed do eiusmod tempor incididunt ut labore et dolore magna aliqua.
Yesterday

Jane Left phone number — Private
Lorem ipsum dolor sit amet, consectetur adipisicing elit, sed do eiusmod tempor incididunt ut labore et dolore magna aliqua.
Last Week

Adam left this (You) — Public
Lorem ipsum dolor sit amet, consectetur adipisicing elit, sed do eiusmod tempor incididunt ut labore et dolore magna aliqua.
[Edit] [Delete] — Last month

Anonymous user — Public
Lorem ipsum dolor sit amet, consectetur adipisicing elit, sed do eiusmod tempor incididunt ut labore et dolore magna aliqua.
Last month

FIG. 22

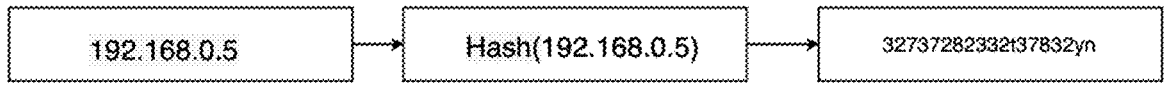
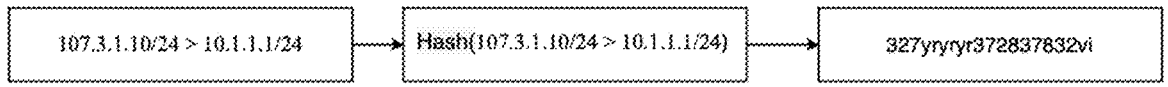
| Hash ID | Plain IP information | Profile Data pointer |
|---|---|---|
| 327372823323t37832yn | 192.168.0.5 | P1 |
| 327yryryr372837832vi | 107.3.1.10/24 > 10.1.1.1/24 | P2 |
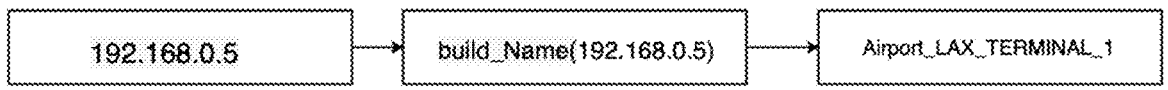
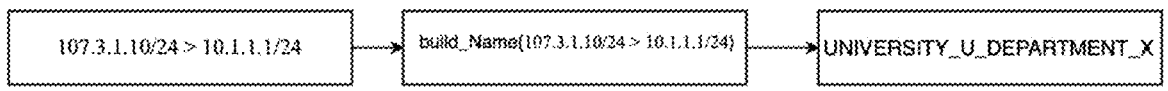
| Hash ID | Plain IP information | Profile Data pointer |
|---|---|---|
| Airport_LAX_TERMINAL_1 | 192.168.0.5 | P1 |
| UNIVERSITY_U_DEPARTMENT_X | 107.3.1.10/24 > 10.1.1.1/24 | P2 |
FIG. 27

AUTHORIZATION AND CONTENT MANAGEMENT IN AUTHORIZED PROFILES BASED ON ASSOCIATED STANDARDIZED HIERARCHICAL IDENTIFICATION

CLAIM OF BENEFIT TO PRIOR APPLICATIONS

This application is a continuation-in-part of U.S. patent application Ser. No. 17/100,940, filed on Nov. 22, 2020, published as U.S. Patent Publication No. 2021/0160339 on May 27, 2021. U.S. patent application Ser. No. 17/100,940 claims the benefit of U.S. Provisional Patent Application Ser. No. 62/938,337, filed on Nov. 21, 2019. The contents of U.S. patent application Ser. No. 17/100,940, published as U.S. Patent Publication No. 2021/0160339; and U.S. Provisional Patent Application No. 62/938,337 are hereby incorporated by reference.

BACKGROUND

Devices and apparatus such as computers, mobile devices, smartphones, and IoT (Internet of Things) devices with a network interface, need an identifier or a label associated with their network interface to operate and communicate in the computer network which uses Internet Protocol (IP) for communication.

A computer network is a set of connected devices, allowing sharing resources and exchanging data. An IP address is an identifier assigned to the network interface of a device in a computer network. An IP address assigned to a device or interface is unique within its operating network. A particular IP address may be assigned to only one device in its operating network. If multiple devices in a network receive the same IP address, it will result in an IP conflict, and the devices encountering the IP conflict will not be able to communicate in the network.

Any network interface may obtain one IP address at a time, and IP addresses assigned to network interfaces may be dynamic or static. A static IP address would remain static and stick to an interface as long as the network interface operates in the network. In contrast, dynamic IP addresses are released and reassigned dynamically and have an expiry.

Dynamic IP addresses are assigned to a network interface by a Dynamic Host Communication Protocol (DHCP) or similar protocols operating in a network. These dynamic IP assignments are a lease and expire. After expiration, the IP address is released or reassigned to another interface in the network. At any point in time, the network interface of a device needs an IP address to maintain connectivity and communication in its network.

Users of mobile devices, smartphones, mobile IoT devices, and laptops might move from one network to another network multiple times during the day. In this scenario, the device obtains different IP addresses across these networks to stay connected to the world wide web or the network. Network interfaces of portable devices may dynamically obtain different IP addresses with different expiration from time to time.

An IP address (IPv4 or IPv6) may be assigned to an interface for a specified period and released after the expiration. An IPv4 is a quadripartite dot-separated number, each part within 0-255 (i.e., 192.168.2.2). An IPv6 is a six-partite hexadecimal colon-separated number (i.e., 46:44:03:48:dd: e4).

An IP address may be assigned to, and released from, network interfaces during its lifetime in a network. An IP address, for example, 192.168.2.2, may be assigned to a device that enters the network on Sunday, September 22, at 10:10:00 PM and may be released or expired on Sunday, September 22, at 10:18:00 PM (either expired by the protocols that are responsible for reassigning of IP address or upon device A leaving the network). After releasing IP 192.168.2.2, device B may enter the network and may obtain the IP for another period.

There are organizations, tools, and multiple sources for providing information about an assigned IP because they obey a standard and are involved in IP assignments. The Internet Corporation for Assigned Names and Numbers (ICANN) is an organization responsible for coordinating the maintenance and procedures of several databases related to the namespaces and numerical spaces of the Internet. ICANN performs the technical maintenance work of the Central Internet Address pools and DNS root zone registries according to the Internet Assigned Numbers Authority (IANA) function contract.

The Internet Assigned Numbers Authority (IANA) is a standards organization that oversees global IP address allocation, autonomous system number allocation, root zone management in the Domain Name System (DNS), media types, and other Internet Protocol-related symbols and Internet numbers.

The IP address space is managed globally by the Internet Assigned Numbers Authority (IANA) and by five regional Internet registries (RIRs) responsible in their designated territories for assignment to local Internet registries, such as Internet service providers (ISPs) and other end users. IANA distributed IPv4 addresses to the RIRs in blocks of approximately 16.8 million addresses each.

WHOIS is a query and response protocol that is widely used for querying databases that store the registered users or assignees of an Internet resource, such as a domain name, an IP address block, or an autonomous system, but is also used for a broader range of other information. The protocol stores and delivers database content in a human-readable format.

BRIEF DESCRIPTION OF THE DRAWINGS

The various embodiments of the present novel and non-obvious method of authorization into profiles based on associated unique standardized hierarchical Identification and content management in authorized profiles as a communication and social networking platform now will be discussed in detail with an emphasis on highlighting the advantageous features. These drawings include the following figures, in which like numerals indicate like parts:

FIG. 7 illustrates the method and system to enlist the subnets available in the vicinity of a device, according to various aspects of the present disclosure;

FIG. 15 illustrates a sample output for Traceroute, a network tool used to determine the "path" packets take from one IP address to another, according to the prior art;

FIG. 22 is a schematic front view of a computing device that may include an application program for each IP profile to illustrate temporary ownership of the IP profile and passing ownership to different users when IP is given to different users, according to various aspects of the present disclosure;

FIG. 27 illustrates a sample approach to mapping IPs to human-friendly versions or hiding IPs from users for security or simplicity reasons, according to various aspects of the present disclosure;

DETAILED DESCRIPTION

Figure 1:
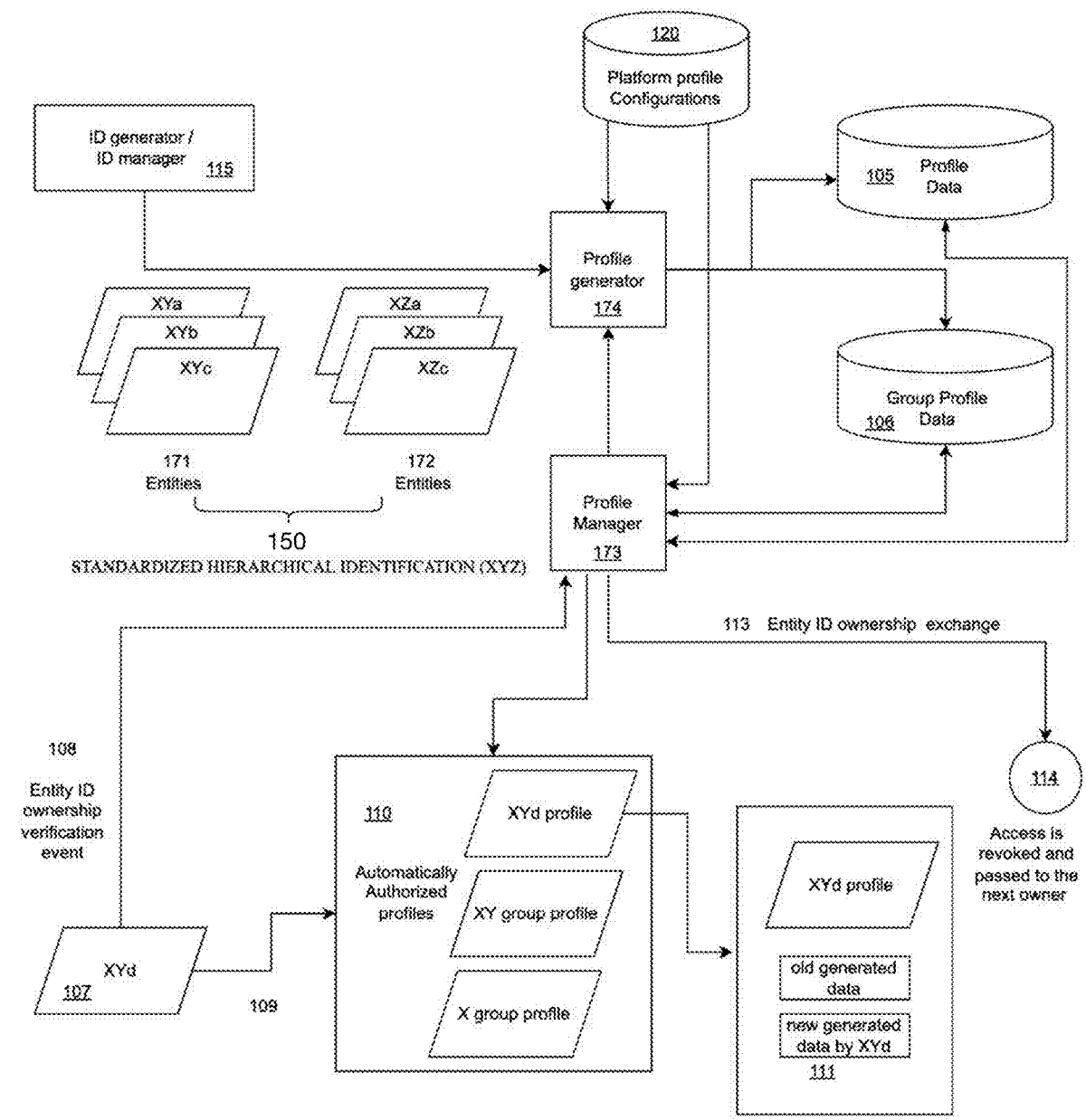
FIG. 1 illustrates a functional diagram of an example embodiment of a social networking platform generated based on entity identification numbers with automatic profile authorization, according to various aspects of the present disclosure.

One aspect of the present embodiments comes with the realization that the existing authentication, authorization, and content management methods have several shortcomings. The most common practice for content authorization and management in prior art is creating user accounts and account credentials, for example, by using username/email as account ID and a password and/or a multilevel authentication method, such as, sending verification codes as text messages, phone calls, or sending verification codes through email. Most of the existing applications, including social media platforms like Facebook and Instagram, ask users to create accounts and passwords on their platform and use these credentials to log in to their profiles anytime the users want to add or modify their content. When using account and credentials, there are three main concepts involved: sign in (log in), sign out (log out), and sessions.

Signing in is the moment a user provides credentials to verify the ownership. After signing in, the platform lets users manage their profile and contents for a specific time while a valid session exists. Platforms may implement sessions with different approaches. For example, the session may expire and automatically be signed out after 5 minutes of user inactivity or persist until the sign-out operation happens. Users may terminate the sessions anytime with a signing-out operation. Social media platforms usually include profiles for each user and possibly group profiles accessible by multiple users. Group profiles typically includes group-nature components like forums and chatrooms. The content management and authorization of these profiles are mainly based on the information provided during the creation of these accounts. Profile ownership is strictly connected to the accounts and credentials. Any user with the credentials is the profile owner as long as the account exists, and the user provides the right credentials. Defining a profile based on account and credentials results in specific characteristics for the prior art authentication, authorization, and content management methods.

The first characteristic of the prior art authentication, authorization, and content management methods is that the profile ownership is verified only if the correct credentials are provided, which means anyone with the credentials is declared as the profile owner and may access and manage the content in that profile. For example, users may share their credentials with their friends, and their friends may access the content and make changes even though that friend is not the profile owner. As described in detail below, in the present embodiments, profiles are not created by accounts and credentials. Instead, authorization to access profiles is based on a hierarchical identification (ID) value.

The second characteristic of the prior art authentication, authorization, and content management methods is that the user with account credentials permanently owns that profile. Therefore, all contents in that profile are assumed to be written by the account holder with the credentials. Passing the ownership of an account does not make sense in this situation. For example, when John Doe's profile is passed to Jane Doe, it is still about John Doe logically and only managed by Jane Doe on behalf of John Doe. Otherwise, it does not make sense in that social networking platform definition. As described in detail below, in the present embodiments, profiles do not belong to accounts with credentials but belong to the entities that verify their identification by an ownership event. Therefore, two different people may automatically take ownership of a particular profile at the different times and/or at difference places.

The third characteristic of the prior art authentication, authorization, and content management methods is that the user initiates the profile sign-in and sign-out process by directly or indirectly providing the credentials to the platform. For example, the user may manually enter a username and password using the login form. The user may set an application key and a secret key inside the application to generate tokens that are still indirectly provided by the user. Whether directly or indirectly, the user has to give the credentials at some point to verify the ownership of the profile because the profile's ownership verification is strictly connected to accounts and credentials. Since the profiles in the present embodiments do not belong to accounts with credentials, there is no need for providing account and credentials, such as, username passwords anymore. Since the profiles are generated based on hierarchical ID values, devices with specific IDs may be automatically authorized (sign in) or unauthorized (sign-out) to appropriate profiles.

The fourth characteristic of the prior art authentication, authorization, and content management methods is that the accounts belong to individuals or the representatives of organizations. For example, each person or company creates an account on social media platforms. As a result, a profile is created for that user and is added to a network of profiles. In other words, the network of profiles represents the network of individuals and organizations with accounts on that social media platform. Since the profiles in the present embodiments do not belong to accounts with credentials, the social networking platform does not represent individuals and organizations, instead, represents different ID profiles.

The fifth characteristic of the prior art authentication, authorization, and content management methods is that the group profiles belong to individuals or organization representatives. For example, each person or organization may create group profile pages and add other social media users to the group. The network of group profiles, therefore, represents the network of virtual communities created by social media platform users. In this case, users create these groups and specify members. Since the profiles in the present embodiments do not belong to accounts with credentials, group ID profiles are not group of account holders either. Therefore, in the social networking of the present embodiments, group ID profiles are not representing a virtual community created by users with accounts. Instead, the social networking of the present embodiments represents the group of entities or devices with the same section values in their standardized hierarchical IDs.

The sixth characteristic of the prior art authentication, authorization, and content management methods is that the profiles represent individuals and organizations. The profile connections and group profiles, therefore, represent relationships between people and organizations in the real world. Since the profiles in the present embodiments do not belong to accounts with credentials, profile connections are not based on relationships between people and organizations in the real world that users make because the profile connections are based on section values in their standardized hierarchical IDs.

The seventh of the prior art authentication, authorization, and content management methods characteristic is that the accounts are bound to the platforms. The users have to create an account on any platform they wish to use. For example, a user with a Snapshot account cannot use that account on Facebook and vice versa. The user profile on Facebook is connected to Facebook credentials, and the user profile on Snapshot is connected to Snapshot's account. Since the profiles in the present embodiments do not belong to accounts with credentials, there is no need for creating accounts to access the profiles. Instead, devices are automatically part of the appropriate profiles based on the section values in their hierarchical IDs.

The eighth characteristic of the prior art authentication, authorization, and content management methods is that the profiles represent individuals and organizations with an account ID belonging to a specific user, therefore, any activity in that social networking platform may be correlated to a specific user. Some platforms let users do activity anonymously or as a guest. Still, the actions that have been done in this way are entirely anonymous and not connected to the creator's profile anymore. Contents generated in incognito mode are bound to no profile in social networking platforms and are mostly not separable. Since the profiles in the present embodiments do not belong to accounts with credentials, there is no need for creating accounts to access the right profiles using an account ID. Therefore, in the present embodiments, profiles and individuals' identities are independent because profiles are bound to hierarchical ID values. As a result, using profiles as intended does not reveal any correlation to a specific user as a side effect.

The ninth characteristic of the prior art authentication, authorization, and content management methods is that two users on the platform must use their accounts to communicate. First, they both must have an account on the same platform. Second, they must be logged in to their accounts. Third, they must be connected on the platform or somehow find each other using the platform. Since the profiles in the present embodiments do not belong to accounts with credentials, there is no need for logging into the accounts to access the appropriate profiles. Instead, because profiles are bound to hierarchical ID values, devices are automatically authorized to the right profiles and ready to communicate.

There are many situations where the prior art authentication or access management mechanisms, with the above-mentioned characteristics, are inconvenient, repetitive, unnecessary, not enough, and sometimes an obstacle and wrong. Sometimes the ownership verification of the account is not essential or not enough to satisfy the social networking platform mission. Several examples of some of these shortcomings and the solutions provided by the present embodiments are described below.

The first example is when the verification of augmented content to profile is essential. For example, Facebook and most social media platforms' mission is to connect people and organizations and create virtual communities representing real-world communities. Assume brand X (Organization section ID in Product ID: Y) owns a page on Facebook and lists many products, including products P1 (Product ID number: XP1) and P2 (Product ID: YP1), on its Facebook profile page. Assume P1 is the product of brand X, and P2 is the product of brand Y (Organization section ID in Product ID: Y). User U decides to write a review for product P1. In this scenario, there are some issues because users are authorized based on users' accounts. First, any user who may see the brand X page and the listed products may write a review for any product listed, whether the user is qualified to write the review or not. Second, brand X may list any product in the profile with the desired description, whether or not they are the producer of the product.

The present embodiments, as described in detail below, solve the problems in the above-mentioned scenario by generating a social networking platform based on product identification numbers and doing automatic authorization based on product identification hierarchical section values. In generated social networking platform, each product ID (XPa) is key to access to a profile dedicated to owners of a particular item of a particular product of a particular company (XP1, YP2 profiles in above example). Also, the IP address is the key to access to a group dedicated to the group of profile owners of a specific product of the particular company profile (XP, YP group profiles in above example representing all items of product P from brand X and brand Y). Also, the IP address is the key to access to a group dedicated to the group of profile owners of the particular company profile (X, Y group profiles in above example representing brand X, and Y). Only an ownership exchange event like scanning a product ID or purchasing transaction at the point of sale can pass the ownership and transfer the access from a device to another one, So the only users who scan the product ID (XP1) or execute a purchase or rent transaction for product ID are authorized for the brand X profile page and the listed product's profile pages (XP1, YP2 profiles) and can write a review only for the product they are authorized. So only devices that scanned a product ID or purchased or rented the product can write a review about the product, which is ideal. Second, brand X only contains profiles for their own product with the right descriptions fetched from Product ID information metadata that exists online since product IDs from different brands like Y start with Y instead of X so they are authorized to add content to very different profiles (YP2 profile, YP and Y group profile).

The second example is when the verification of presence is essential. For example, users U, V, and W may have an account on Facebook and have the proper credentials. They may log in to their accounts anytime and anywhere and start accessing their profiles and writing anything. User U is currently at home, and user V and W are at a nightclub. In this scenario, there are several issues as a result of the users being authorized based on their accounts. First, the user U may write a Facebook post and claim to be in the nightclub even if it is not true. Second, user V may correctly claim to be in the nightclub but may change the location at a later time. The user uses the same Facebook account regardless of location. Unless, the account holders may inform their connections about changing their presence status, there is no way of knowing the change by other users based on the user account itself. Third, some platforms may use a location service to update locations automatically and constantly, which comes with some drawbacks. First is privacy, since the account are connected to people's identities. Second, knowing the location does not necessarily verify the user's presence. For example, a user might be in a nightclub's neighborhood but not part of the community inside the nightclub.

The present embodiments, as described in detail below, solve the problems in the above-mentioned example by generating a social networking platform based on the IP addresses assigned to devices after connecting the device to the nightclub Wi-Fi and doing automatic authorization based on device's IP address hierarchy section values. In the generated social networking platform of the present embodiments, each IP address is the key to access to a profile (the IP's profile) dedicated to owners of a particular IP address of a particular subnet of another larger subnet. Also, the IP address is the key to access to a subnet profile dedicated to the group of IP profile owners of a particular subnet of a larger subnet (local subnet group profile). Also, the IP address is the key to access to a subnet profile dedicated to the group of IP profile owners of the larger subnet in the hierarchy.

In the present embodiments, only an ownership exchange event like disconnecting from the nightclub Wi-Fi, or the local network, and releasing the IP address may pass the ownership and transfer the access to that particular IP profile from one device to another device that receives that IP address in future. First, the users like U may write content to night club's IP address and local subnet profiles only if their device is part of the night club's local network and writing content in those profiles itself is an approval to the claim of being in the nightclub. Second, the moment the user V leaves the nightclub, the nightclub's Wi-Fi automatically releases the IP address, and as a result, the user V loses access to the IP address and nightclub's subnet profiles. Therefore, there is no need for the user to update their status or they do not need any location service to automatically update it for them. In the present embodiments, a user uses different profiles depending on the local network and the device IP address. Therefore, the device may communicate using a newly assigned set of profiles based on its new IP address with possibly new devices in the newly assigned profiles. A device joining different profiles based on its IP address, by itself informs about the changes in the user presence. Third, privacy is not a concern anymore, since the profiles are not connected to people's identities but to the device's IP addresses. Identity may be exchanged or revealed by user demand. Furthermore, the use of the nightclub's Wi-Fi by a device, verifies the user's presence in nightclub with high accuracy.

The third example is when there is zero knowledge of the present community looking to communicate. For example, users A and B are members of the Tinder dating application with the proper credentials, user C is part of the Zoosk dating application, and user D is not part of any dating application but is a member of Facebook and has the proper credentials. User A is currently at home, user B and C are at a nightclub, and user D is in the restaurant. In this scenario, there are some issues because users are authorized based on their accounts. First, users use various applications with different accounts (user A uses Tinder, C Zoosk, and D Facebook). Second, since users have zero knowledge of other users, they don't know of applications used by other people (user A does not know about applications on user B's mobile device). Third, even if all users use the same platform, they must log in to their accounts, and their profile must be connected on that platform, or they may have to find each other's profile on the platform first to start communicating with each other.

The present embodiments, as described in detail below, solve the problems in the above-mentioned example by generating a social networking platform based on the IP addresses assigned to devices after connecting the devices to the nightclub's Wi-Fi and doing automatic authorization based on device's IP address hierarchical section values. In generated social networking platform, each IP is the key to access to a profile dedicated to owners of a particular IP (IP profiles) of a particular subnet of another particular bigger subnet and also a subnet profile dedicated to the group of IP profile owners of the particular subnet of a bigger particular subnet and subnet profile dedicated to the group of IP profile owners of the bigger subnet in the hierarchy. Only an ownership exchange event like disconnecting from nightclub Wi-Fi or local network and releasing the IP address may pass the ownership and transfer the access to that particular IP profile from one device to another device that may get the same IP address later. First, users only need to connect to the Wi-Fi no matter what applications are used by which device. Second, zero knowledge of other users is no concern here. The users only need to connect to the Wi-Fi or be in the same local network. Third, each device that connects to the Wi-Fi or local network receives the authorized IP profiles, and other devices are also accepting the authorized IP profiles based on their IP addresses. Because all IP addresses in the night club share identical subnet IDs, they are part of the same subnet profiles, and are automatically placed on the same subnet profiles and ready to communicate. There is no need to choose a platform and create an account or use credentials to sign in to a profile and find the right profiles.

The fourth example is when generated contents are unrelated to the user but are related to entities. Also, relationships are between entities and not between he users. For example, the issues and problems mentioned in the scenario described above in the first example are because when using a social networking site, such as Facebook, brand pages are still people's accounts, and brands are connected to other people's accounts. Accounts write product reviews on another account's profiles (Brand X profile belong to an account and credentials). The Brand X page is a group of accounts (people's accounts with credentials) that members are added by the Brand X page owner or themselves by connecting to it based on their favorites and interest.

As described in detail below, the present embodiments solve the problems in the above-mentioned example because, in the present embodiments, brands are connected to products. The same products would have the same group profile since their ID shares some section value. Product reviews are about products and brands because, in the present embodiment, profiles are assigned based on ownership of a product ID. Only those who had something to do with the products (e.g., owned, possessed, scanned, or purchased) would be authorized to add content, including the reviews. Therefore, all contents are about the products and provided by the right users. Also, since in the present embodiment all products produced by the same organization have at least a one section with same value in their ID (Organization ID), products made by the same brand may also be considered as a virtual community (group profile XY, or X). Another example is the issues and problems mentioned in the scenario described in the second and third examples above because when using applications authorizing profiles based on account and credentials in prior art, a virtual community (group of users) is created by people's accounts and includes other accounts added by the group owner or members themselves but in present embodiment devices in a hierarchical network like the Internet, in which devices connected to the same network also automatically may be seen as a virtual community and group profiles may be generated for them. Devices in the generated group are precisely the community of devices we are looking to communicate at the nightclub. In other words, the profiles and generated content are based on relationships other than those between the users (account holders), in contrast with platforms like Facebook.

The remaining detailed description describes the present embodiments with reference to the drawings. In the drawings, reference numbers label elements of the present embodiments, and these reference numbers are reproduced below in connection with the discussion of the corresponding drawing features.

Existing social networking platforms are social networking platform of people and people's relationships in real-world connect profiles. In contrast, the present embodiments create social networking platforms of devices, products or locations, and other entities instead of people. In the present embodiments, entities initiate account creations. Entities are the owners of the profiles, not the users of them. The entities begin the group or individual profile creation, so entities are part of group profiles, not the users in the social networking embodiment. Generated contents in profiles are connected to the entities, not to the individuals. Finally, entities have to authorize themselves into the profiles, not individuals. These unique characteristics of present embodiments create a particular setup to define different types of profiles (device profile, product profile, location profile), different types of virtual communities (device communities, product communities, location communities, etc.), and user-generated data (device generated data, location generated data, Product generated, etc.).

FIG. 1 illustrates a functional diagram of an example embodiment of a social networking platform generated based on entity identification numbers with automatic profile authorization, according to various aspects of the present disclosure. With reference to FIG. 1, the standardized hierarchical identification 150 may be a distinguishable identification representing entities (171, 172). The standardized hierarchical identification 150, such as Product ID or barcode ID, may be generated and assigned by an organization. The standardized hierarchical identification 150 may also be generated by an identification generator (or identification manager) 115, including hardware and/or software to generate the unique, distinguishable standardized hierarchical identifications such as the IP address generated and assigned by DHCP.

The identifications may include multiple sections. For example, in Identification XYZ, the X part may specify the organization ID, the Y part may specify the product ID, and the Z part may identify the specific item of the particular product. The social network platform may be generated based on this identification with the profile generator 174 and controlled by the profile manager 173. The profiles and group profiles data are stored in the profile data storage 105 and the group profile data storage 106. Data include profile configuration, initial profile data, and user-generated data accumulated by profile owners.

With further reference to FIG. 1, identification ownership event 108 may occur for the item 107 with ID: XYd. The identification ownership event 108 may be IP address assignment operation (by DHCP, router, or ISP), a scan operation of a product ID barcode, a purchase transaction, rent transaction by point of sale or company, moving device close enough to specific geocoordinate. When an identification ownership event occurs, a valid session may be created for the device executing the event. After the session starts, the device owner is authorized to access multiple profiles 110.

With continued reference to FIG. 1, the device may be automatically authorized to XYd profile, XY, and X group profiles. A device with the identification 107 may add new content to the profiles (111) and view all contents generated by previous owners. The device with the identification 107 may view contents by other profile owners in the same group profiles. For example, XYa, XYb, XYc, and XYd are all authorized to both X and XY group profiles. The current owner of the profile or the social networking platform profile configurations (120) may decide what content to be visible to others and by whom and how to show it. For example, the profile owner or the social networking platform configuration (120) may choose only to show currents generated in the latest active session and hide the rest to others or filter profile content and only show part of profile content by previous owners for different purposes. The social networking platform may invalidate the session after t minutes or keep it alive by periodic 'heartbeat' requests, continuously executing ownership verification events, and extending the session period. The profile manager may revoke the access and passes ownership to the new device running the XYd ownership event. For example, when a device reconnects to the network with a different IP address, all access to the previous profiles is revoked. New profiles are assigned to the device according to the new IP address.

Another example is when a product barcode is scanned by a device, access to the previous profiles is revoked, and new profiles are assigned to the device according to the latest barcode ID. As another example, when a device moves from coordinate A to coordinate B, access to the previous profiles based on A is revoked, and new profiles are assigned to the device according to coordinate B. These embodiments are described in the following sections in more detail.

In the first section, the embodiments depict the novel and non-obvious method of authorization into profiles based on related Internet protocol addresses associated with the device shown in the accompanying drawings, which are for illustrative purposes only.

In the second section, the embodiments depict the novel and non-obvious method of authorization into profiles based on related standardized public identification associated with products and content management in authorized profiles as a communication and social networking platform shown in the accompanying drawings, which are for illustrative purposes only.

In the third section, the embodiments depict the novel and non-obvious method of authorization into profiles based on related geolocation data associated with device and content management in authorized profiles as a communication and social networking platform shown in the accompanying drawings which are for illustrative purposes only.

In the fourth section, the embodiments depict content types and formats in generated profiles and the method of structuring profile contents to utilize the generated social networking platform based on identifications for various applications such as dating, product review or customer service, recruiting, entertainment, crowdsourcing or advertisement platforms.

In the fifth section, a short overview of embodiments depicts the novel and non-obvious methods of authorization into profiles based on other types of standardized hierarchical identification such as phone numbers or zip codes with the similar mechanism described in previous sections.

In the sixth section, an example of a computer system of some embodiments is provided.

I. Method of Authorization into Profiles Based on Related Internet Protocol Addresses Associated with Device Some embodiments use a hierarchical unique standardized identification assigned to the device using Internet protocol to automatically sign into a network of profiles once the device is connected to the internet. The embodiments using the Internet Protocol address (IP address) to auto sign-On (authorization) and the content management method associated with IP profiles are presented as a communication and social networking embodiment. Some embodiments may use other parameters assigned to the device once connected to the Internet using Internet protocol and may refer to this unique hierarchical identification assigned to the device as IP or IP address, which is used to transfer data from one device to another connected to the Internet.

Class Inter-Domain Routing (CIDR) has been a method for allocating IP addresses and routing. A network may be broken down into subnetworks, namely subnets, and each subnet has defined to use a subset of the IP allocation pool determined with two groups of bits in the IP address. The significant bits identify the subnetwork, whereas the least significant bits identify the host or the network interface. The routing between networks is feasible with this classification. An IP address subnet and host may be recognized based on the CIDR mask and routed accordingly in CIDR.

The present embodiments provide a method and a system to profile a subnet as a group, and all the hosts in the subnet are authenticated and authorized to their subnet profile. Each user obtaining an IP from a subnet may operate and route internally within a subnet. The network interface obtaining an IP address may authenticate and log in to the IP profile obtained and also to the subnet profile or gateway profile of its network. A subnet profile has all the functionalities and attributes of an IP profile, but it also has group-level attributes and functionalities. A subnet profile has a messaging mechanism to enable messaging, broadcasting, and multicasting among its IP profiles. IP profiles within a subnet may also choose to be invisible or transparent and assign their IP profiles a persona Identity. Whenever a network interface joins a subnet, it may log in to the IP profile, and it is recognized as part of the Subnet profile of its underlying subnet. The subnet profile also contains group functionalities such as group alerts, group offerings, one-to-one, one-to-many messaging mechanisms, group promotions, visibility in group settings, and group Identity features.

When a network interface leaves a subnet, it releases the IP address to the subnet. Still, it may leave a trace of its identity or share its identity or visibility to the subnet's IP profiles before leaving and maintaining connectivity to them. The embodiment provides a method to connect real Identity Profiles to these IP profiles and real Identity profiles to subnet profiles as an option to enable and disable visibility.

If a network interface A chooses to be visible in its subnet and share its real Identity profile with network interface B, a connectivity and profile connection between their real Identity profile may be established and maintained even when both A and B leave their IP profiles or log out of the IP profiles.

The Gateway profile of the present embodiments may have a subnet mask, which is a mask that distinguishes the host IPs within the subnet. It has the number of active hosts expiry of each. It has a group or subnet profile content visible to all the host members of the subnet, and it may also contain messages that may be visible to all the host members. The Subnet profile inherits all the attributes and features of an IP profile, and it also has some more functionalities and attributes. A subnet profile provided in the present embodiments also has the number of assigned IPs, the information about who or where this subnet may belong, and a subscription attribute that holds subscription of the Subnet profile to channels, promotions, localities and may receive content from outside and push the content via multicasting within itself.

The present embodiments provide a system and method to multicast the subscription-based content and make this content visible to all active hosts of the subnet at a given time. A method to utilize the Subnet profiles and IP profiles are presented in the present embodiments.

Some embodiment includes creating IP-based profiles and single sign-on methods to access these profiles. Devices connected to networks obtain an IP address from the connected network to maintain their connection. This IP address is assigned to one device at a time, and they cannot serve multiple machines with the same IP address. This embodiment includes a profile associated with any IP address. IP address X has a profile associated with it, and any device that obtains IP address X in its connectivity lifetime may access the content of the IP address profile. Only the device that currently holds IP address X may have access to the contents of IP profile X. These contents are IP locality promotions, IP address-based contents, messages, profile attributes, and an augmentation functionality that allows the existing signed-in device to add/augment the contents of the current profile.

Any IP address may belong to a bigger subnet, a range of IPs recognized together with a subnet mask. This embodiment includes creating and assigning a profile to subnets. The embodiment suggests creating data storage of the content and attributes of the subnet profiles. IPs that fall into a subnet may have access to the subnet profile contents of their subnet. Subnet profiles store information about the locality of the subnet, market promotions, group functionalities to broadcast, and multicast to their internal IP address profile contents and subnet-related attributes. They also may have information about the size of the subnet, the number of IP profiles that exist in the subnet, obtained IP addresses of the subnet, and subscription channels that may push contents to profiles. IP address profiles may request subnet profiles to receive, multicast, and unicast the contents into them.

A simple mechanism to implement the IP profiles is maintaining a database table/collection for IP profiles that have association information about the IP profile, associated IP address, the number of times an IP address is obtained, the subnet information of the IP address, time constraints, current status (active if any device has obtained the IP address and inactive if no device has currently obtained the IP address) and contents associated with IP profiles. Another table/collection to maintain the subnet profiles, and all attributes of a subnet profile and an association to the content and IP addresses and IP profile table/collection.

A simple view of the contents as a mobile or smart application program may reside on devices. Whenever a device obtains an IP, it may open the application and have access to the content of the IP profile with an auto-sign-on match of the IP address obtained with the IP profile database. The smart application that resides on devices sends a request to IP profile/subnet Profile servers, and it retrieves the contents, authenticates itself, and plots a view of the content to the device user.

Figure 2A:
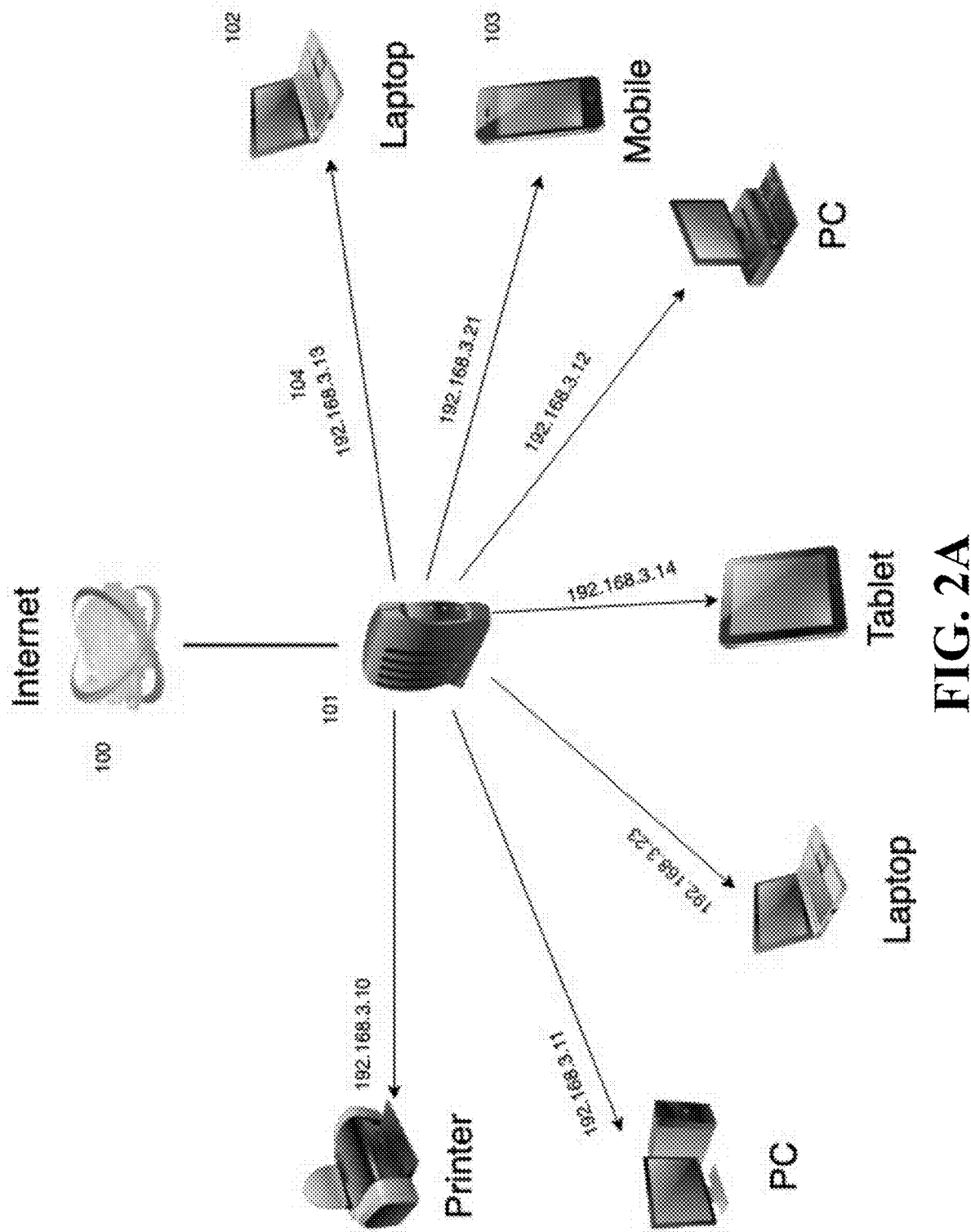
FIG. 2A is a simple representation of communication and connectivity on the internet (World Wide Web), according to the prior art.

FIG. 2A (100) is a simple representation of communication and connectivity on the Internet (World Wide Web). Devices 102 laptops and 103 mobile devices are connected to a router (101), assigning them an IP address (104) to any network member who requests to join the network.

Figure 2B:
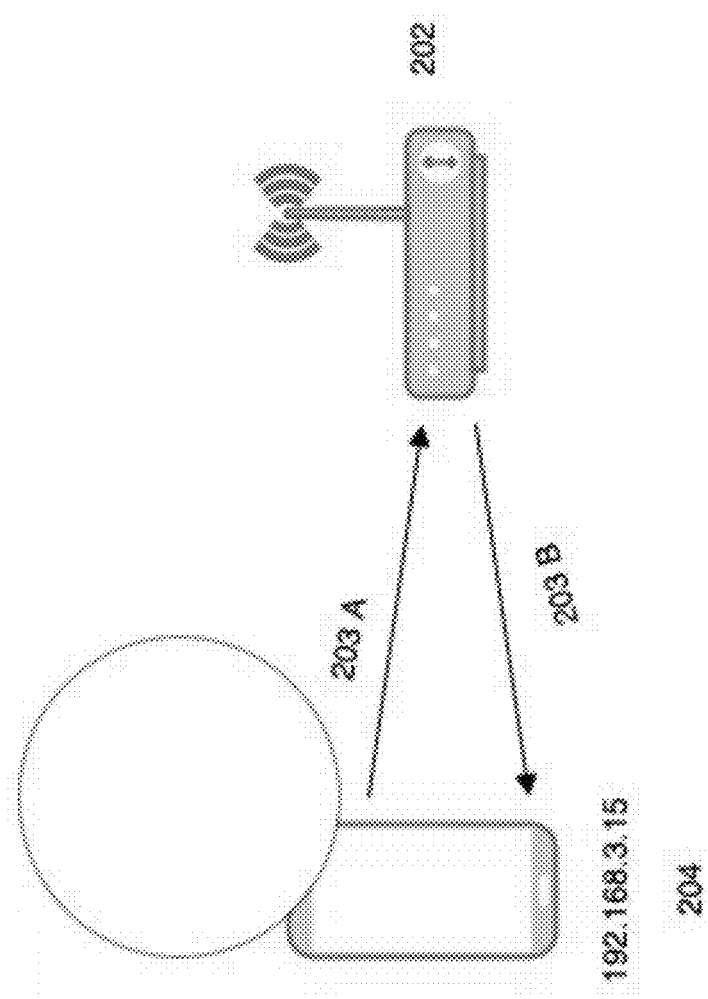
FIG. 2B represents the IP address request and assignment in a network, according to the prior art.

FIG. 2B represents the IP address request and assignment in a network. A device/network interface (201) submits a request (203A) to the network router/hub/gateway (202) to join the network. The router (202) validates the request, and if approved, it assigns (203) an IP address (204) to the network interface of device (201).

Figure 3:
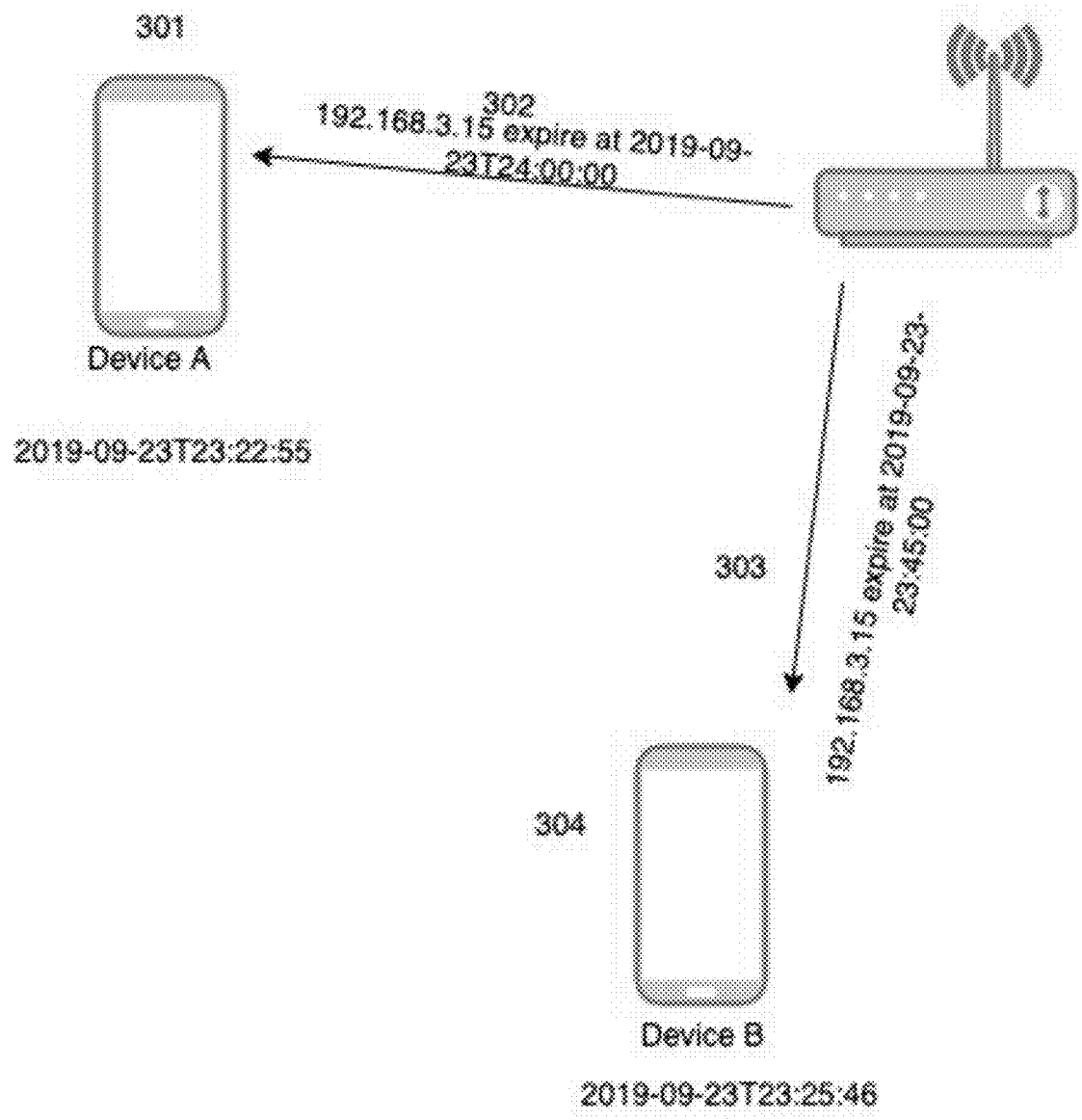
FIG. 3 represents the temporary assignments of IP addresses in a network, according to the prior art.

FIG. 3 represents the temporary assignments of IP addresses in a network. An IP address may be assigned to a network interface within the expiration date. In FIG. 3, the network interface of device A (301) requests to enter the network on Monday, September 23rd, 23:22:55 PM. The router assigns (302) an IP address to the network interface of (301). The IP address in the response (302) has an expiry timestamp, and it expires at 23:24, September 23rd, 2019. The pair (192.168.3.15, 2019-09-23T11:24:00:00) sent over as a response to 301 represents the (IP address, expiry time) pair sent to the network interface. At 11:24, device A's (301) IP address will expire, and device A needs to resubmit/extend or leave the network. At 23:25:46, device B (304) enters the network and requests an IP address to join a network. The router, at this point, has the '192.168.3.15' address released and expired from device A. Thus, it reassigns the IP address (303) to device B (304) with a new expiry time at 2019-09-23T23:45:00. FIG. 3 represents the reassignment cycle of an IP address and reuse of an IP address within a network.

Figure 4:
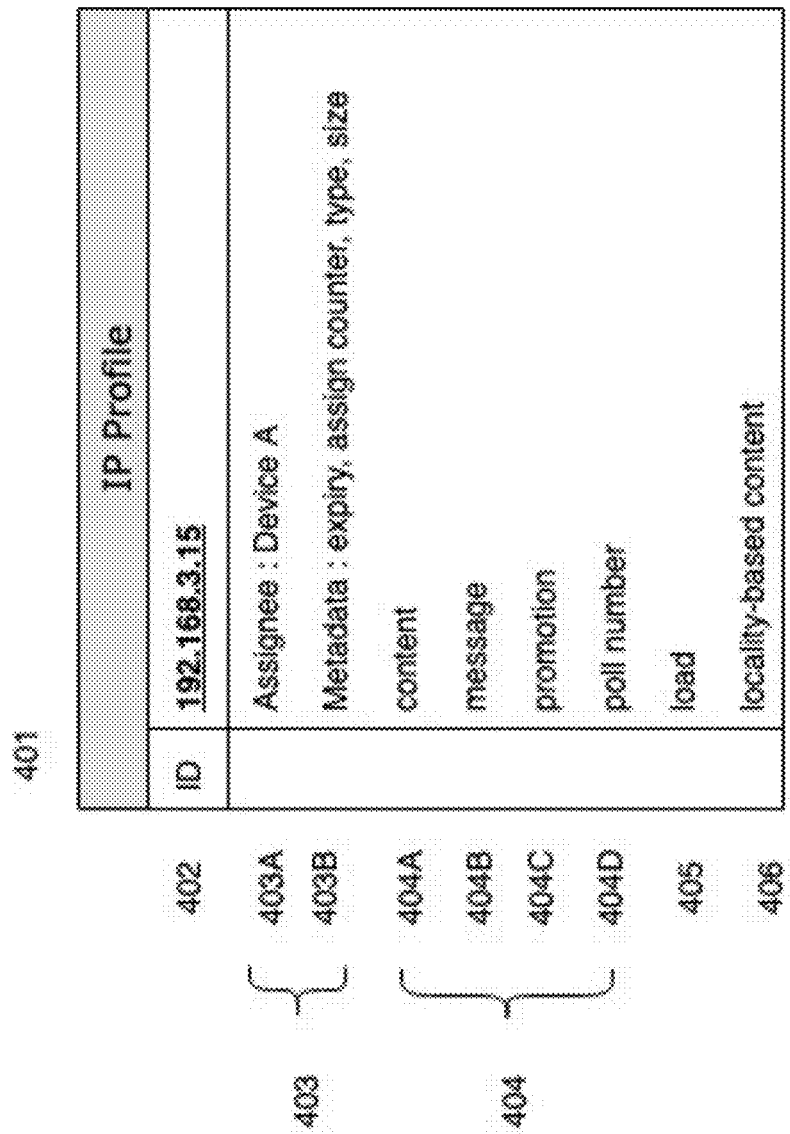
FIG. 4 represents the provided IP profile, according to various aspects of the present disclosure.

FIG. 4 represents the IP profile of the present embodiments. Any IP in the network has an associated profile. The present embodiments provide a method, system, and apparatus to record these IP profiles and the mechanism to log in to the IP profile and retrieve its content.

Some of the present embodiments provide an IP profile for any IP containing the information of the current assignee of IP at any given time. The figure represents an example profile assigned to IP address 192.168.3.15 (402). The IP profile contains metadata (403), containing the current assignee of the IP address (403A). For example, in the figure, the current assignee of 192.168.3.15 is Device A. The metadata (403) also contains the expiry, assignment counter, type, size, and other metadata details associated with this IP profile (403B).

Part of the present embodiments also presents contents associated with the IP profile (404). The content may have a content payload (404A), content messages (404B), promotional contents (404C), and a random number associated with a profile used for lottery and poll-based operations provided by the present embodiments (404D). The IP profile provided by the present embodiments may be augmented by a load (405) by the current device logged into the IP. The load (405) may be integrated with the content for the next assignment of IP. The IP profile contains locality-based content (406) populated by push notification or subscription notification mechanisms provided by the present embodiments.

Figure 5:
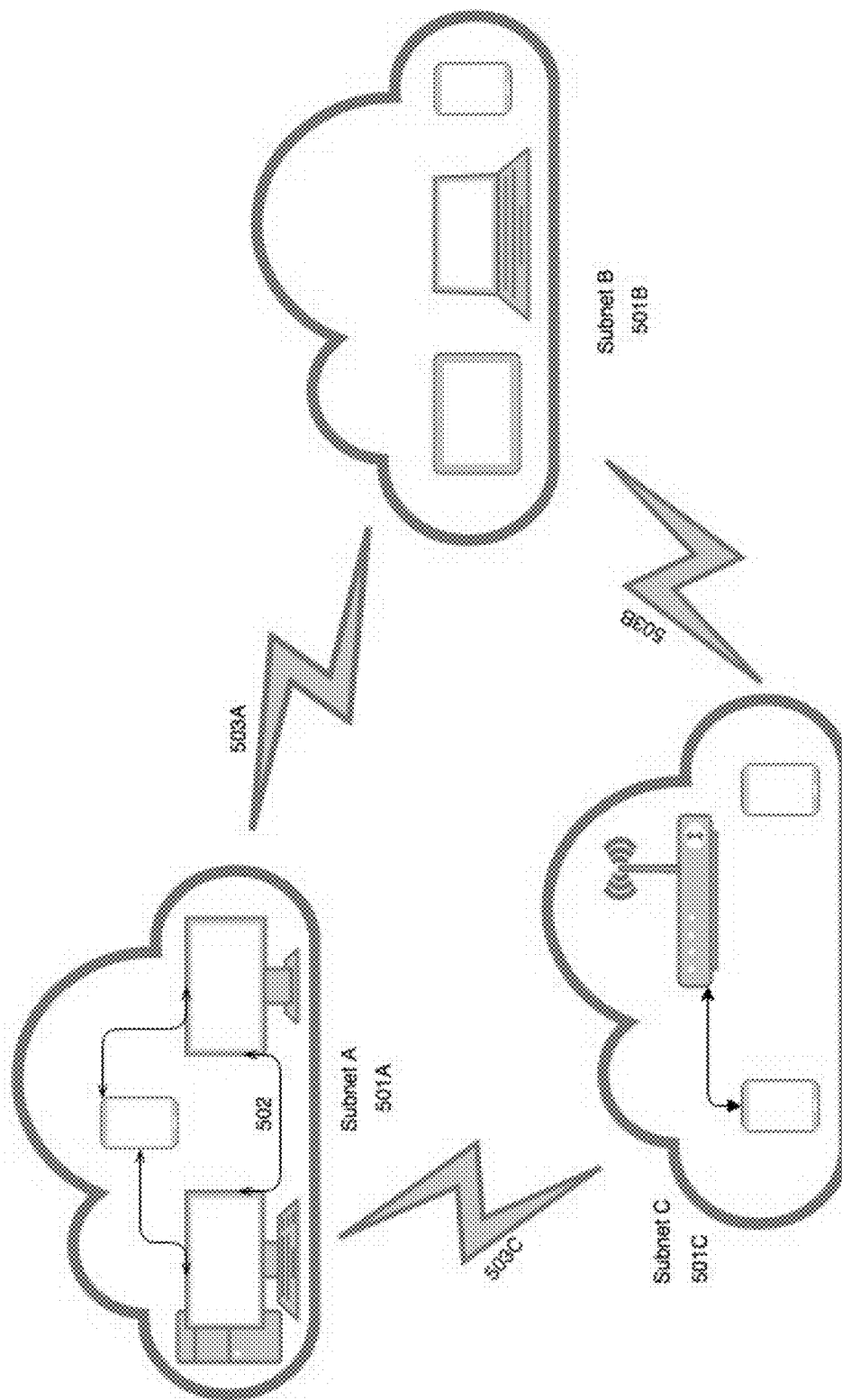
FIG. 5 represents the IP groups or subnets in a network according to prior art.

FIG. 5 represents the IP groups or subnets in a network. Subnets in the example illustration, subnet A (501A), subnet B (501B), and subnet C (501C), each have their subnet address and subnet mask. A subnet mask defines which IP address ranges fall into that subnet. The network interfaces of a given subnet may communicate without complicated routing, and the communication between subnets (503A, 503B, 503C) needs further routing.

Figure 6:
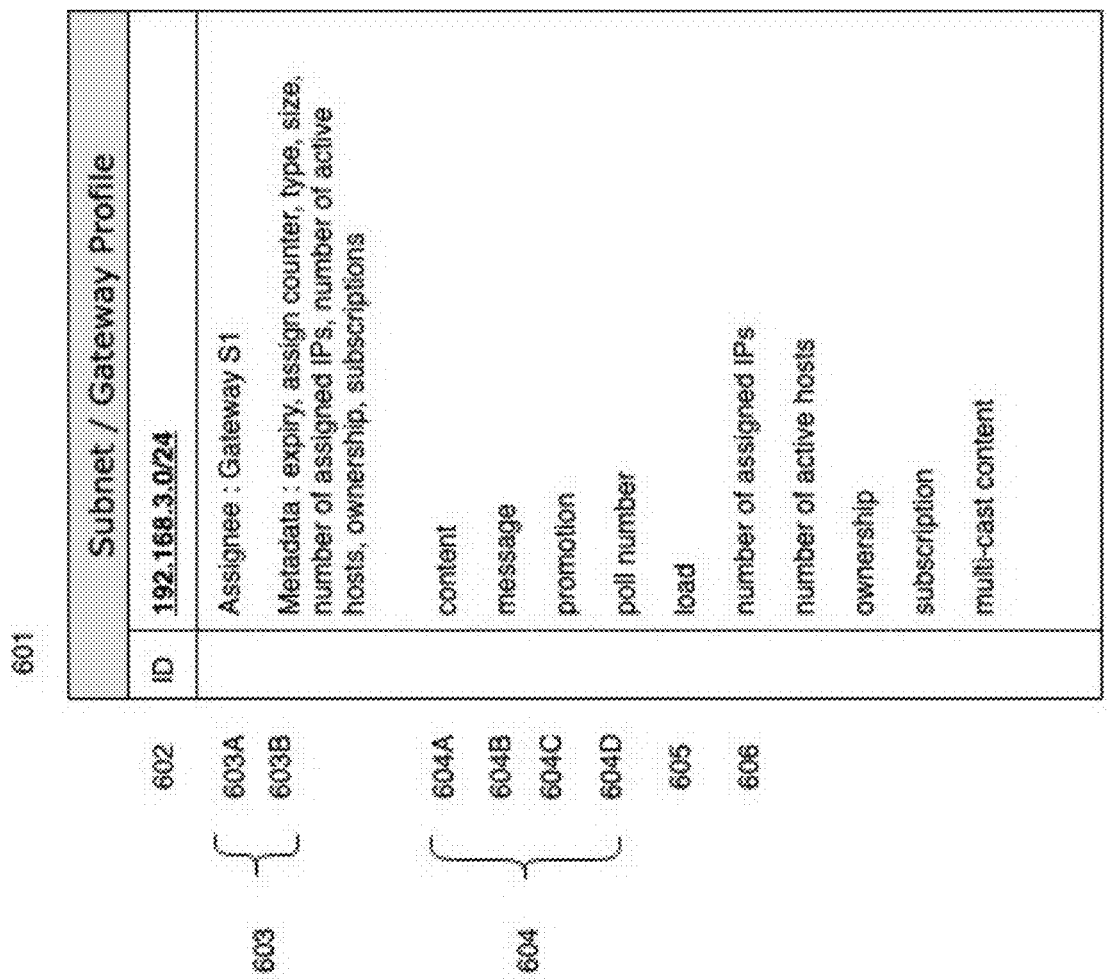
FIG. 6 illustrates the method and system to assign a subnet profile to any given subnet, according to various aspects of the present disclosure.

FIG. 6 presents the present embodiments' method and system to assign a subnet profile to any given subnet. The subnet/gateway profile 601 has a subnet mask or ID associated with the profile (602). The subnet profile is visible and accessible to all the network interfaces and hosts within that subnet. A subnet profile contains the metadata associated with the subnet profile (603). This metadata includes the assignee of the subnet profile or owner of subnet profile (603A) as an example gateway S1, as well as metadata details containing expiry, size of the subnet, number of assigned IPs within the subnet, number of active hosts within the subnet, ownership of the subnet (for example a subnet owner may be an ISP provider or a private company) and the subnet subscription. The subnet subscription is a method provided by the present embodiments to receive promotional data related to the subnet and has a way and system to propagate and release this data to the active hosts of the current subnet.

The subnet profile also has a content (604A) message (604B), promotional content (604C), and a random number, identification, or code associated with the subnet for lottery or poll-based purposes (604D).

The subnet profile may also be loaded by content (605) available to the future subnet active hosts.

FIG. 7 illustrates the present embodiments' method and system to enlist (703A,703B,703C,703D) the subnets available in the vicinity of a device (702). Each subnet is a valid endpoint that the device's network interface (702) may request to join and have private and public content. Public content (701) may be seen outside from the devices (702) that asking to join them before they join. The public content may be represented to the device (702), and the device may join the one that matches its desirable contents or promotions.

Figure 8:
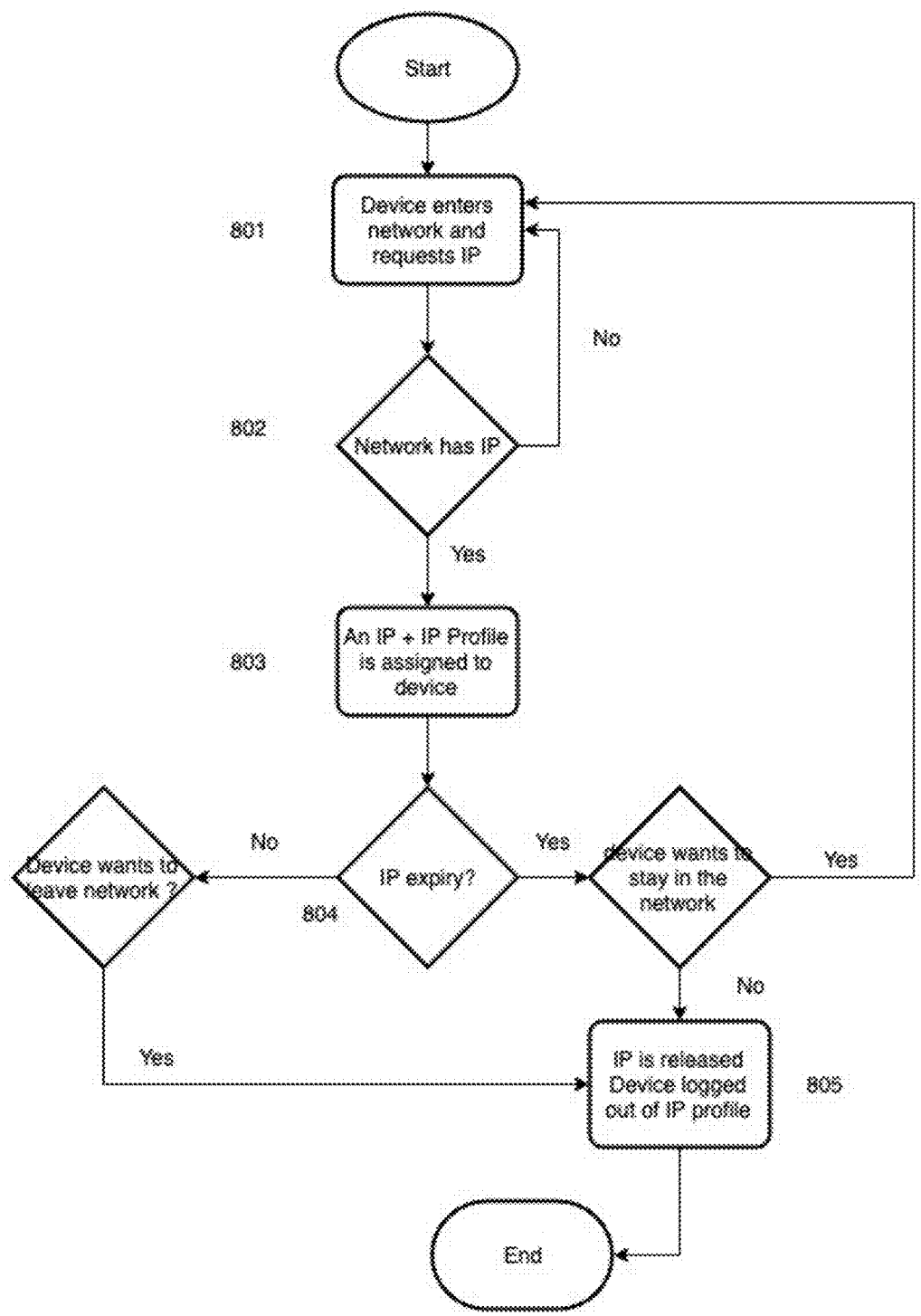
FIG. 8 illustrates the IP obtainment in a network and the method of providing assignment of IP profile to the obtainer parallel to IP obtainment, according to various aspects of the present disclosure.

FIG. 8 illustrates the IP obtainment in a network and how the method assigns IP profile to the obtainer parallel to IP obtainment. (801) In the initial step, a device discovers and requests a network to obtain an IP and join the network. If the network has availability and available IP (802), it assigns the IP address to the device (803). The method of present embodiments provides the IP address to be the key to entering the IP profile. Hence an IP profile is also assigned to the device (803). If IP is expired (804), IP will be released from the device. If the device wants to stay in the network, it must go through the same IP request and network inquiry (801) again. Otherwise, the IP is released (805). The methods of present embodiments provide automatic log out of the device out of the IP profile as the IP is released. The methods of present embodiments provide an exact match of the device's IP address and the profile's IP address to be able to access an IP profile content (805).

Figure 9:
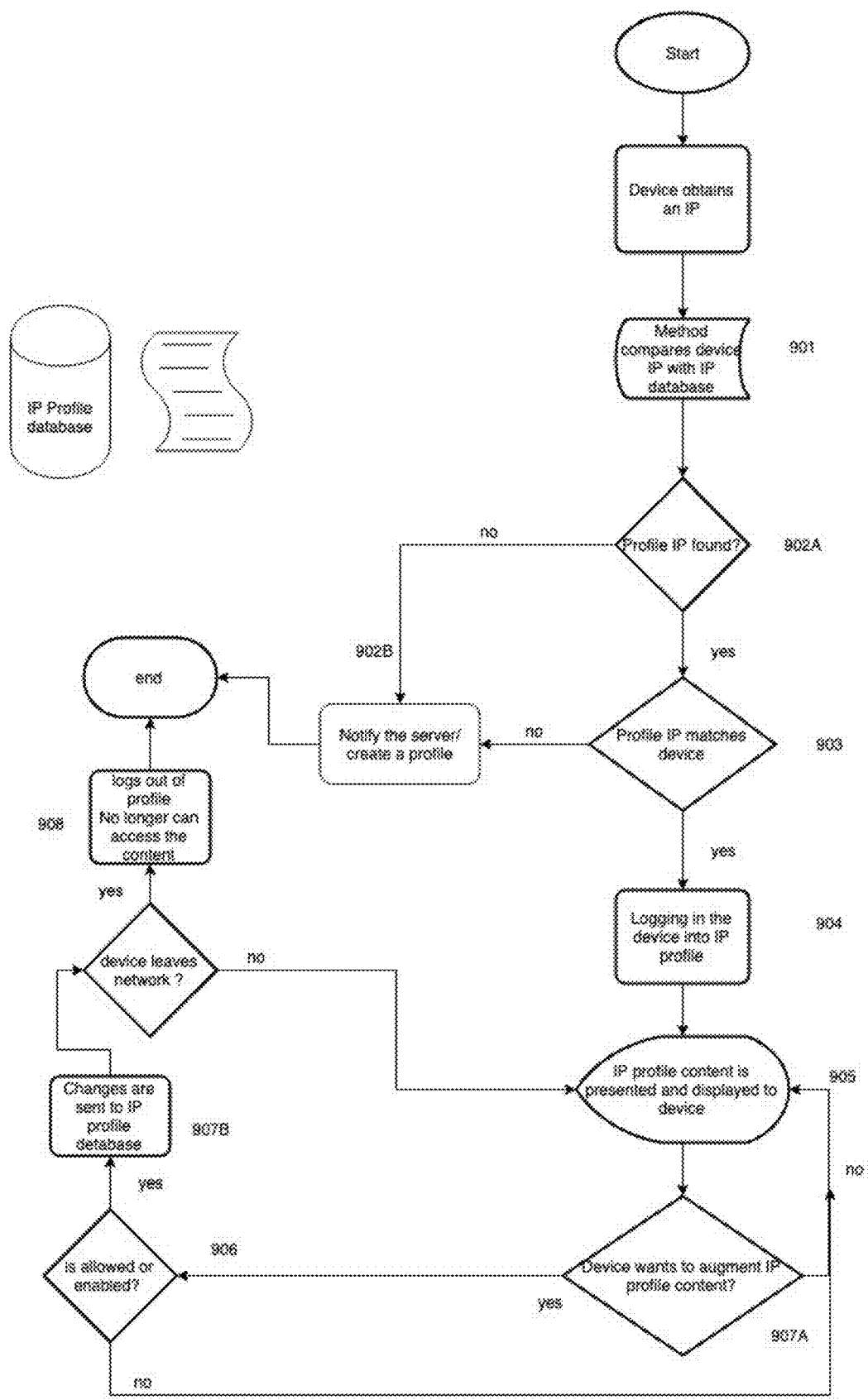
FIG. 9 illustrates how the IP profile assignment, release, and creation are structured according to various aspects of the present disclosure.

FIG. 9 illustrates how IP profile assignment, release, and creation are structured in the present embodiments. When the device obtains an IP address, it may send a request to the application of the present embodiments. The application compares the device IP with the existing database of IP profiles. (901). Decision segments verify the existence of the IP profile (902A) and the matching of such to the device's IP (903). If an IP profile matching the IP doesn't exist, the present embodiments provide a method to notify the application or create an IP profile (902B). When the decision is made, if a match is found, the device may now access the content of the IP Profile. The device is now announced to be logged in to the profile (904). The present embodiments provide methods, systems, and applications to display the content of the IP profile to the device (905). The present embodiments provide a method to augment the content of profile IP (907 A) and apply the changes if the device is enabled to augment (907B) to the current IP profile if permission is granted to the device (906). If the device doesn't have permission to content or doesn't want to augment content, it still may stay in the mode to access and display the content. When leaving the network, the present embodiments provide immediate logging out and disabling access to the IP profile from the previous device (908). At any step, if the IP of the device doesn't match the IP of profile, the display, access, and request to augment the content of the IP profile are revoked from the device.

Figure 10:
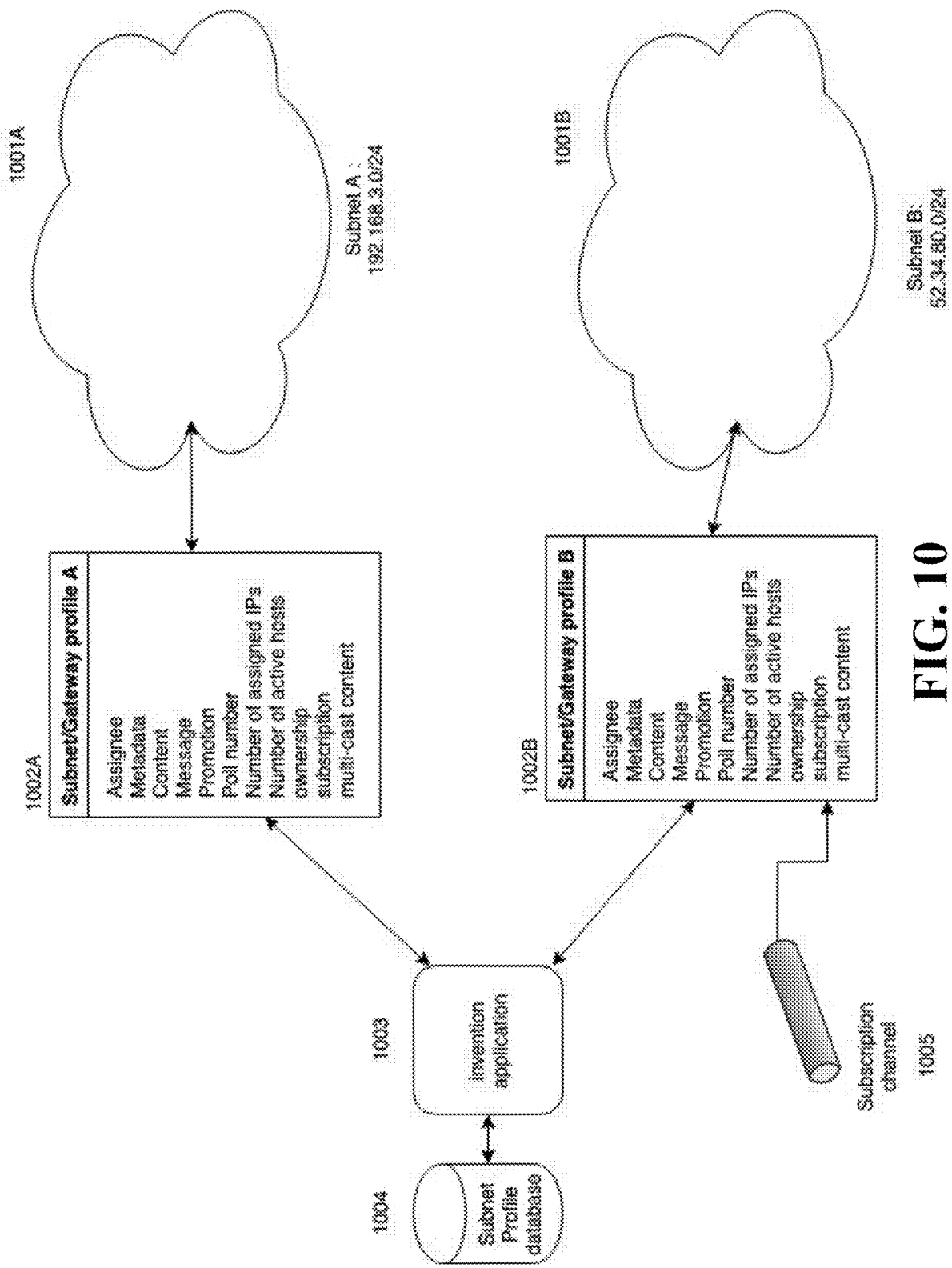
FIG. 10 illustrates the subnet/gateway profiles, according to various aspects of the present disclosure.

FIG. 10 illustrates the subnet/gateway profiles (1001A, 1001B). The gateway profiles are a higher level of profiles (1002A, 1002B), containing more information about the subnet they are assigned to and able to be published and multicast their content to all the nodes (all IP profiles whose IP falls in the range of subnet's IP). As described in detail with reference to FIG. 6, the subnet contains metadata about the subnet and the status of the current IP profiles and devices in the subnet. The present embodiments provide an application (1003) and storage to contain the subnet profiles (1004) and updates to subnet profiles and their content. As shown in the figure, a subnet profile may have one or more subscription channels (1005) from which it pushes information and content to the subnet profiles. The present embodiments provide the application to create, manage, and augment the content of these subnet profiles and their content. The present embodiments provide the system and method to store and maintain the subnet profiles. The application (1003) provided in subnet profiling is responsible for validating IP profile members of the subnet group, updating the metadata and data of each subnet profile, permissions to multi-cast, unicast, and broadcast content of subnet profiles to members of the subnet, and subscribe/unsubscribe to the content channels, advertisement channels/promotion channels and such.

Figure 11:
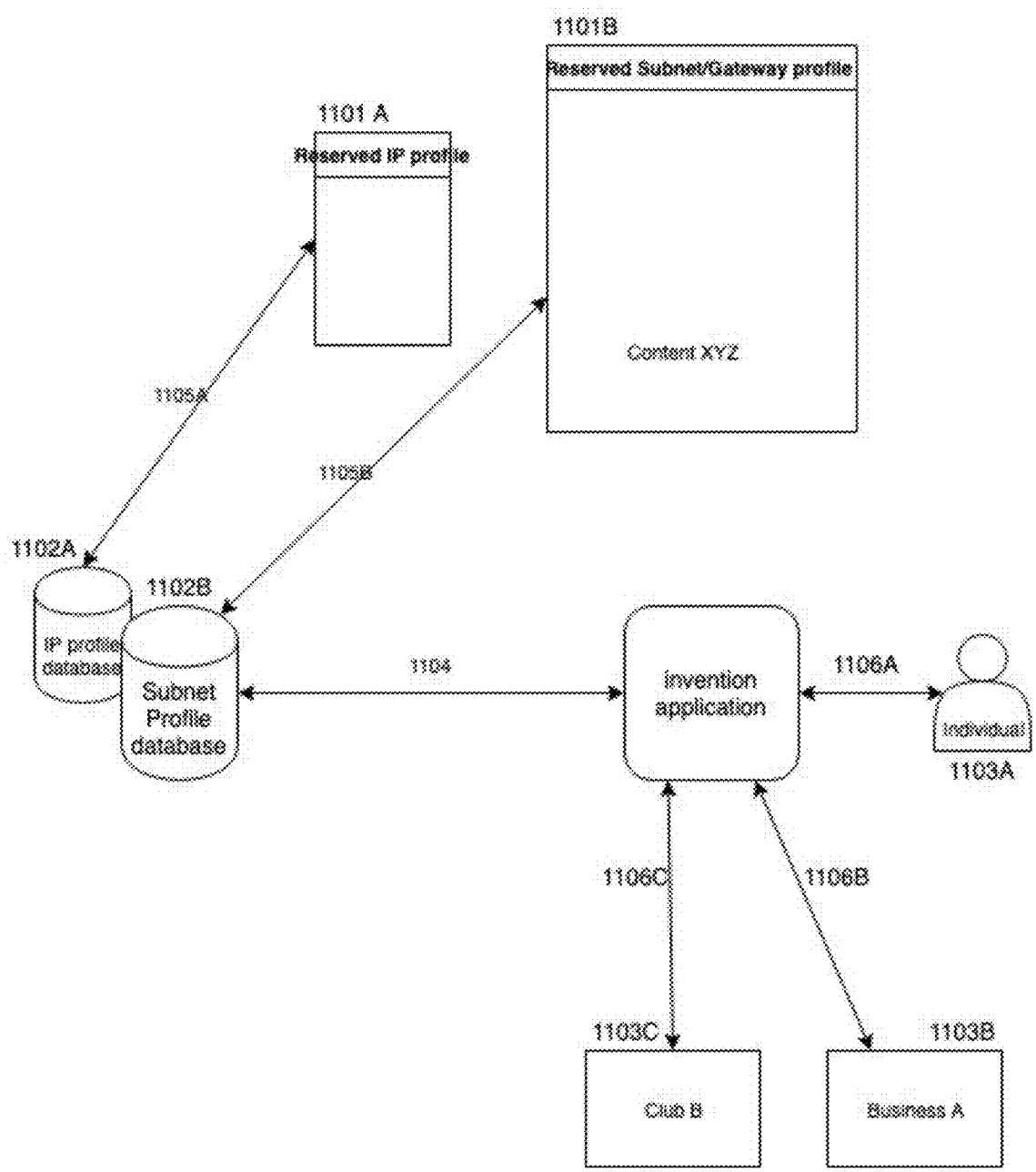
FIG. 11 illustrates Alias profiles as mechanism to add a new IP or subnet IP to databases and manage another IP, according to various aspects of the present disclosure.

FIG. 11 illustrates Alias profile: Another mechanism to add a new sub-net IP (1101B) to databases (1102B) is manually subscribing (1106C,1106B) group-IP/subnet-IP profile with modifiable IP, in this method, business (1103B, 1103C) or individuals (1103A) may reserve a sub-network profile (1101B) for their device like WIFI modem and they may manually or automatically (1106A,1106B,1106C) change the IP but still have the same profile (1101A, 1101B), to keep the content of previous IP. (Dynamic IP, constant content, IP/subnet reservation method), The details about alias profiles are provided with reference to FIG. 20 and FIG. 23

Figure 12:
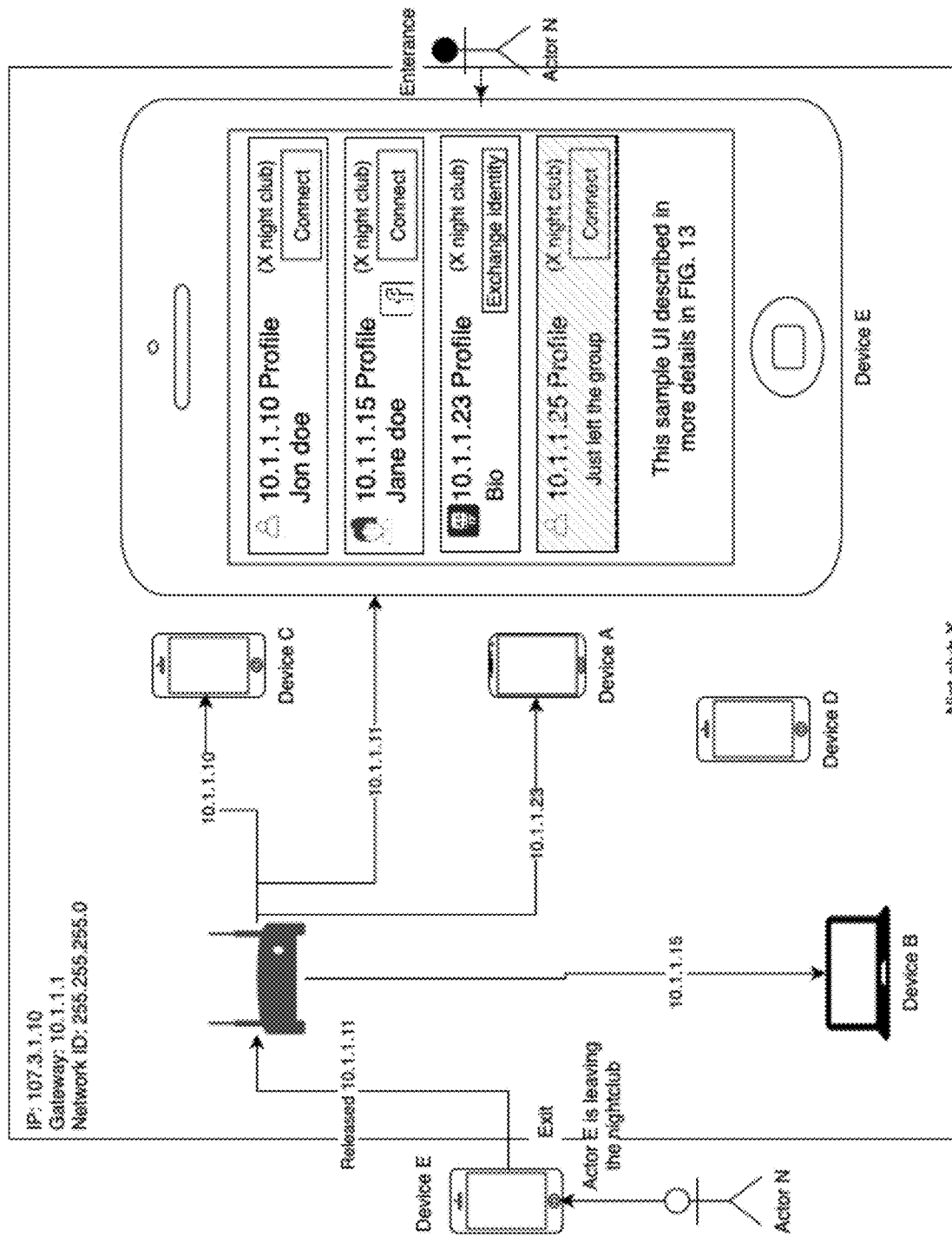
FIG. 12 illustrates a diagram of a sample use-case to show IP auto-sign in a nightclub when the device is connected to the nightclub's modem and auto-sign out when it left the network, according to various aspects of the present disclosure.

FIG. 12 is a diagram of a sample use-case to show IP auto-sign in a nightclub when the device is connected to the nightclub's modem and auto-sign out when it leaves the network. This embodiment includes creating and assigning a profile to subnets or gateways. In the example diagram, Device A, B, and Device C are already connected to the network. Still, Device D is not connected to the network in nightclub X. Actor N enters nightclub X and decides to join his device E to the network. The screen of Device E shows a Night club X gateway-subnet profile (107.3.1.10/24-10.1.1.1/24) when it enters the network (The screen is described in detail in FIG. 13). In this example, Device A, Device B, and Device C are listed in the Subnet profile for Device E because all are connected to the local network and have the same IP range. The device is not listed because it is not connected to the network. Device C and Device B are online in the identified mode because they have revealed their identity (using a process described in FIG. 13 and FIG. 14). Device C communicates using 10.1.1.10/24 and as Jon doe identity and Device B communicates using 10.1.1.15/24 and as Jane Doe's identity.

On the other hand, Device A has not revealed its identity (default mode). Still, it might provide some information or description for its IP profile, including but not limited to a profile picture and some biography information. The device in the subnet profile's chatroom, forum, or other group nature modules may exchange identities (as described in FIG. 13 or FIG. 14). Once Actor N leaves the nightclub, it releases the IP (10.1.1.11/24) and subsequently leaves the network, and automatically signs out and leaves the subnet profile. So, it will be disappeared from or be disabled in the subnet profile as shown in screen E. The devices in the network won't see device E anymore once it leaves the network. Anyone inside or outside the network trying to peep the subnet won't see the device E anymore (Peeping on as described in FIG. 19, FIG. 23).

Figure 13:
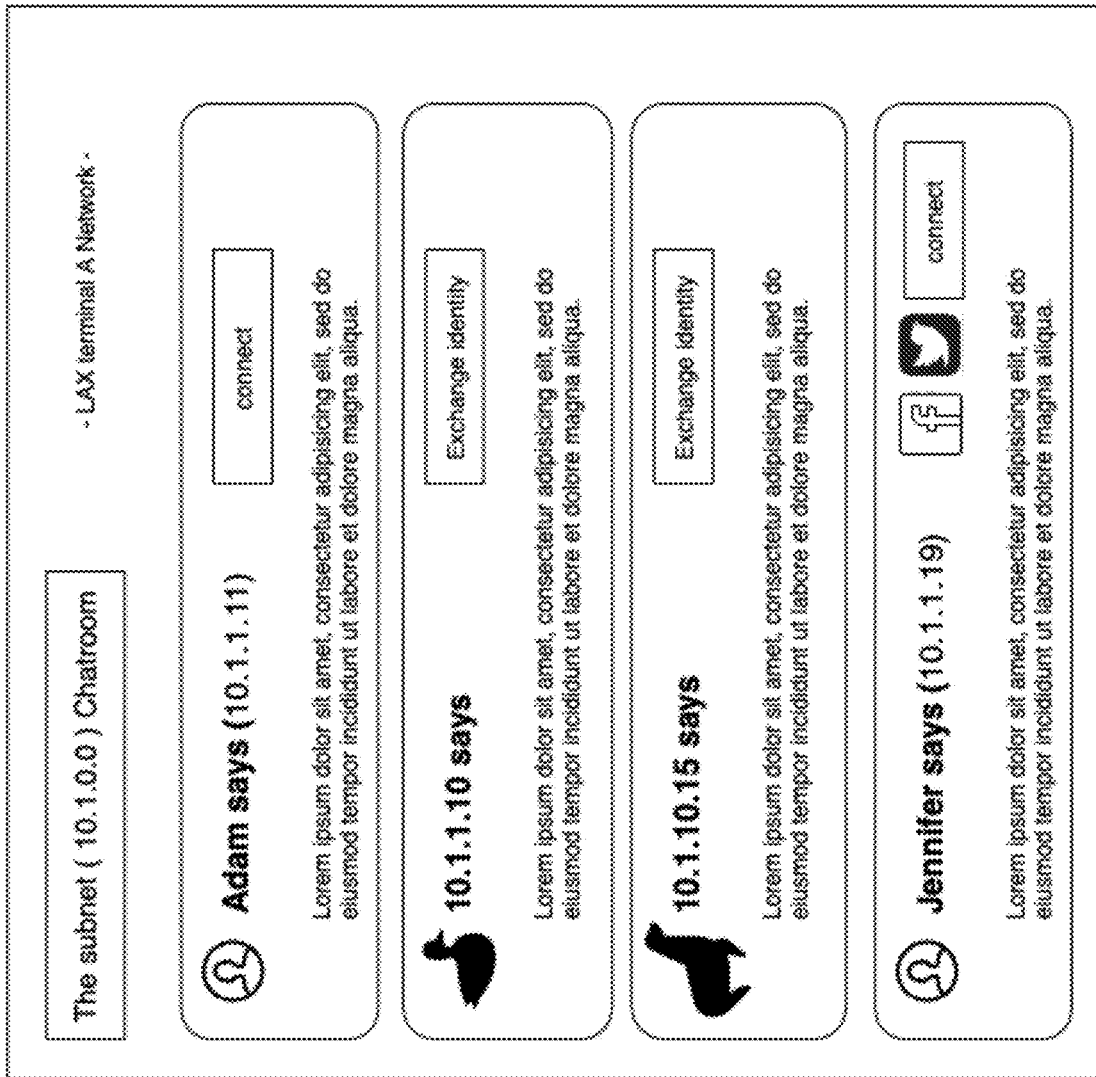
FIG. 13 is a schematic front view of a computing device that may include an application program for a chatroom as a group nature feature example for subnet/gateway profile, according to various aspects of the present disclosure.

FIG. 13 illustrates a sample user interface of a chatroom as a group nature feature example for a subnet/gateway profile is shown in the FIG. 6. There are four devices online (different IPs) in this subnet, two have already revealed their identity, and the last one connected her social media to her profile. Two other messages were sent in anonymous (default) mode with different avatars or pictures as their profile picture.

With reference to FIG. 13, Adam or Jenifer may decide to send some message without using an identified account at any given time by changing or disconnecting it from their IP profile data or simply changing their account to anonymous if they also have saved accounts. Any device in the subnet might request identity exchange or go public (for all) if an account is anonymous or a specific identity is not provided. On the other hand, the anonymous mode might reveal their identity to a particular identified device or stay anonymous for others. The exchange might happen in a one-way or two-way mechanism. The simultaneous two-way identity exchange is shown in FIG. 14, and it only may be done if both sides have the identity verified beforehand.

With reference to FIG. 13, some embodiments may also list online IP profiles in the subnet, or the number of offline IPs may be listed. In an IP profile associated with the private network, some embodiments may show devices in the network that are not using the application or website using network characteristics and tools. For example, using the broadcasting feature or network status providers.

Figure 14:
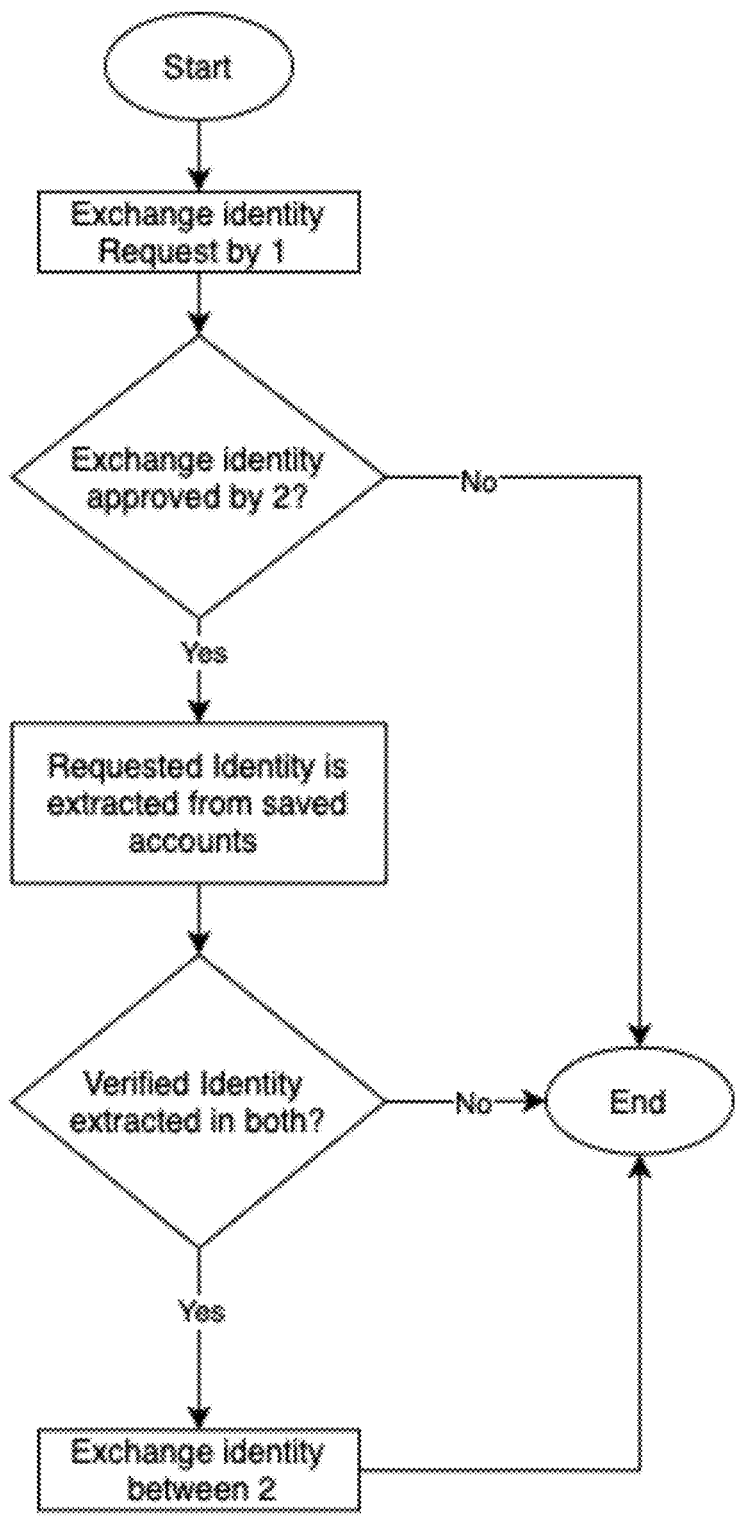
FIG. 14 is a flowchart illustrating a sample process of exchanging identity simultaneously between two users, according to various aspects of the present disclosure.

FIG. 14 is a flowchart illustrating a sample process of exchanging identity simultaneously between two users according to various aspects of the present disclosure. First, any of the two side requests to exchange identity, and then the other side receives the request and approves or reject the exchange. Suppose the request is approved and the requested identity is available by both sides. In that case, the identity is extracted from both sides, and the identity will be visible to both sides simultaneously.

Figure 15:
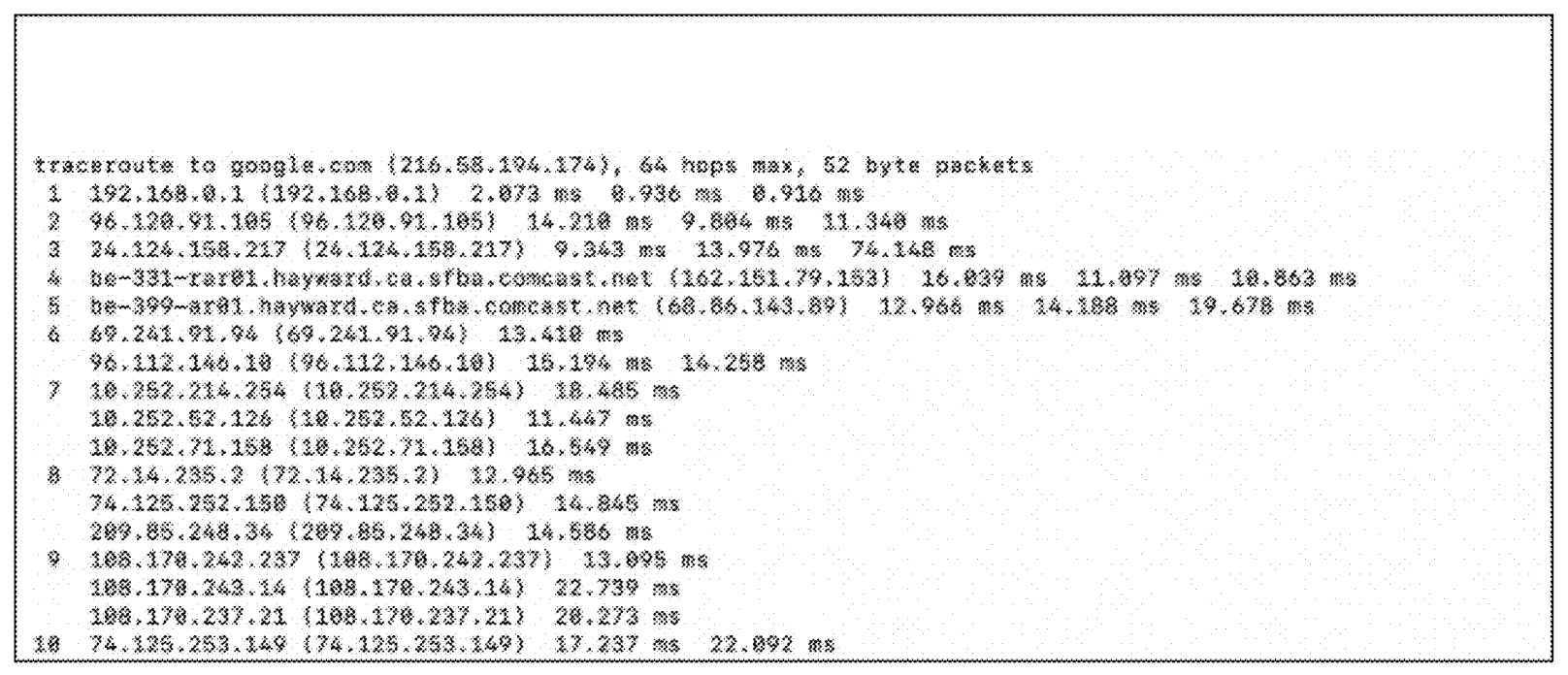

FIG. 15 illustrates a sample output for Traceroute, a network tool. The data is transmitted through the Internet as data packets. Traceroute is used to determine the "path" packets take from one IP address to another on "device A" in FIG. 17, according to the prior art; Traceroute, also called "tracepath" or "tracert," is a network tool used to determine the "path" packets take from one IP address to another. It provides a ping's hostname, IP address, and response time. Width reference to FIG. 15, a sample output for running this command on "device A" in FIG. 16. In this case, Packet passes through 10 gateways in this example.

Figure 16:
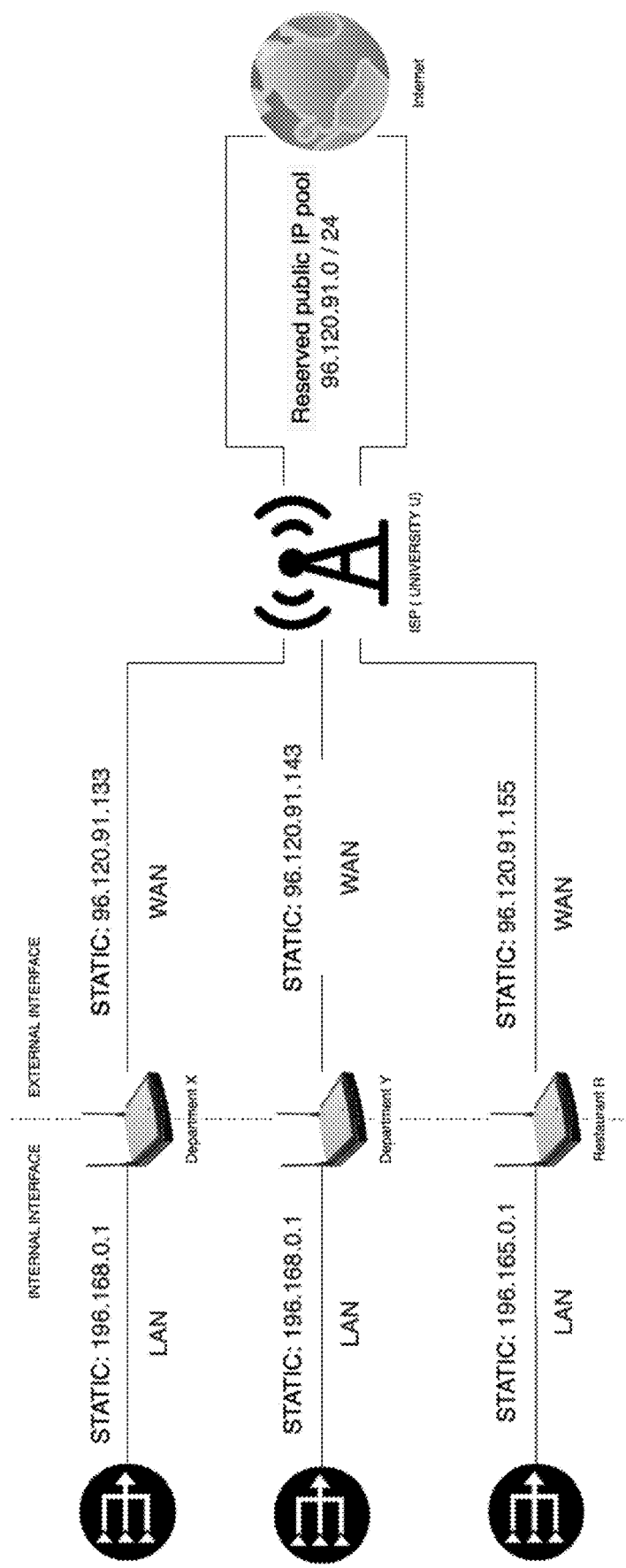
FIG. 16 illustrates a sample visualization of network structure based on FIG. 15 packet path, according to the prior art.
Figure 17:
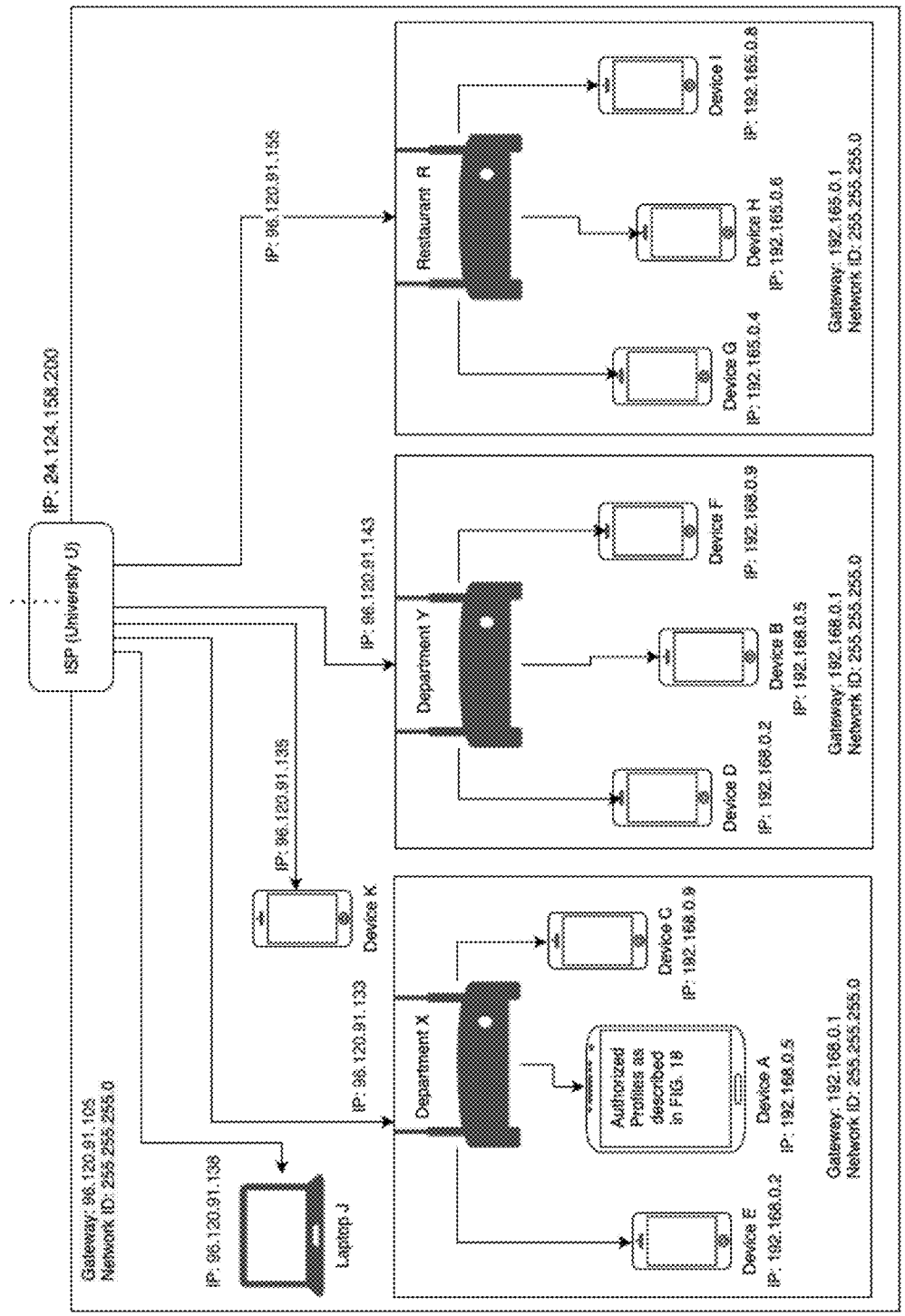
FIG. 17 illustrates a sample use-case showing IP assignment in internet hierarchy and authorized IP/subnet/network profiles for devices inside the network based on FIG. 16, according to various aspects of the present disclosure.

According to the prior art, FIG. 16 illustrates a sample visualization of network structure based on the FIG. 15 packet path. As described in FIG. 5, the IP assignment through the Internet has a hierarchical structure and consists of many subnet networks with different network Ids. FIG. 17 illustrates this hierarchy in more detail and describes the utility offered by the present embodiments in this example network setup and method of using the characteristic of IP and network structure to achieve the purpose of the present embodiment.

FIG. 17 illustrates a sample use-case to show IP assignment in the Internet hierarchy and authorized IP/subnet/network profiles for devices inside the network based on FIG. 16, according to various aspects of the present disclosure. Device A is part of a network in Department X and given IP 192.168.0.5, so the Device A is authorized to view and manage content for 192.168.0.5 in this private network. As mentioned, Device A is part of the Department X private network. Device E and Device C are also part of the Department X network. Device A, Device E, device C, and all other devices with assigned IP in this network are also authorized to access the 192.168.0.0 Subnet profile or (192.168.0.1/96.120.91.133) gateway profile since all of these devices are part of the network 192.168.0.0 with subnet mask 255.255.255.0 with gateway IP 192.168.0.1. So, all devices with IP start with 192.168.0 are authorized to access this subnet profile. One thing to pay attention to is that all devices in Department Y also use the same range of IPs used in Department X. Still, any given IP (like 192.168.0.2) will have different IP profiles, even though they are the same (Device A and B-Device D and E) because they are in various networks, which are treated differently. So, the visible content inside the 192.168.0.2 IP profile for Device A may be completely different than those in the 192.168.0.2 IP profile for Device D. To understand the reason, one should consider the hierarchy structure in IP assignment for "device A" has 96.120.91.133>192.168.0.2 and for "device B" has 96.120.91.143>192.168.0.2. So, all Device D, Device B, and Device F may access and communicate using the (96.120.91.143>192.168.0.0) subnet profile or (192.168.0.1/96.120.91.143) gateway profile. However, the private network may use a different range of IPs (92.165.0.0) like the Restaurant R router. For the same reason, Device G, Device H, and Device I are authorized to access and append or communicate through (96.120.91.155>192.165.0.0) subnet profile or (192.165.0.1/96.120.91.155) gateway profile.

With reference to FIG. 17, there is also an IP profile in the diagram through which Device A and Device B may both access and communicate because of the IP assignment hierarchy structure. As shown in the diagram, Department X (96.120.91.133), Department Y (96.120.91.143), and Department R (96.120.91.155) are all using public static IPs in the same network themselves (96.120.91.0—IP mask 255.255.255.0). Laptop J and Device K (96.120.91.138) also belong to this network as well because they are given IPs starting with 96.120.91.0 with gateway 96.120.91.105. So, all devices shown in diagram A-K may access and communicate using IP subnet profile 96.120.91.0 or IP Gateway profile 96.120.91.105 or 24.124.158.200.

Figure 18:
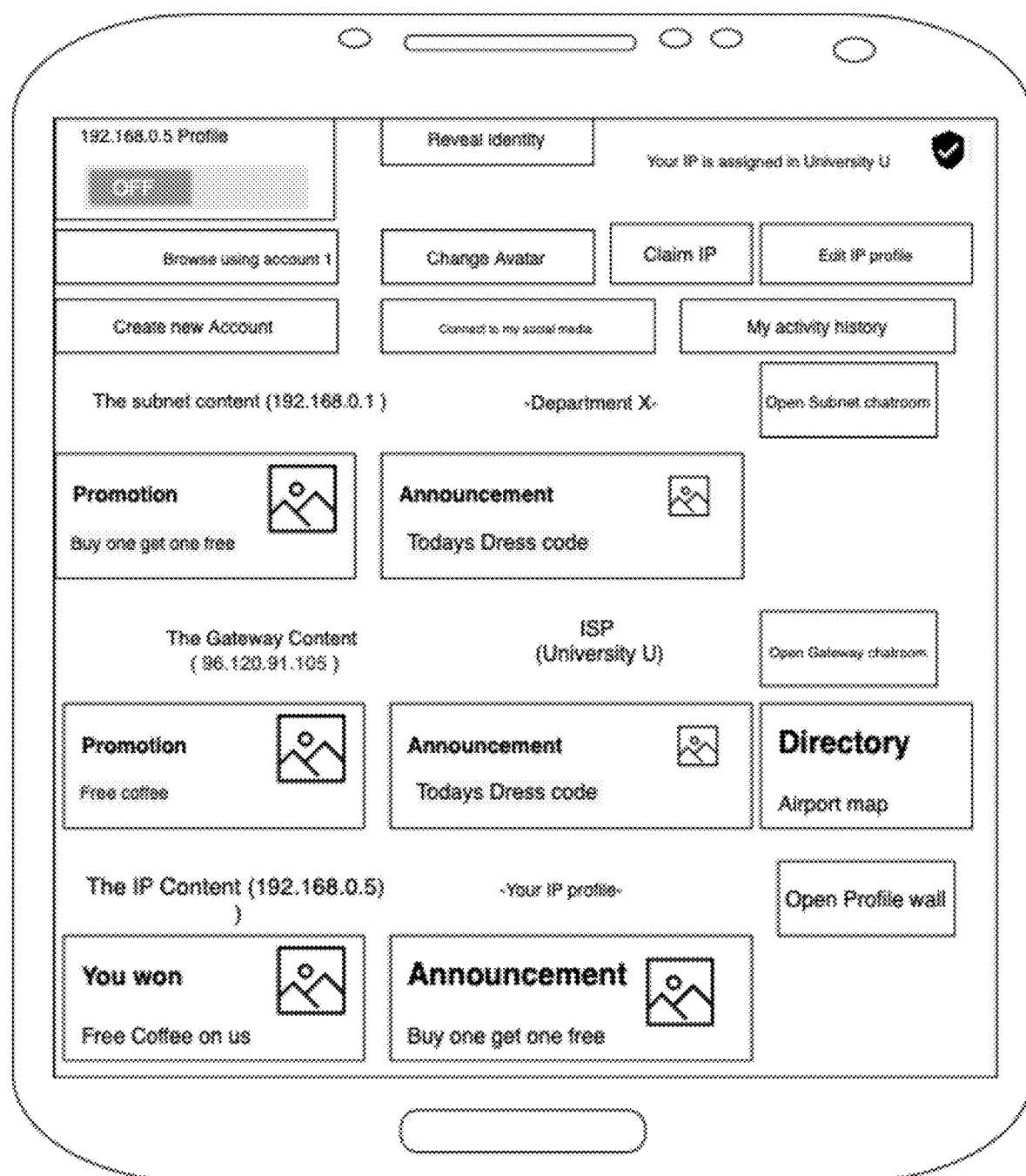
FIG. 18 is a schematic front view of a computing device that may include an application program for a sample IP Profile after a device is authorized automatically once connected to the network based on FIG. 17, according to various aspects of the present disclosure.

FIG. 18 is a schematic front view of a computing device that may include an application program for a sample IP Profile after a device is authorized automatically once connected to the example network setup based on FIG. 17, according to various aspects of the present disclosure. All authorized IP/Subnet/Gateway on device A is shown in the sample user interface in the diagram. Each Profile may list some content, including but not limited to promotions, announcements, maps, etc. This content may be listed through the IP profile manager (Described in FIG. 21 below) based on the IP ranges or IP Assignment strategy in the organization or Global organization or standards.

With reference to FIG. 18, since multiple devices may be part of a subnet or network (With the same Gateways), they may be treated as groups or rooms, so group features, including but not limited to chatrooms and forums, maybe defined for these profiles. For example, with reference to FIG. 18, "Device A" may open the associated chatroom and communicate with all devices with the same Gateway or inside the same subnet. On the other hand, the IP profile features are more like ownable standalone profile pages with features like an individual profile. Most social media features may be defined for existing IP profiles. Network of IP profiles assigned to all devices inside the same subnet or with the same Gateways.

With reference to FIG. 18, the user of the device may manage the IP profile belonging to their IP as long as it uses that IP address in the network. Once they release the IP address, they cannot manage or do an activity as the IP owner anymore.

With reference to FIG. 18, for example, by default IP profile may be offline, and the user decides to go Online and be visible to all or subset of devices in a group nature IP profile (subnet profile). Also, by default, the user of the IP profile might be anonymous and unknown or known, but the user decides to stay anonymous while using the IP profile. However, the user might choose to reveal their identity whenever they desire. The sample user interface shows that the IP profile might be populated with more user-friendly information from IP mete data, DHCP (Dynamic Host Configuration Protocol), ISP, ICANN, or any third-party entity involved in IP assignment. For example, some embodiments may recognize that IP is in the range which belongs to University U or Airport X or fetches or interprets some geolocation data by looking at the IP address value.

With reference to FIG. 18, the IP profile users may connect their profile with any third-party account as long as they have access to that profile. For example, they may connect any of their social media or affiliated accounts so that their activities would have traces of their social media in them. For example, when using their social media X account to add some announcement to the IP profile page, it may show a link to their social media profile on top of the announcement. Or the user may change the IP profile picture or avatar to their desired personal or non-personal ones. The user may save these setups as accounts. For example, they might define an account with no identity, only an avatar as a profile picture, another account connected to their university verified email, and another connected to the social media X. The user may use any previous accounts or create a new one while the profile is Online. For example, in this case, as shown and described in more detail in FIG. 19 other devices may view the content differently based on the user's account selected by the user while using the IP profile. There is a need for a database and a verification method like an account ID and pin or password similar to regular online accounts to access these accounts. However, having these accounts are optional, and the user may always setup their desired way through the IP profile as long as they are using the IP address.

With reference to FIG. 18, some embodiments may provide one or more built-in accounts for IP profile devices using device media access control address (MAC address) or associated device identifications. The account is bound with the device using this method. In other words, these types of accounts are "device accounts" not "user accounts." So, there is no need for creating an account or pin and password for a built-in device-bound account like those accounts users create for storing the setting and logging the activities. If "device accounts" are used, some embodiments store the setting and log the activity with MAC address, or any available device related global identification. A MAC address is a unique identifier assigned to a network interface controller for use as a network address in communications within a network segment. Some embodiments may create MAC profiles similar to IP profiles with the difference that MAC profiles' ownership is often permanent and rarely changed. That is why present embodiment considers it for building built-in accounts in the system.

Figure 19:
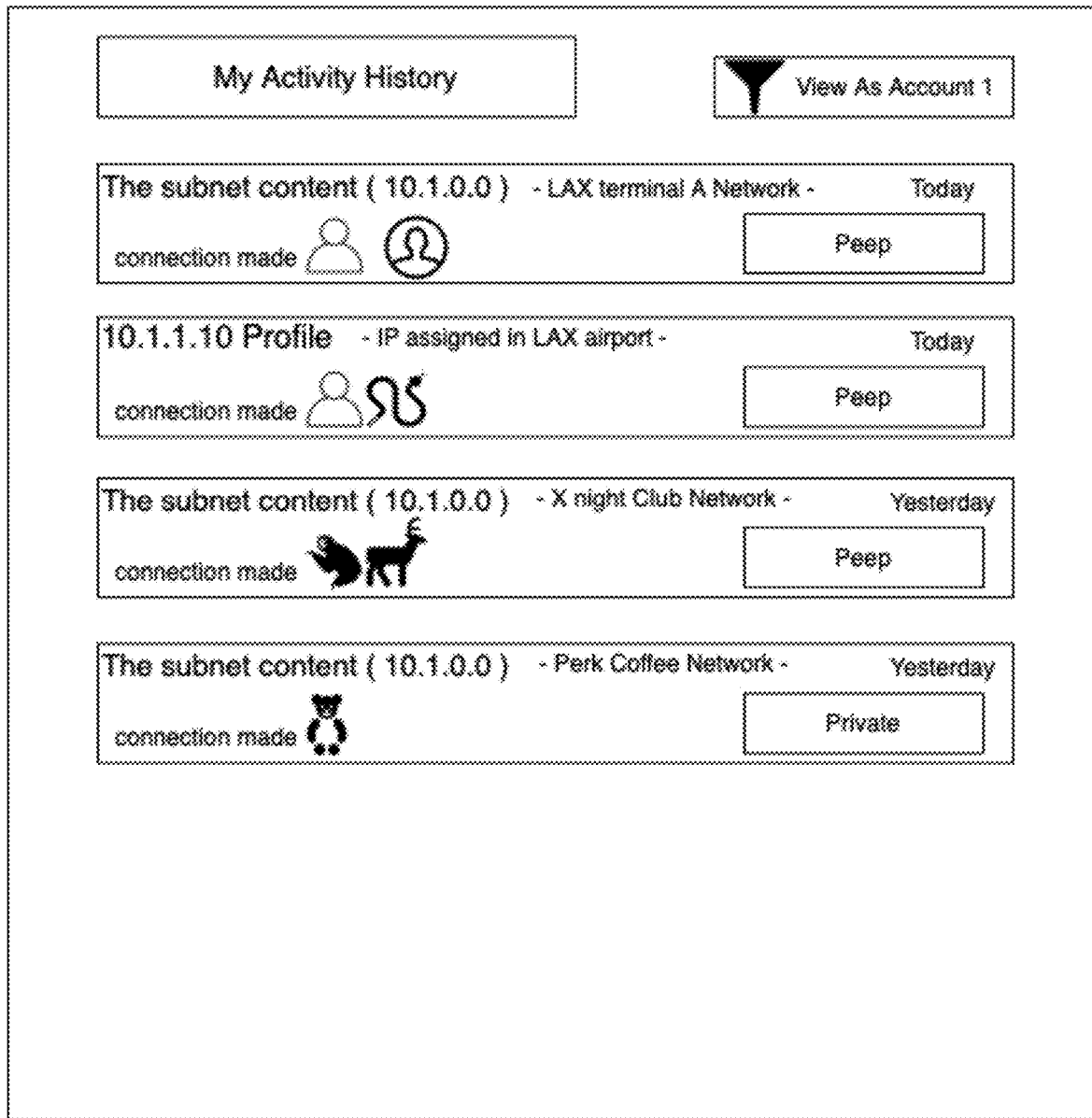
FIG. 19 is a schematic front view of a computing device that may include an application program for logging and listing the activity of the user while the user is using the profile, according to various aspects of the present disclosure.

FIG. 19 is a schematic front view of a computing device that may include an application program for logging and listing the activity of the user while the user is using the profile, according to various aspects of the present disclosure. With reference to FIG. 19, while the user is using the profile, the activity of the user may be logged and may be listed.

For example, with reference to FIG. 19, the user visited three different subnets and connected to 3 different subnet profiles and an IP profile. It also might list the connected identities in those profiles. As you see in the diagram, the IP profile might be private and only accessible to the current owner of the IP profile. Restrictions may apply by the current owner of the IP profile or the IP profile manager that handle the IP profiles (described in FIG. 21).

Figure 20:
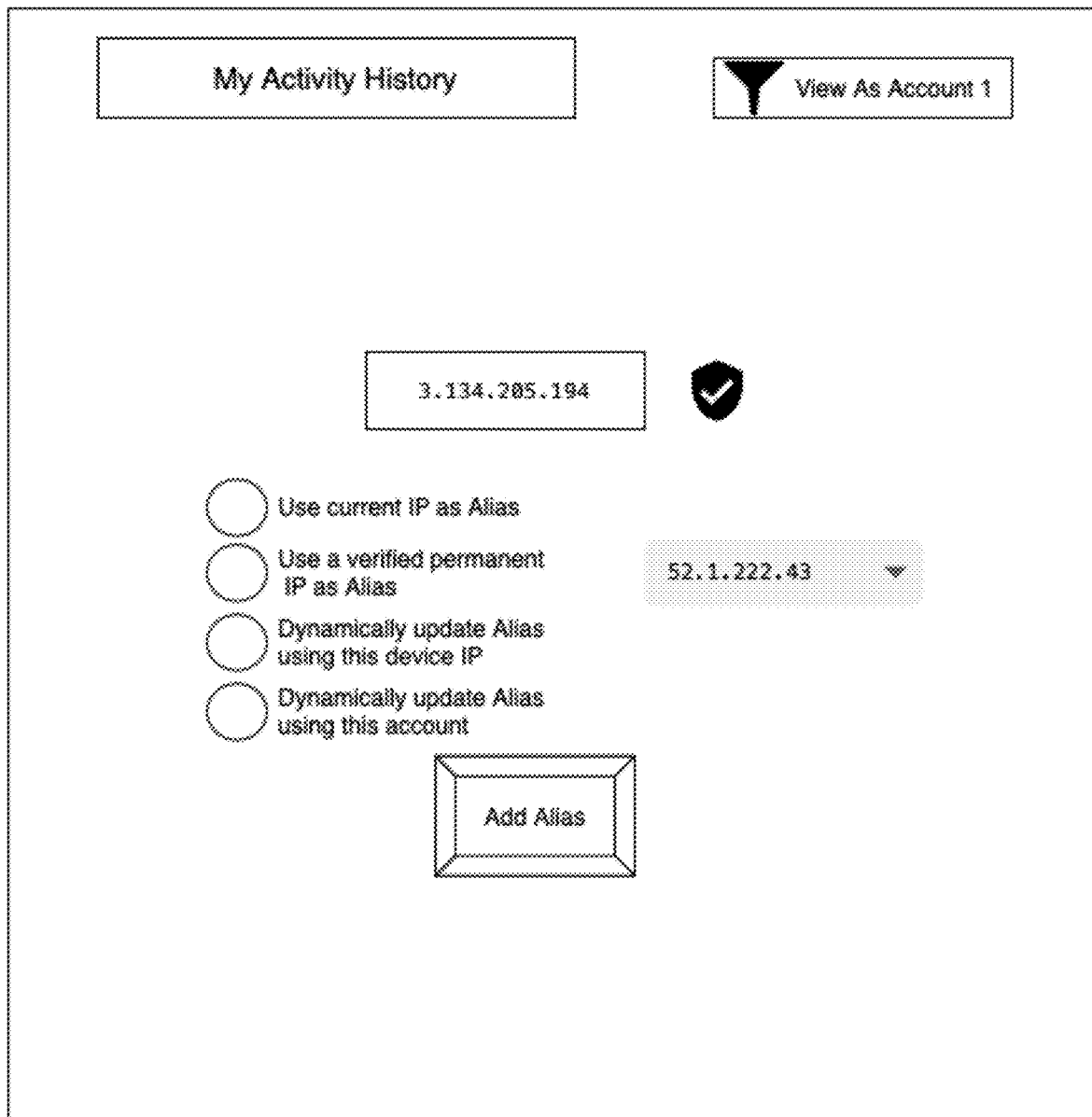
FIG. 20 is a schematic front view of a computing device that may include an application program for assigning alias IP to manage another IP profile, according to various aspects of the present disclosure.

FIG. 20 is a schematic front view of a computing device that may include an application program for assigning an alias IP to manage another IP profile, according to various aspects of the present disclosure. With reference to FIG. 20, the IP "3.134.205.194" is already verified by the user using various methods to have belonged to the user of the device. Verification method may be sending a specific message from the device with that IP (Described in FIG. 24) or even using DNS verification methods like adding a DNS record to the domain DNS setting (In case IP corresponds to a domain name), etc. Once the IP ownership is verified, the user may manage and view the IP profile from the Alias's view. For example, in this diagram, the device may view the IP profile of verified IP using a device with a 3.134.205.194 IP address. The user might define another IP as an alias to another verified IP so that the device with the alias IP may manage the verified IP. This is useful when the owner of the verified IP wants to delegate the management to another device used by another user without doing the verification process on the delegated device. Also, another example use-case is dynamically updating the alias to the new IP on the device or IP address belonging to an existing account so that it is logically bound to the device or account.

Aliases may be used to show the same contents for multiple IP addresses or merge multiple profile contents into one. The Internet has a hierarchical structure, when the device is connected to the Internet, the device is part of a local subnet network (like Wi-Fi) and that subnet is part of a larger subnet (ISP), and so on. The IP address may be assigned to the device by Wi-Fi, ISP, phone carriers, or a hotspot Wi-Fi. By choosing the limited number of right common subnets and gateway profiles as group profiles in our social networking platform according to active devices and automatically using aliases to filter and remove extra subnets inside the hierarchy, it is possible to improve the social networking embodiment. For example, by only using a larger public subnet and ignoring the smaller dispersed subnets, more devices may exist inside the subnet profiles (a larger subnet means it cover more IP addresses in it).

Figure 21:
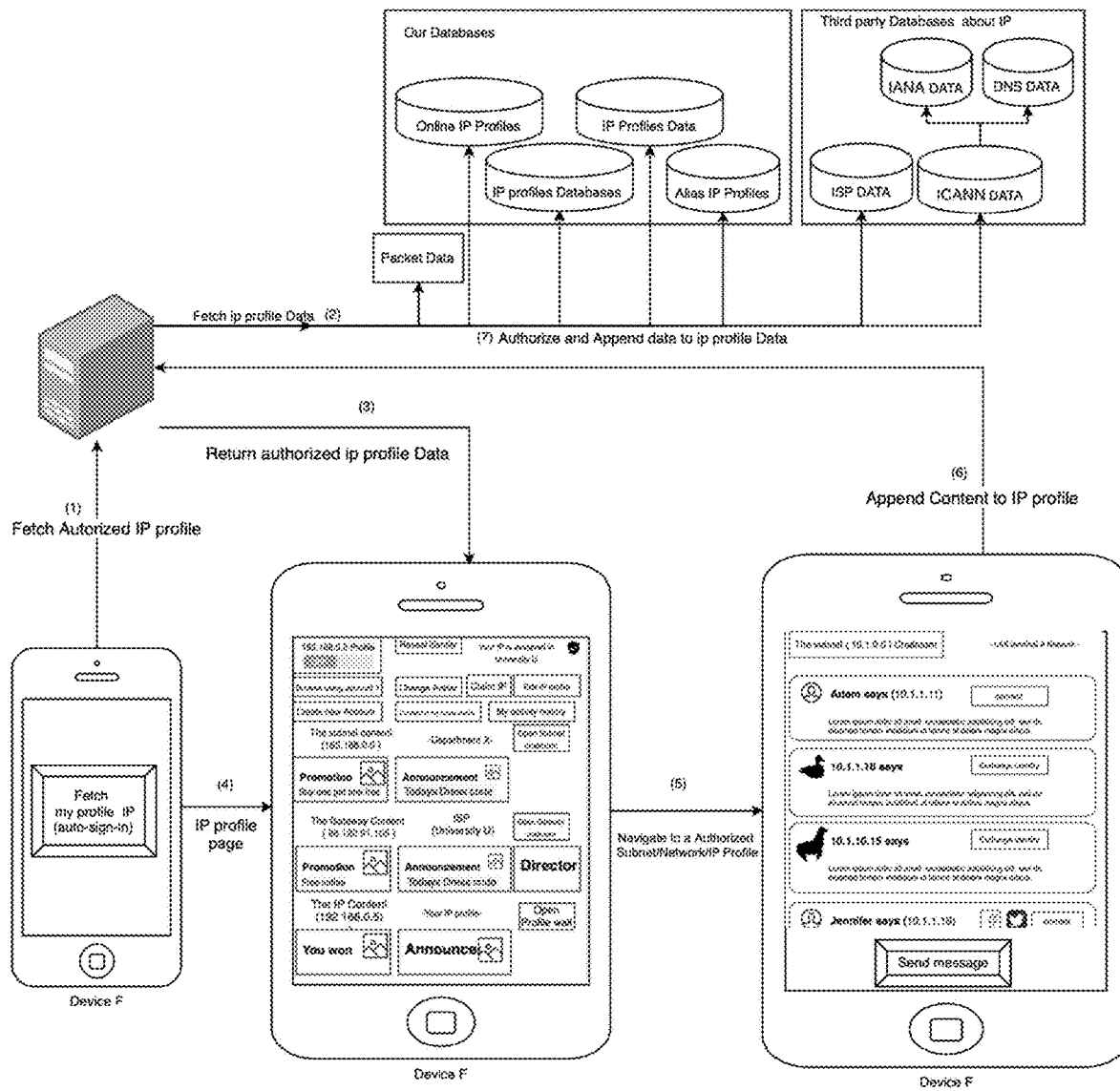
FIG. 21 illustrates steps in a sample process of auto-sign in and fetching the IP profile when connected to the network, according to various aspects of the present disclosure.

FIG. 21 illustrates steps in a sample process of auto-signing and fetching the IP profile when connected to the network, according to various aspects of the present disclosure. With reference to FIG. 21, the first step is (1) Fetching the authorized IP profile from the IP profile manager. (1) may be initiated by clicking a button or automatically right after receiving new IP or launching the application on the device (One approach described in flowchart FIG. 8 and FIG. 9). The second step (2) is to fetch authorized IP profile data by checking parameters in Packet Data, executing domestic databases (Online IP profiles, IP profile database, and their data, Aliases, etc.) queries, or executing queries on third party databases about IP (ICANN Data, ISP data, etc.). Once data is ready, the IP profile manager returns authorized IP profile data to the device F screen (4). The data is shown in a user interface like FIG. 18. The user of device F may manage or navigate to different IP or subnet IP profiles. For example, by checking the subnet profile's chatroom (5), the user may append content to the IP profile (6) and send a message to the chatroom so other devices in the same subnet profile may see it. IP profile manager receives the request to append data (6). The IP profile manager checks if the device is an authorized user of the IP profile and appends data to the appropriate database (7).

FIG. 22 is a schematic front view of a computing device that may include an application program for each IP profile to illustrate temporary ownership of the IP profile and passing ownership to different users when IP is given to different users, according to various aspects of the present disclosure. With reference to FIG. 22, the profile content is added by previous owners over time. In the sample diagram, profile 192.168.0.5 is shown when the device holding this IP is online as Adam. Adam has left a message today and last month. In this example, the author of the content only may manage (edit, delete, etc.) their own content that appeared on the page. As shown in this example, Adam previously used the same IP last month, and then Jane's device was given this IP so she could add content to the page. Jane chose to leave content privately or with restricted access so only future holders of the IP or specific accounts in her cycle may view the content. Her device released the IP, so it is signed out from the profile at some point, so the IP was given to Sara yesterday, and Sara also added her content to the page in private mode. Sara probably disconnected from the network and was given another IP instead of 192.168.0.5. So, Sara has released her control over this profile, and she may add content to her new profile and not 192.168.0.5. Then IP is given to Jenifer right after Sara, so from that moment, she is the one who may add content to the profile. Jenifer added her content in public mode so everyone may view her content (even those not authorized in the profile may peep on profiles, refer to examples in FIG. 25 and FIG. 26) when peeping into the profile happens (e.g., Limited access view, Overview, Metadata only). So, some content inside the page might be hidden from some viewers and be visible to others. The author may choose who will be able to view their content when content is being added to the profile. As shown in the diagram, the holder (owner) of the IP may choose to add content anonymously.

Figure 23:
FIG. 23 is a diagram illustrating an example of the ability to claim some IP profiles like corresponding internet protocols address to domain names and possibly manage them using alias IP based on FIG. 11, according to various aspects of the present disclosure.

FIG. 23 is a diagram illustrating an example of the ability to claim some IP profiles including but not limited to those corresponding "internet protocols address (IP)" to domain names and the possibility of managing them using alias IP based on FIG. 11 and FIG. 20, according to various aspects of the present disclosure. With reference to FIG. 23, the diagram also shows the ability to list the profiles based on the activity inside them. This example shows the most popular IP profiles and lists them for other online IP profiles to explore, peek and follow their activity if they are accessible (the profile might be restricted by the current IP Profile holder or IP Profile Manager). For example, in the LAX Subnet profile, the IP profile corresponding to the LAX website is managed using an alias device (FIG. 20). One benefit of using claimed IPs and managing them using aliases is that the content coming from the "flylax.com" profile may be treated as official content or verified message by LAX inside different profiles since LAX verifies this profile. Another benefit for claimed IPs (corresponding to domains) is using other IP characteristics, including but not limited to the geolocation nature of IP assignment, to list similar IPs, for example, all inside California or a specific region. For a similar reason, IP address range and IP address from a particular network may be seen and used as affiliation. For example, if the IP address is recognized as University U, embodiments may assume the user of the device is probably affiliated to the University U as a student, professor, employee or a campus visitor. And the IP corresponding to "usc.edu" may be treated as an official account for USC. Students may follow the statement by this profile in various IP profiles, including University U corresponding subnet profiles, with peace of mind.

Figure 24:
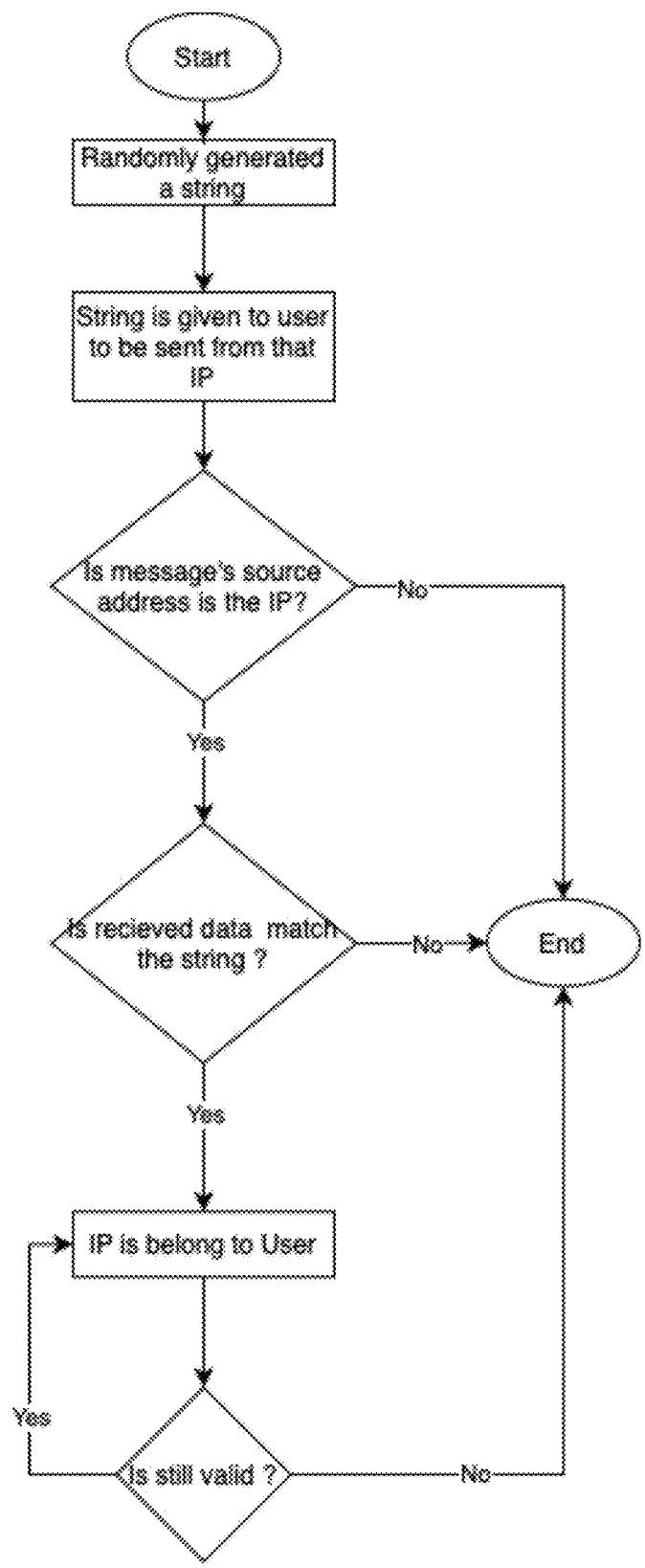
FIG. 24 is a flowchart illustrating a sample process of verifying IP ownership to initiate a claim or alias assignment, according to various aspects of the present disclosure.

FIG. 24 is a flowchart illustrating a sample process of verifying IP ownership to initiate a claim or alias assignment, according to various aspects of the present disclosure; with reference to FIG. 24, the random string is generated and given to the user and asked to be sent using the device holding that IP. The Profile manager (IP Profile Manager in FIG. 21 for IP profiles) will listen to a message from the IP (Source), and once it receives the matched string, the verification is completed. Otherwise, if the message is not received in a specific period, it will be rejected.

With reference to FIG. 24, IP may stay verified for a specific period and expire after that, so if it is used as an alias, it will be expired too. If a new verification comes inside this period, some embodiments may abandon the previous one and renew the verification or verify the IP for the new requester. IP profile manager may decide how long this verification and associated alias stay valid.

With reference to FIG. 24, some embodiments may use the described process continuously every t second automatically by sending messages or ping requests using client embodiment or application installed on the device as "heartbeat." Once one or more rounds of the process are described in FIG. 24 failed some embodiments may expire some or all of given authorizations. Some embodiments may send encryption and decryption to ensure the data is sent by embodiment and not unauthorized embodiment.

With reference to FIG. 24, some embodiments may use a ping request or an empty request without any message on some occasions because some embodiments are only concerned about the source of the request. However, also checking verifiable messages as an extra level of percussion in case, by coincidence, the unrelated request is coming from the source. Reviewing the record of the IP manager like DHCP, router, or ISP may be used to verify IP ownership by a specific device. Device MAC address is one way to identify the device as the owner of IP.

Figure 25:
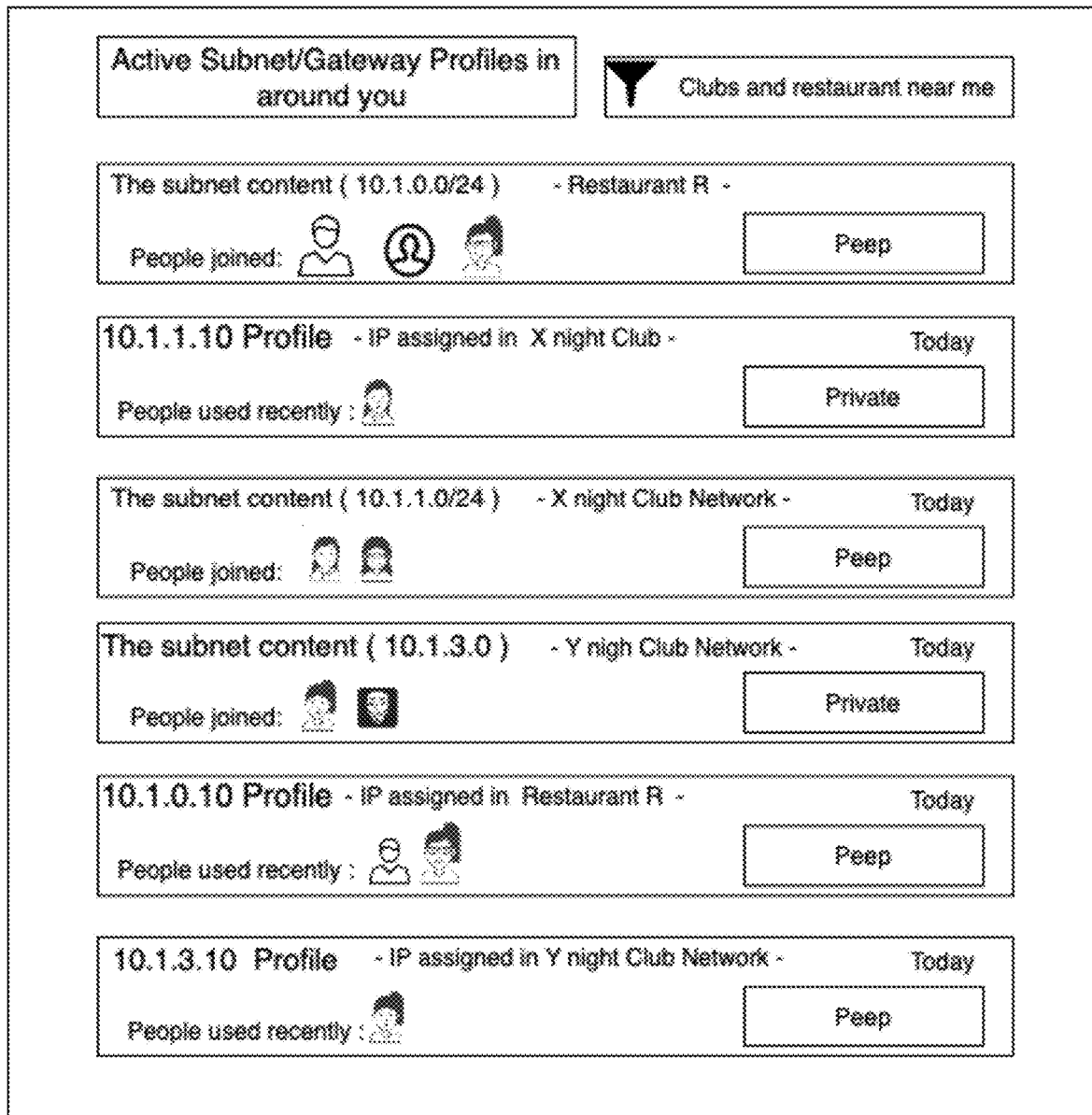
FIG. 25 is a diagram illustrating an example using IP Metadata and assignment information, including geolocations, to list active profiles related to the device's IP profile, according to various aspects of the present disclosure.

FIG. 25 is a diagram illustrating an example, using IP Metadata and assignment information, including geolocations to list active profiles related to the device's IP profile, according to various aspects of the present disclosure. IPs are assigned according to the standard, and also some embodiments may get more information related to the IP from different sources. Some embodiments may fetch the related data as described in FIG. 21 and filter IP profiles based on any of the information related to IP.

With reference to FIG. 25, this example filters all profiles belonging to IPs assigned in clubs and restaurants in a specific region. Night club X, Y, and restaurant R subnet/gateway profiles and some public individual IP profiles in those locations are listed in this example. For each profile, contributors or those who used those IP profiles and were given IP in their range or that IP is shown.

Figure 26:
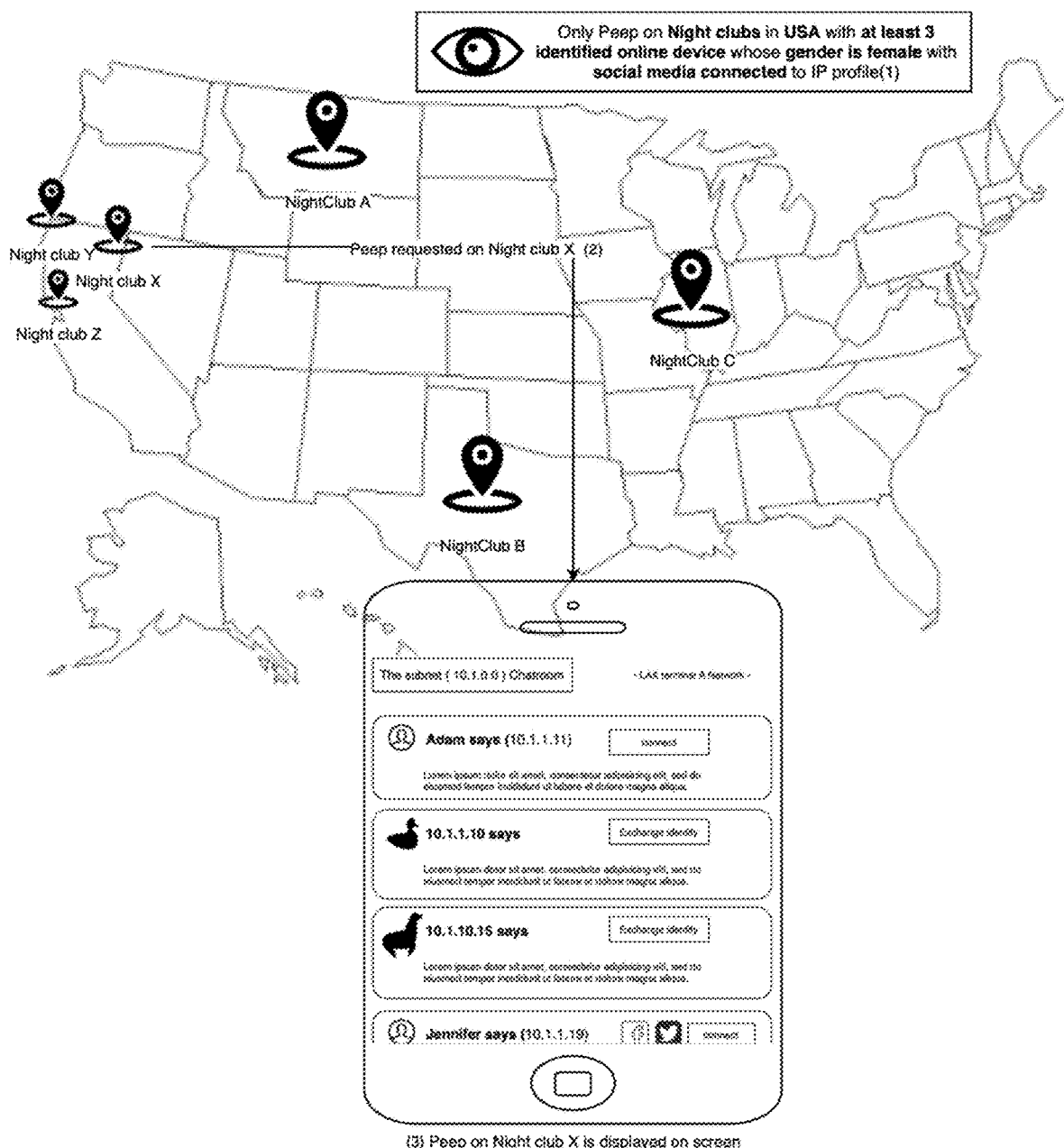
FIG. 26 is a schematic front view of a computing device that may include an application program for peeping on the collection of profiles filtered by a parameter, according to various aspects of the present disclosure.

FIG. 26 is a schematic front view of a computing device that may include an application program for peeping on the collection of profiles filtered by a parameter, according to various aspects of the present disclosure. Parameters include but are not limited to profile content, IP holders, managing accounts or related public IP metadata and information like geolocation data.

With reference to FIG. 26, the user requested to visualize the online profiles based on the geolocation and only shows those with at least 3 identified online devices with the female user who is online with connected social media to their profile. The qualified profiles are shown on the map, including nightclubs X, Y, Z, A, B, and C. The user may click on each one, peep at the profile, and see the overview, part, or all content inside the profile. Here the user is clicked on Night club X, and the content is listed on the screen. The user might see a part/all of the people currently in the network.

FIG. 27 illustrates a sample approach to map IPs to human-friendly versions or hide IPs from users for security or simplicity reasons, according to various aspects of the present disclosure. With reference to FIG. 26, the IP information is stored in the database to be used by Profile manager to handle IP profiles. The profiles would be listed as human-friendly names. For example, instead of showing (107.3.1.10/24>10.1.1.1/24) as UNIVERSITY_U_DEPARTMENT_X is used as the name for this profile. The names are built using the function "Build_name ( )". The name builder might use different information, including related IP information, to construct appropriate names describing the profile or use random names to name profiles. Multiple name builders might be used for a different set of profiles. The name builder may dynamically change the name based on the situation. Some embodiments may use multiple hash functions for different profiles to generate hash ids. The hash id corresponding to each profile might dynamically change over time.

II. Method of Authorization into Profiles Based on Related Standardized Identification Associated with Product The method of authorization into profiles based on related standardized identification associated with products is described below. Most Products include but are not limited to hardware, software, food, clothes, and any other item you may buy from a store provided with some kind of public product ID. For example, usually, you may find a barcode on a product representing the product ID. However, product IDs may be hacked on hardware like a simple number or text.

Figure 28:
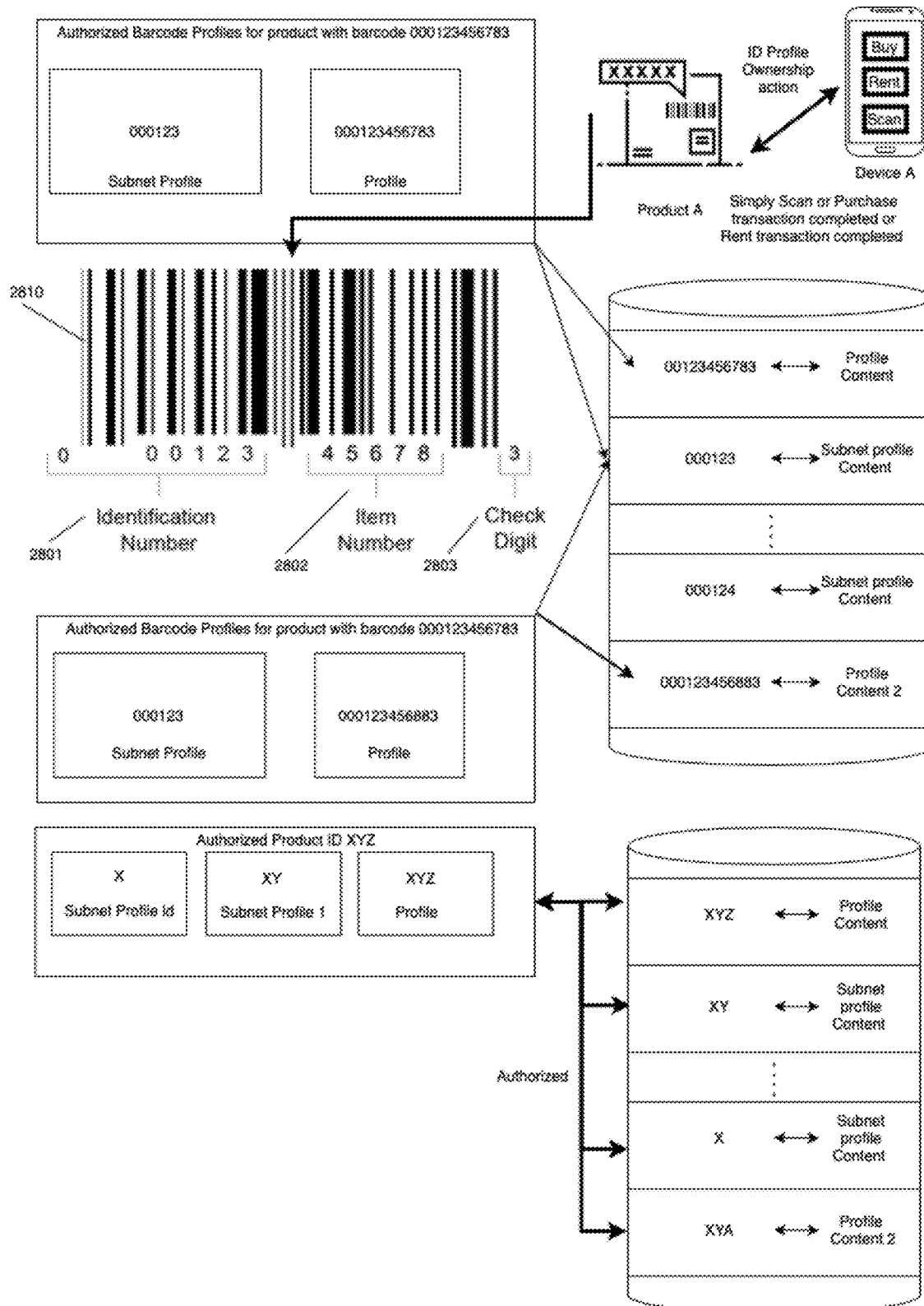
FIG. 28 illustrates an example of a method of authorization into profiles based on related standardized public identification associated with products, according to various aspects of the present disclosure.

FIG. 28 illustrates an example for a method of authorization into profiles based on related standardized public identification associated with products, according to various aspects of the present disclosure. The example of FIG. 28 shows how a standardized product identification such as a barcode may be used to provide access to a hierarchy of profiles based on the barcode value. A barcode 2810 may represent different entities according to a standard, and a barcode may include multiple sections 2801-2802 to describe a specific product. For example, the identification number 2801 may represent an organization identification, the item number 2802 may represent a product in that organization, and the check digit 2803 may be used to make sure a barcode reader may correctly read the barcode, and the barcode is a valid barcode.

With reference to FIG. 28, the present embodiments, once at least one of profile ownership event is completed for this barcode, some embodiments may authorize the access to three profiles associated with this ID automatically may authorize the access to two profiles associated with this barcode, organization identification subnet profile, the item number profile. This example may provide group nature features like a chatroom, forum, or thread for organization identification profile and provide page nature features including but not limited to profile pages, profile pictures, profile setting, bio description and etc.

With reference to FIG. 28, the product ID profile ownership event may be purchasing transaction, product rental transaction, or even simply scanning the barcode on the product. Each event may authorize access to the same or different product ID profile. For example, some embodiments may have a separate view (different user interface with different features) for the product owner, authorized by the purchase event, and for the scanner, who simply scanned the barcode on the product directly. Some embodiments may define the scanner's profile ownership as the last person who scanned the barcode of the product ID.

With reference to FIG. 28, standardized product identification numbers (IDs) may be in a different format based on the product category, but they are usually made of multiple sections. Each section may narrow down from a global identification number to a specific item from a particular product from a particular brand. There might be multiple identification numbers representing the product in different standards.

With reference to FIG. 28, the standardized product identification XYZ consists of three main sections. If the X part specifies the organization ID, the Y part specifies the product ID, and the Z part identifies the specific item of the particular product. So, once at least one profile ownership event is completed for this ID, some embodiments may automatically authorize access to three profiles associated with this ID. A group nature (subnet) profile for X, another group nature (subnet) profile for XY, and finally, a profile page for XYZ. Each profile may have different functionality. Some unique standardized identifications may have fewer or more sections, but this does not change the process.

With reference to FIG. 28, for example, the standardized hierarchical identification XYZ described above may be created by the profile manager as a virtual standardized hierarchical identification and assigned to the entities base on specific logic including, but not limited to, location, affiliations, gender, mutual interest, favorite movies or virtual assets, etc. The profile manager may use the generated virtual standardized hierarchical identification for authorizations and content management in authorized profiles as described using the present invention. The generated network may be used as a communication and social networking platform among the entities with that virtual standardized hierarchical identification. Profile ownership event (as described for standardized product identification) for the virtual standardized hierarchical identification may be defined in the desired way. The virtual standardized hierarchical identification may be generated similarly to the IP structure but assigned customized, so a completely different network with customized characteristics may be built. When extended to IP addresses described in the previous section, the virtual standardized hierarchical identification concept creates a network of IP profiles based on virtual IP addresses using a Virtual DHCP server assigning IP addresses in the desired mechanism.

Figure 29:
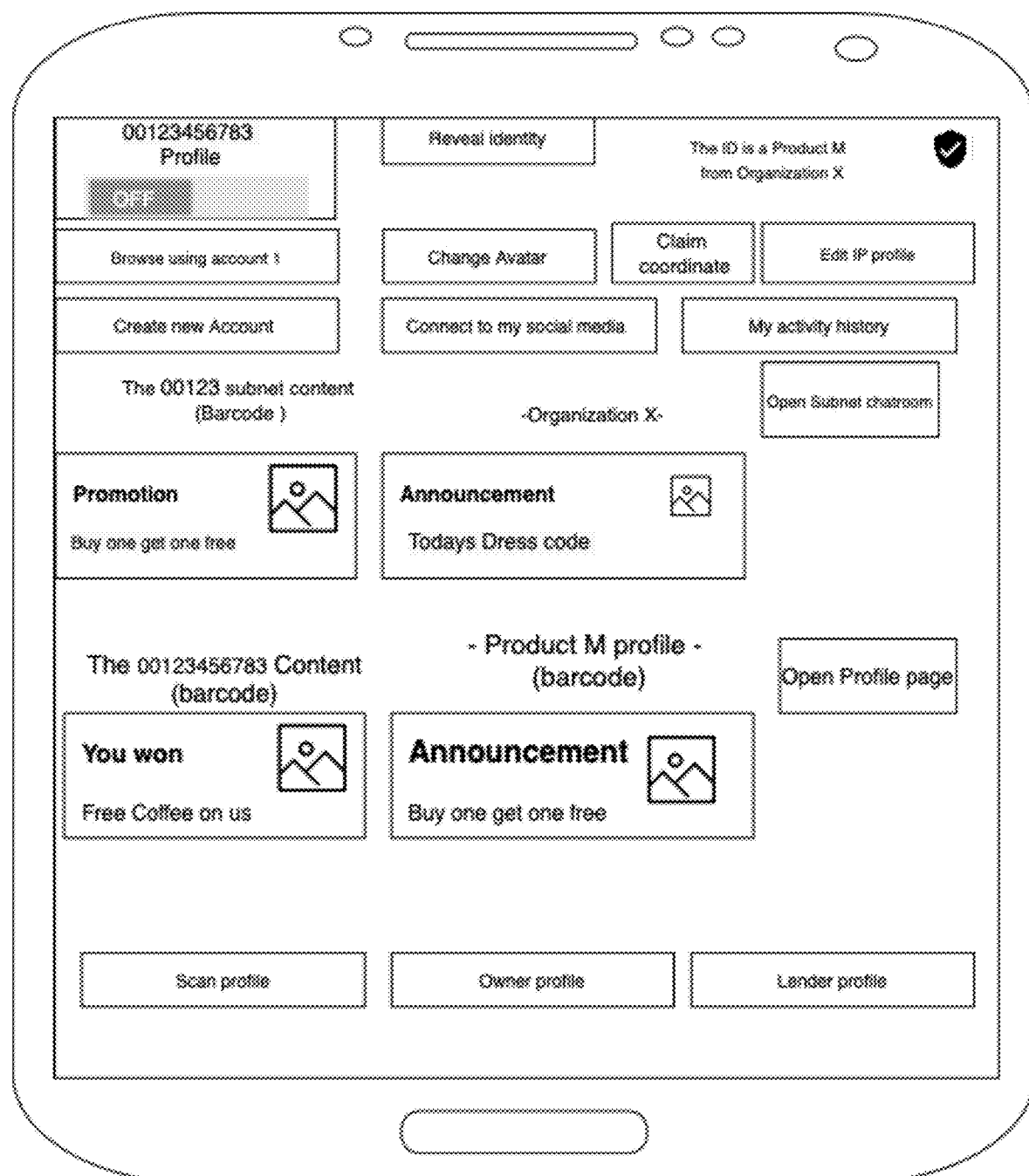
FIG. 29 is a schematic front view of a computing device that may include an application program for a sample product identification profile after a device is authorized automatically once at least one profile ownership event is completed based on FIG. 28, according to various aspects of the present disclosure.

FIG. 29 is a schematic front view of a computing device that may include an application program for a sample product identification profile after a device is authorized automatically, once at least one of profile ownership event is completed based on FIG. 28, according to various aspects of the present disclosure. All authorized ID/Organization Subnet profiles on device A is shown in the sample user interface in the diagram. Each Profile may list some content, including but not limited to promotions, announcements, maps, opinions, reviews, etc. This content may be listed through the ID profile manager based on the value of the ID, the ID's section values, and the standard applied to ID sections. With reference to FIG. 29, since multiple item IDs with the same organization identification number exist, they may be treated as groups or rooms. Hence, group nature features, including but not limited to chatrooms and forums, may be defined for these profiles. For example, in the diagram, the user of device A may open a chatroom with all devices authorized with barcodes with the same organization number in them. On the other hand, the item ID profile is more associated with more individual nature features like a page (ID Profile page). The social media features may be defined for all devices inside the same organization subnet profiles.

With reference to FIG. 29, the user of the device may manage the ID profile belonging to their ID as long as it is still the owner of the ID (based on ownership event). For example, for scanning ownership event, once someone else scans the ID on product the product profile ownership passed to the new scanner, so the previous owner cannot manage or do an activity as ID profile owner anymore unless she may use the barcode again. In the case of a purchase ownership event, the profile owner is passed to the buyer once the transaction is completed or ownership is verified in alternative ways. Similarly, some embodiments may pass the ownership to the new lender as a rent ownership event.

With reference to FIG. 29, By default IP profile may be offline, and the user decides to go Online and be visible to other devices in specific or all group nature ID profiles. Also, by default, the user of the ID profile might be anonymous and unknown, or it is known, but the user decides to stay anonymous while using the ID profile. However, the user might choose to reveal their identity whenever they desire. The sample user interface shows that the ID profile might be populated with more user-friendly information from ID mete data, the Internet data about the product, or any third-party entity involved in ID assignment. For example, some embodiments may recognize that ID is a product of Organization X.

With reference to FIG. 29, the user of the ID profile may connect their profile with any third-party account as long as they have access to that profile. For example, they may connect any of their social media or affiliated accounts so that their activities would have traces of their social media in them. For example, when using their social media X account to add some announcement to the ID profile page, it may show a link to their social media profile on top of the announcement. Or the user may change the ID profile picture or avatar to their desired personal or non-personal one. The user may save these setups as accounts. For example, they might define an account with no identity and just select an avatar for the profile picture, another account connected to their university verified email, and another one attached to social media X. The user may use any of the previous accounts or create a new one while they are online in their ID profile. In this case, for example, as shown in FIG. 29 in more detail, other devices may view the device differently based on the user's account while using the ID profile. Some embodiments may have a database and a verification method like account ID and pin or password similar to regular online accounts to access these accounts. However, having these accounts are optional, and the user may always setup their desire way through the ID profile as long as they are still the holder (owner) of the ID.

Figure 30:
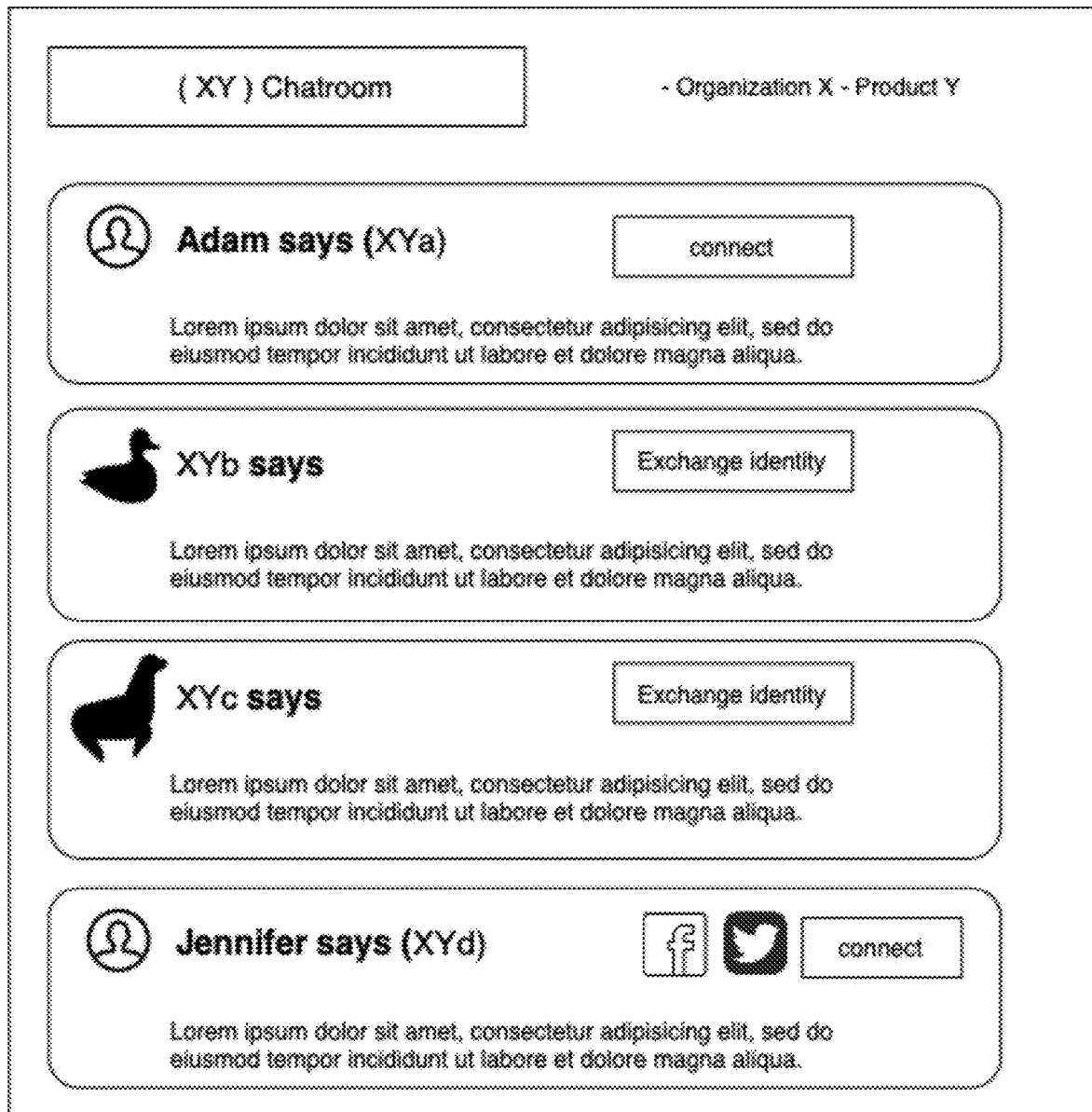
FIG. 30 is a schematic front view of a computing device that may include an application program for a sample group chatroom for authorized devices with hierarchical standardized product Identification to communicate and possible exchange identities, according to various aspects of the present disclosure.

FIG. 30 is a schematic front view of a computing device that may include an application program for a sample group chatroom for authorized devices with hierarchical standardized product Identification to communicate and possibly exchange identities, according to various aspects of the present disclosure. FIG. 30 illustrates a sample user interface of a chatroom as a group nature feature example for an organization subnet profile (XY) from XYZ product identification number point of view, with reference to FIG. 28. There are four devices online (different IDs) in this organization's subnet profile. Two devices already revealed their identity, and the last one connected her social media to her profile. Two other messages were sent in anonymous (default) mode with different avatars or pictures set up as their profile picture. The XY profile is populated with information about the product identification ID. For example, the XY profile is about all those authorized with a product ID of product Y from organization X.

With reference to FIG. 30, Adam is authorized with the product id of XYa and Jennifer with XYd. There are two other product ID profiles associated with XYb and XYc are online in anonymous mode, With reference to FIG. 30, Adam or Jenifer may decide to send some message without using an identified account at any given time by changing or disconnecting it from their ID profile data or simply changing their account to anonymous if they are using saved accounts. Any device in the organization ID subnet might request identity exchange or go public if an account is anonymous or a specific identity is not provided. On the other hand, those in anonymous mode might decide to reveal their identity to the particular identified device or stay anonymous from others. The exchange might happen in a one-way or two-way mechanism. The simultaneous two-way identity exchange is shown in FIG. 14, and it only may be done if both sides have the identity verified beforehand.

III. Method of Authorization into Profiles Based on Related Geolocation Coordination Associated with A geographic coordinate system (GCS) is a coordinate system associated with positions on Earth (geographic position). In geodetic coordinates and map coordinates, the coordinate tuple is decomposed such that one of the numbers represents a vertical position and two of the numbers represent a horizontal position. For example (37.287319, −121.947231) is a position on earth.

The shortest distance (the geodesic) between two given points P1=(lat1, lon1) and P2=(lat2, lon2) on the surface of a sphere with radius R is the great circle distance. It may be calculated using the formula:

$$\text{dist}=\arccos(\sin(\text{lat}_1)\cdot\sin(\text{lat}_2)+\cos(\text{lat}_1)\cdot\cos(\text{lat}_2)\cdot\cos(\text{lon}_1-\text{lon}_2))\cdot R$$

Suppose places within a distance r=1000 km from M=(lat, lon)=(X rad, Y rad) are to be found. The formula is something similar to below:

$$a\cos(\sin(X)^*\sin(\text{Lat})+\cos(X)^*\cos(\text{Lat})^*\cos(\text{Lon}-(Y)))^*6371<=r$$

Any coordinate with (Lat, Lon) values that satisfy the equation above is part of the vicinity profile. A circle with radius r may be assumed when places are found within a distance from the coordinate, as shown in FIG. 31.

Figure 31:
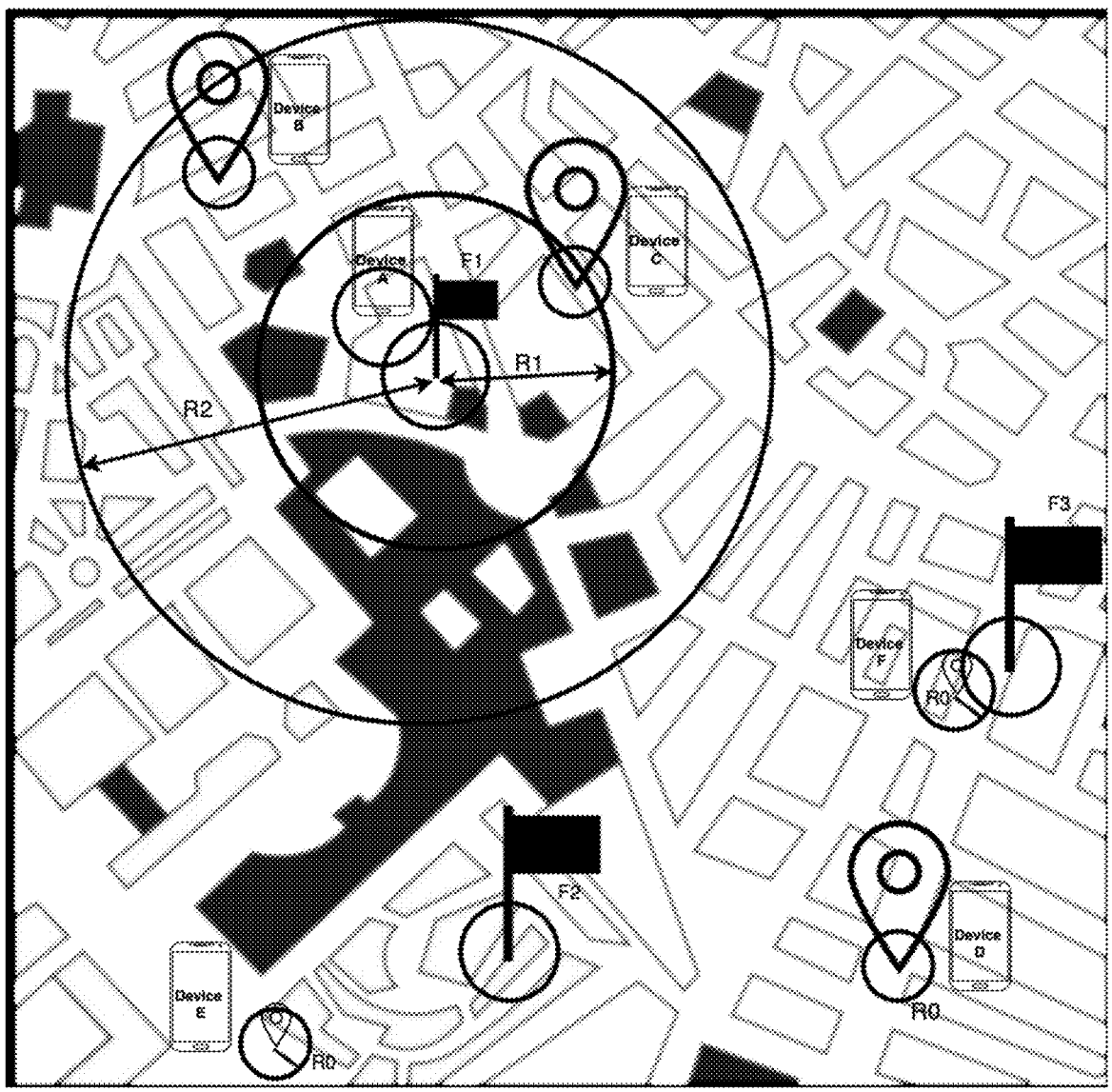
FIG. 31 illustrates an example of the method of authorization into profiles based on related geolocation data associated with the device, according to various aspects of the present disclosure.

FIG. 31 illustrates an example for the method of authorization into profiles based on related geolocation coordination associated with the device, according to various aspects of the present disclosure. The example of FIG. 31 shows how device A in specific geodetic coordinates may be used to provide access to a hierarchy of profiles based on the coordinate value.

With reference to FIG. 31, some embodiments may define profile R0 as the coordinate profile, which is a circle with the minimum radius around a given coordinate. Then R1 profile is circled with the second minimum radius (r=R1) around the given coordinates until The Rn profile is a circle with the biggest radius (r=Rn) around the given coordinates. For this example, let's assume only three levels of profiles: R0 profile, R1 profile, and R2 profile.

With further reference to FIG. 31, some embodiments may define a set of Flagged coordinates. These coordinates are coordinate profiles with only one owner in a given time, and the ownership is passed to other devices when the coordinate profile ownership entrance event occurs. For example, some embodiments may define coordinate profile ownership entrance event as the newest device entered into the R0 vicinity of a flagged coordinate. However, the event may be defined differently. So, the device may manage and add content to the coordinate profile as long as she is still the last person entered into the R0 vicinity of a flagged coordinate. R1 and R2 profiles are profiles with group nature features. So, all devices in the R1 vicinity of the flagged coordinate have access to the R1 profile of a flagged coordinate. Similarly, for the R2 profile of a flagged coordinate. Since R2 vicinity has a bigger radius than R1, it covers more area and probably more devices but at longer distances.

With reference to FIG. 31, flagged coordinates are a set of coordinates with associated coordinate profiles and may be selected in different strategies. Some embodiments may choose them in random, specific coordinates so that the R0 vicinity of all selected coordinates covers all areas. An organization or person may request the flagged coordinate for the desired coordinate to generate the vicinity profiles in the profile network.

With reference to FIG. 31, some embodiments may define a minimum distance between flagged coordinates and may set the minimum to R0 too. This avoids having many profiles too close together.

With reference to FIG. 31, "Device A" is currently the owner of coordinate profile F1 because it is the only device in the R0 vicinity of Flagged coordinate F1. So "Device A" is currently authorized to manage and add content to the F1 coordinate profile and use page features of the R0 profile. "Device A" and "Device C" are both in the R1 vicinity of Flagged coordinate F1 so that they may use group nature features defined for the R1 profile. "Device B" is not authorized in the Flagged coordinate R1 profile because it is not in the R1 vicinity of F1, so it is not part of the R1 profile of the F1 coordinate. Device "Device A" along with "Device B" and "Device C" all are in the R2 vicinity of Flagged coordinate F1, so they may use group nature features defined for the R2 profile. So, on the "Device C" screen, the F1 coordinate's R1 and R2 profiles are listed as authorized profiles, not the F1 coordinate profile page itself (R0 profile of F1). And with the same logic "Device B" screen include only R2. If "Device C" goes closer to coordinate F1, once it enters the R0 vicinity of F1, then "Device C" would be the last device to enter F1's R0 vicinity. The ownership of the F1 coordinate profile page is passed to "Device C" (if the ownership event is defined this way), and from that moment, "Device A" cannot manage the F1 coordinate profile page anymore.

With reference to FIG. 31, "Device F" is in the R0 vicinity of F3, so she is the owner of the F3 coordinate profile page (R0 profile of F3) and is currently managing it. The "Device E" is not authorized to any coordinate profile in the diagram. If "Device E" goes closer to coordinate F3, once it enters the R0 vicinity of F3, it takes the ownership of F3 coordinate profile page (R0 profile of F3).

Some embodiments may use an alternative "profile ownership event" to pass ownership to the next qualified Device. For example, some embodiments may give a specific time limit to each device in a first-come, first-serve order before passing the ownership to the next when multiple devices enter the R0 vicinity of a specific flagged coordinate.

Figure 32:
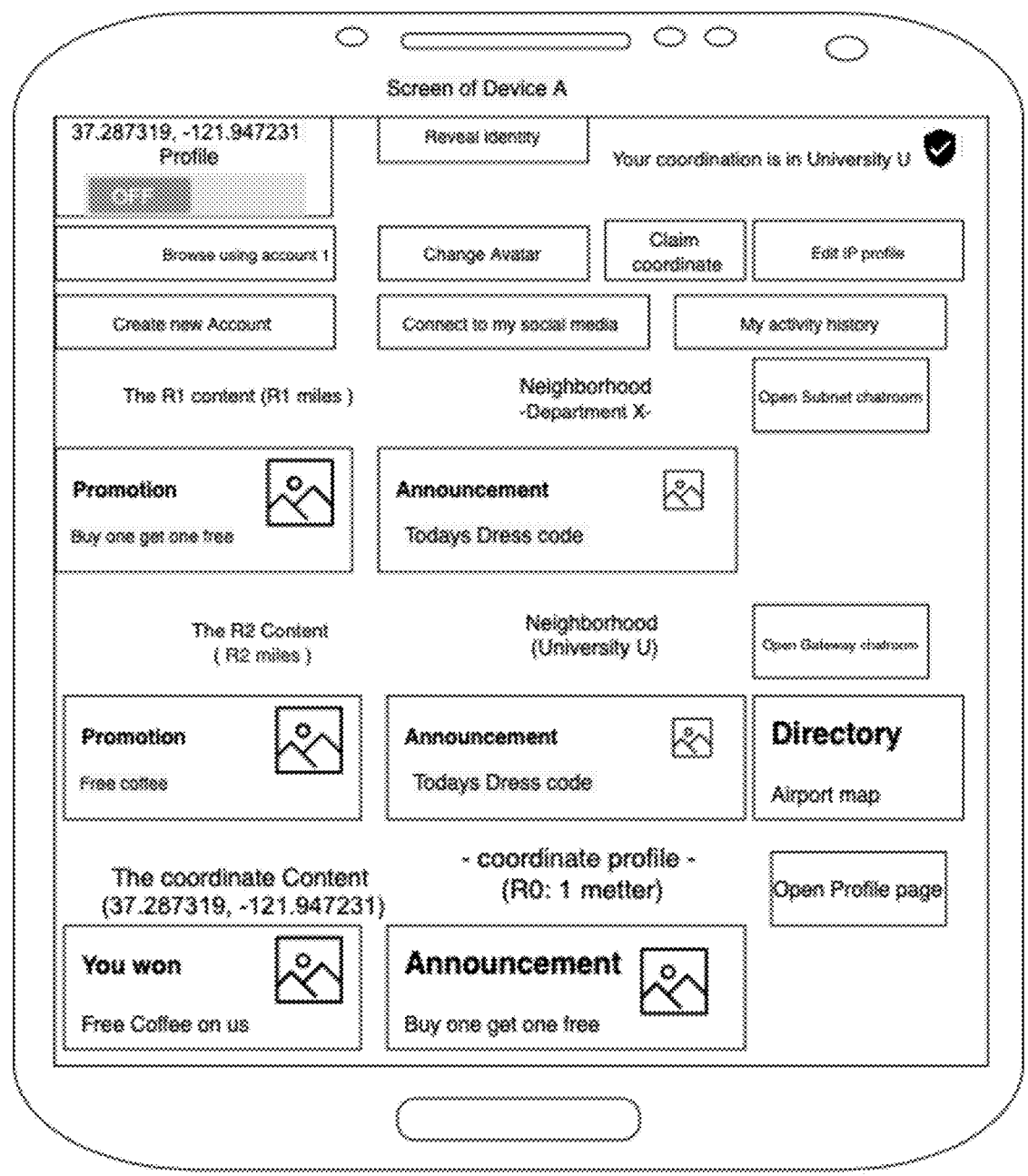
FIG. 32 is a schematic front view of a computing device that may include an application program for sample geolocation coordinate profile after a device is authorized automatically once at least one profile ownership event is completed based on FIG. 30, according to various aspects of the present disclosure.

FIG. 32 is a schematic front view of a computing device that may include an application program for sample geolocation coordinate profile after a device is authorized automatically, once at least one of profile ownership event is completed based on FIG. 31, according to various aspects of the present disclosure. All authorized Rn coordinate profiles on device A is shown in the sample user interface in the diagram. Each Profile may list some content, including but not limited to promotions, announcements, maps, interactive content, etc. This content may be listed through the Coordinate Profile Manager based on the current coordination of devices, the values corresponding to each Ri, and the standard applied as a coordinate profile ownership event. With reference to FIG. 32, since multiple devices may exist within each R1 or R2 coordinate profile, they may be treated as groups or rooms, so group nature features, including but not limited to chatrooms and forums, may be defined for these profiles. For example, in the diagram, the user of device A may open a chatroom with all devices authorized within the R2 vicinity of coordinate F1. On the other hand, the R0 profile is more associated with more individual nature features like a page (coordinate profile page). Most social media features may be defined for all devices inside the same Rk (k>0) coordinate profiles.

With reference to FIG. 32, the user of the device may manage the F coordinate profile page as long as it is still the owner of the coordinate profile and in R0 vicinity of F (based on ownership event). For example, for "last entrance ownership event," once someone else entered the R0 vicinity of F, the F coordinate profile ownership will be passed to the newly entered device, so the previous owner cannot manage the profile anymore unless she exits the R0 vicinity and comes back later again. Some embodiments may define a minimum period between reclaiming the same profile.

With reference to FIG. 32, By default coordinate profile may be offline. The user may decide to go Online and be visible to other devices in specific or all group nature Rk profiles (k>0 in example setup). Also, by default, the user of the flagged coordinate profile might be in anonymous and unknown mode, or it is known, but the user decides to stay anonymous while using the coordinate profile. However, the user might select to reveal their identity whenever they desire. The sample user interface shows that the coordinate profile might be populated with more user-friendly information from coordinate mete data, the Internet data about the coordinate's location on earth, or any third-party entity involved in the coordinate assignment. For example, some embodiments may recognize that the flagged coordinate is a specific building (Department X) or in a particular neighborhood (University U) or particular store.

With reference to FIG. 32, the user of the coordinate profile may connect their profile with any third-party account as long as they have access to that profile. For example, they may connect any of their social media or affiliated accounts so that their activities would have traces of their social media in them. For example, when using their social media X account to add some announcement to the coordinate profile page, it may show a link to their social media profile on top of the announcement. Or the user may change the coordinate profile picture or avatar to their desired personal or non-personal one. The user may save these setups as accounts. For example, they might define an account with no identity and just select an avatar for the profile picture. Another account connected to their university verified email, and another connected to social media X. The user may use any previous accounts or create a new one while online in a coordinate profile. Whit reference to FIG. 32 in more detail, the device may be visible in a different way from other devices' view, based on the account that is used by the user while using the coordinate profile. Some embodiments may have to have a database and a verification method like an account ID and pin or password similar to regular online accounts to access these accounts. However, having these accounts are optional. The user may invariably set up their desired way through the coordinate profile as long as they are in the R0 vicinity of a flagged coordinate.

Circles are considered for creating vicinity profiles as described above. Still, using coordinate and appropriate formula, the vicinity may be defined in any shape or format, such as squares.

Figure 33:
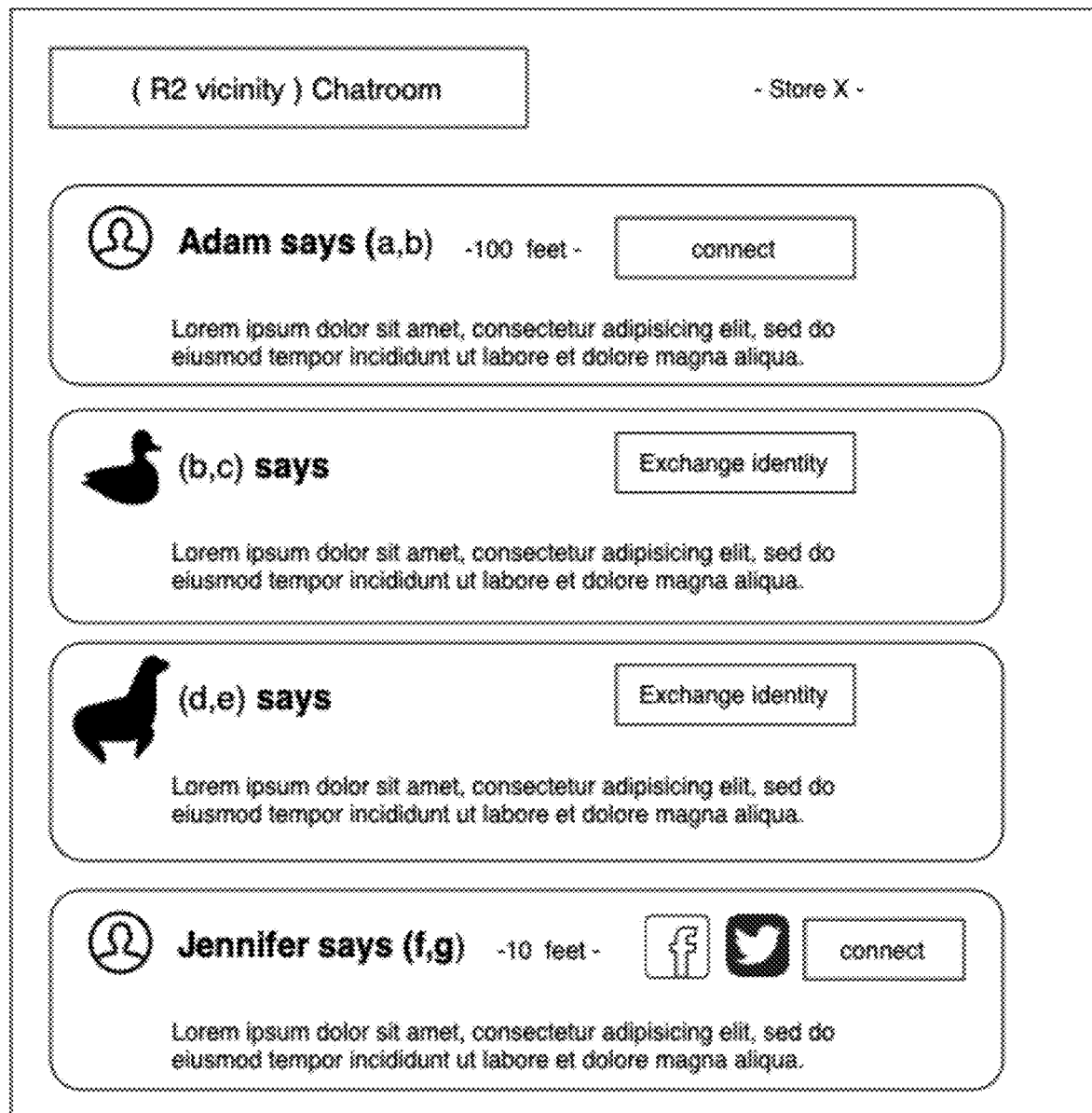
FIG. 33 is a schematic front view of a computing device that may include an application program for a sample group chatroom for authorized devices with geolocation data associated with the device to communicate and possible identities exchange, according to various aspects of the present disclosure.

FIG. 33 is a schematic front view of a computing device that may include an application program for a sample group chatroom for authorized devices with geolocation data associated with the device to communicate and possible identities exchange, according to various aspects of the present disclosure. FIG. 33 illustrates a sample user interface of a chatroom as a group nature feature example for a Ri (i>0 in described example setup) "coordinate profile."

With reference to FIG. 33. There are four devices online (different Devices in Ri vicinity of F) in this Ri coordinate profile. Two devices already revealed their identity, and the last one connected her social media to her profile. Two other messages were sent in anonymous (default) mode with different avatars or picture setups as their profile picture. The Ri coordinate profile for F is populated with information about the coordinate data. For example, F is about to be the Store X in this example, this profile is about all those in less than Ri vicinity of Store X.

With reference to FIG. 33, Adam is authorized with the coordinate value of (a, b) and Jennifer with (f,g). The two other devices authorized in the coordinate profile associated with (b, c) and (d, e) are online in anonymous mode, the user may hide the coordinate from others. The distance from the profile viewer may be provided based on authorized device coordinates. For example, Adam is 100 feet from this device.

With reference to FIG. 33, Adam or Jenifer may decide to send some message without using an identified account at any given time by changing or disconnecting it from their coordinate profile data or simply changing their account to anonymous if they are using saved accounts. Any device in the Ri vicinity coordinate profile of F might request identity exchange or go public if an account is anonymous or a specific identity is not provided. On the other hand, those in anonymous mode might decide to reveal their identity to a particular identified device or stay anonymous from others. The exchange might happen in a one-way or two-way mechanism. The simultaneous two-way identity exchange is shown in FIG. 14, and it only may be done if both sides have the identity verified beforehand.

Figure 34:
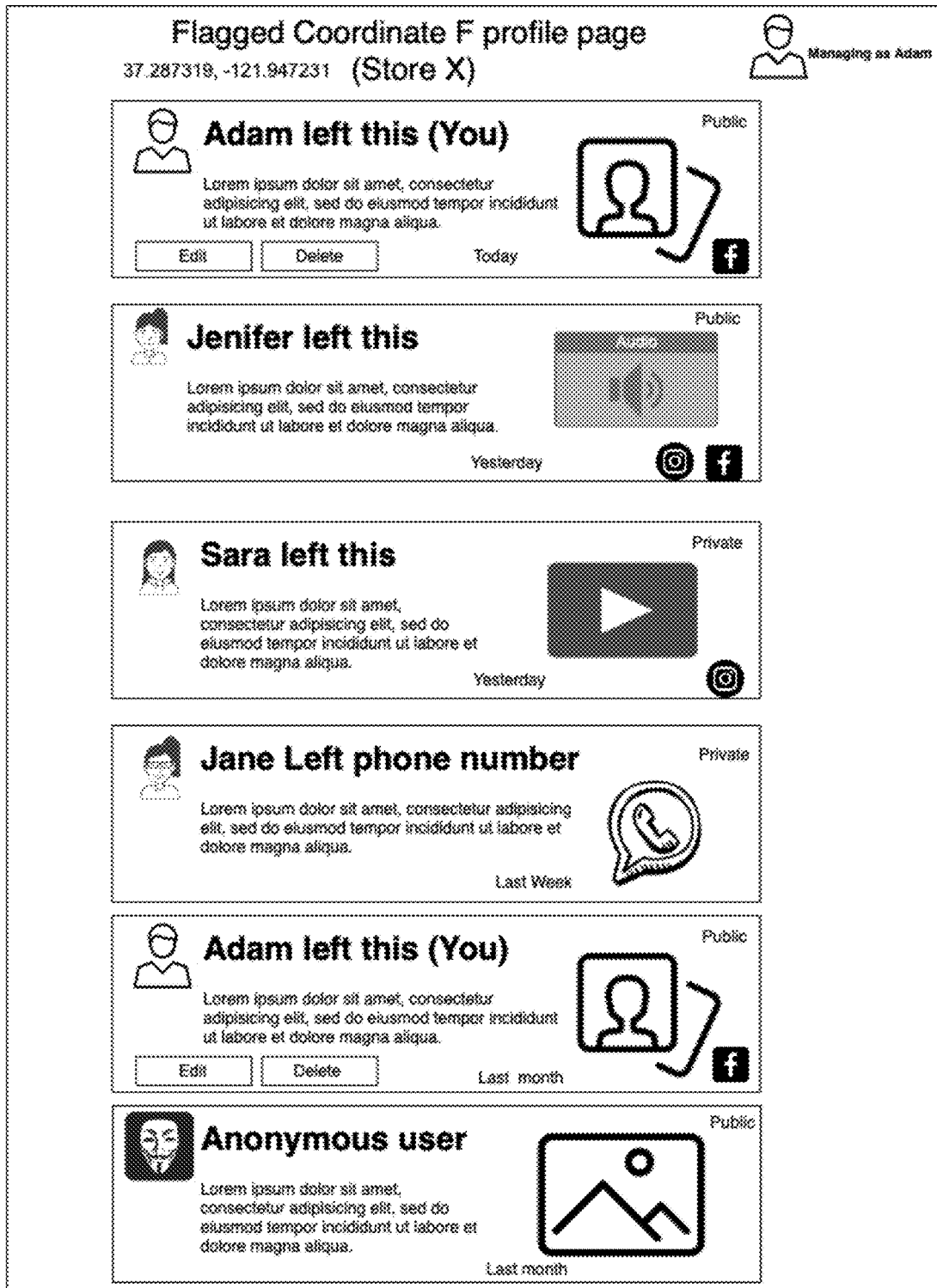
FIG. 34 is a schematic front view of a computing device that may include an application program for each coordinate profile to illustrate temporary ownership of the coordinate profile and passing ownership to different users when the flagged coordinate is given to different users, according to various aspects of the present disclosure.

FIG. 34 is a schematic front view of a computing device that may include an application program for each coordinate profile to illustrate temporary ownership of the coordinate profile and passing ownership to different users when the flagged coordinate is given to different users, according to various aspects of the present disclosure. With reference to FIG. 34, the coordinate profile content is added by previous owners over time. In the sample diagram, the coordinate profile page for flagged coordinate F is shown at the time the device holding this coordinate is online as Adam. Adam has left a message today and last month. In this example, the author of the content only may manage (edit, delete, etc.) their own content that appeared on the page. This example shows that Adam was previously authorized as the F coordinate profile page owner last month. Then Jane's device entered the R0 vicinity of coordinate F, and ownership of this coordinate was given to her so she could add content to the page. Jane chose to leave content privately or with restricted access so the only future owners of the coordinate F or specific accounts in her cycle may view the content. Her device released the coordinate profile once it exited from the R0 vicinity or someone else entered to R0 vicinity of the coordinate, so it was signed out from the coordinate profile at some point. Then the coordinate was given to Sara yesterday, and Sara added her content to the page in private mode. Sara probably exited from the R0 vicinity of coordinate F and entered another R0 vicinity of the flagged coordinate (F2). So, Sara released her control over this F coordinate profile page and gained access to the F2 coordinate profile page so she may add content to her new F2 profile and not F. Then, coordinate F is given to Jenifer right after Sara, so from that moment, she is the one who may add content to the profile. Jenifer adds her content in public mode so everyone may view her content (even those not authorized in the profile may peep on profiles) when peeping into the profile happens (e.g., Limited access view, Overview, Metadata only). So, some content inside the page might be hidden from some viewers and visible to others. The author may choose who will be able to view their content when she adds content to the profile. The holder of the coordinate profile may choose to add content anonymously, as shown in the diagram. The coordinate profile page may be populated with information related to the coordinate from different sources. For example, the corresponding location for coordinate F is Store X.

IV. Type of Contents in Profiles and Content Formatting and Filtering for Various Utilities There are different types of content (404 and 604) that may be augmented to a profile's contents. Some contents illustrated or described in the previous sections include messages, posts, announcements, conversations, or opinions about different topics by different profile owners.

Profile content may be designed, structured, and presented as collaborative games, collaborative content creation, or interactive or collaborative content in which a set of multiple profile owners contribute or participate. The profile owners may be the sequence of particular profile owners over a specific time period or a group of profile owners accessing a subnet profile with group-level features at a given time. These collaborative contents may be used in IP profiles described in Section I, ID profiles described in Section II, coordinate profiles described in Section III, or the standardized hierarchical identification profiles in XYZ format. For example, collaborative content may be a story, document, or review written by temporary owners of a particular profile. The profile content may be a multiplayer interactive challenge or a game that may be completed by augmenting content or user interactions in multiple steps by one or more profile owners.

When contents (404 and 604) are filtered or structured in a particular format, social networking platform may be used for a specific application or utility. Some utilities are described here.

First, to use present embodiment as a dating application, content may be structured as identity or personal information, personal favorites, background, opinions, personal pictures, or dating application and social media IDs/links. Take the embodiment described in the Section I in which all devices connected to the nightclub Wi-Fi may share their dating profile information to the nightclub subnet profile. The embodiment illustrated in Section III or social networking embodiment generated based on Phone or zip code identification also may be used as a dating application.

Second, to use present embodiment as an advertisement platform, content may be structured as product description, product listing website, referral link, coupons, offers, or discounts. Take the embodiment described in Section II in which all devices connected to the group profile XY may share their product information with the product group profile. The embodiment illustrated in the Sections II and II or the social networking embodiment generated based on the Phone number or zip code identification also may be used as an Ad platform.

Third, to use present embodiment as a product review or customer service platform content may be structured as product review, feedback, picture, place of purchase, photos, suggestions, recommendations, and videos about their item or how to use tutorials and videos on the product. Take the embodiment described in Section II. All devices connected to the group profile XY may share their reviews, how to use tutorials, and video content on product XY. Take the embodiment described in Section I in which all devices connected to the nightclub Wi-Fi may share their review, feedback, and picture of their orders to the nightclub subnet profile. Take the embodiment described in Section III in which all devices in a flagged coordinate's RI group profile in a restaurant will share the interface for a game in which all may participate.

Fourth, to use present embodiment as collaborative content creation or crowdsourcing platform when content is a task, or a small part of projects collaboratively completed by various profile owners. For example, the project may be a document, report, research, drawing, brainstorming, essay, computer codes, or movie script. Take the embodiment described in Section I. All devices connected to the university's public Wi-Fi network may see a survey to collect information about specific research topics like cancer.

Fifth, to use present embodiment as an entertainment platform with interactive games when content is designed and formatted as single or multiplayer games. For example, interfaces for popular word games, coloring challenges, crosswords, tic-tack-to, casino games, card games, puzzles, memory matching, or chess may be inserted in profiles for profile owners to play. Games may be more complex, interactive, and real-time, like first-person shooting, mystery-solving, or finding pieces challenges. Take the embodiment described in Section I in which all devices connected to the nightclub Wi-Fi will see a puzzle, crossword, or multiplayer first-person shooting interface inside a nightclub subnet profile. Because all are authorized to access the subnet profile, all may participate in that game. Take the embodiment described in Section III in which all devices in a flagged coordinate's R1 group profile in a public park will share the interface for a game in which all may participate. The social networking platform generated based on Phone or zip code identification also may be used as an entertainment application.

Sixth, to use present embodiment as a recruiting platform when content is about exchanging identity, professional favorites, professional background, opinions, personal pictures, or dating app and social media profile ID and links. Take the embodiment described in Section I in which all devices connected to the conference Wi-Fi share their professional profile information to the conference subnet profile.

Content filtering and structuring may be done by providing an appropriate user interface and possibly a validation function to ensure the content is in a specific format. The validation function may be applied to multimedia data, including images, videos, audio, or texts, to ensure the content is qualified to be augmented to the profile. The validation function may filter content and remove some content with particular characteristics like adult, inappropriate, violent content, or any content that violates the embodiment's user policy and agreements. A combination of generated social networking embodiments may be used for a specific purpose.

V. Other Social Networking Platform Configurations

Social networking platforms may be generated based on other types of standardized hierarchical identification with the same methodology, and different ownership verification events may be defined for these embodiments. For example, a phone number is a standardized hierarchical identification and may be used to generate a social networking platform with the same protocols. The phone number also has XYZ structure with X as the area code, so all phone numbers with specific area codes may access X group profiles, and each number has a profile for the phone number assigned to the phone. In addition to using phone number ownership, we may define other ownership exchange events for different purposes such as receiving spam calls from a number sending or receiving a text or making or receiving a call to or from a particular number.

Another example is using zip code to generate social networking embodiments. A zip code number is a standardized hierarchical identification and may be used to generate a social networking embodiment with the same protocols. The zip code also has a WXYZ structure. For example, W is the delivery zone, X is the delivery section, Y is the sector, and Z is the segment. Therefore, zip code numbers with the same value for W may access W, WX, and WXY group profiles, and each zip code ID has a profile. Different ownership exchange events may be considered for this embodiment, for example, scanning the letter barcodes or package delivery barcodes, a shipment or property purchasing or renting transaction for properties with a particular zip code at the point of sale, or financial transaction processing institute and property registration operation.

Another example is using digital assets' standardized hierarchical IDs to generate social networking embodiments. A digital asset including crypto assets, non-fungible assets (NFTs) or media files may be identified by standardized hierarchical IDs. These IDs may be used to generate a social networking embodiment with the same protocols described in the present embodiment. The identification may also be generated by an identification generator such as an agency or organization, or hardware and/or software to generate the unique, distinguishable standardized hierarchical identifications. Different ownership exchange events may be considered for this embodiment, for example, scanning the digital asset barcode, transferring the digital asset, digital asset purchasing transaction for a particular asset with a particular ID at the point of sale, or financial transaction processing institute or digital asset registration.

VI. Computer System

Figure 35:
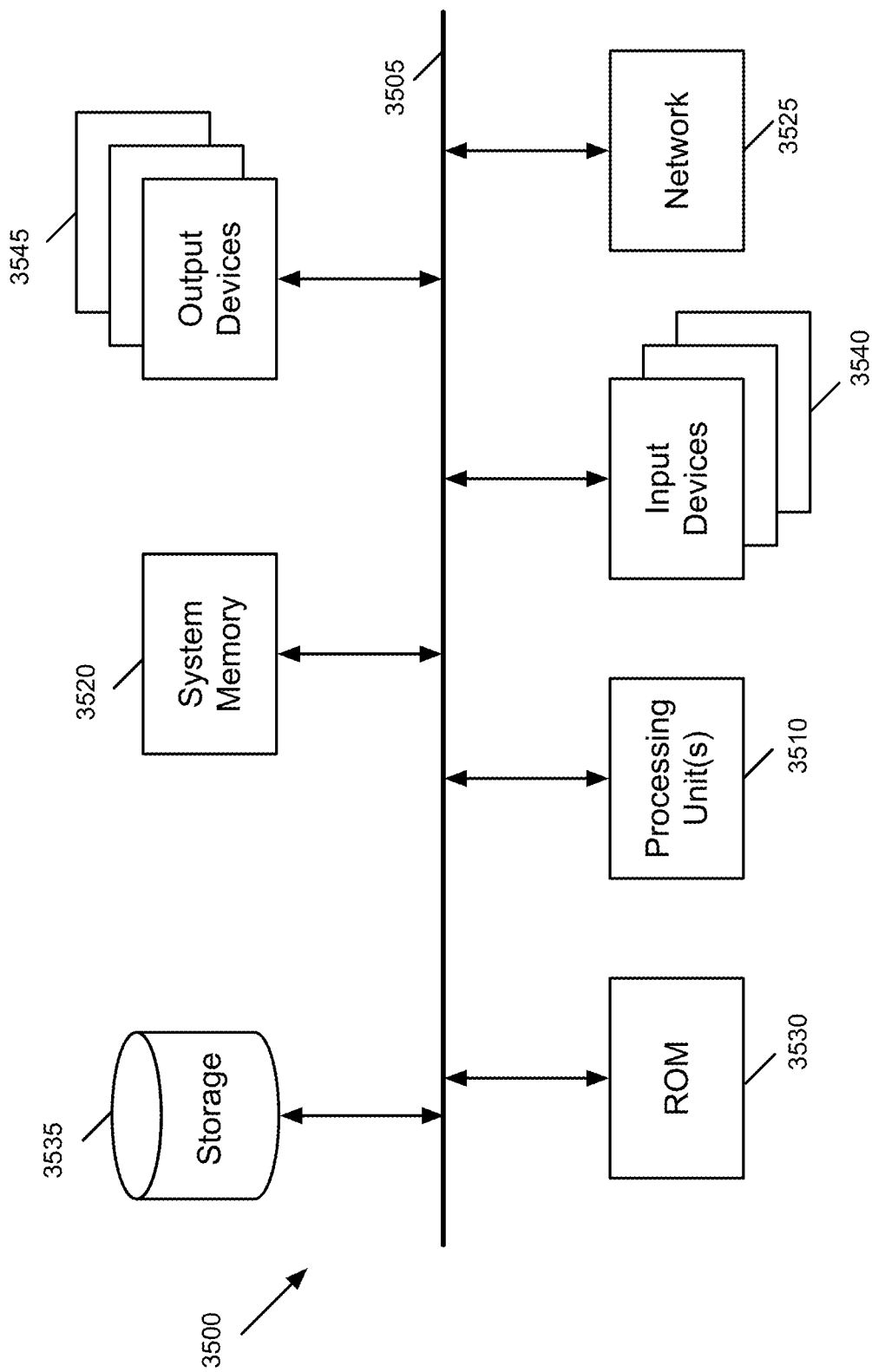
FIG. 35 is a functional block diagram illustrating an example electronic system, according to various aspects of the present disclosure.

FIG. 35 is a functional block diagram illustrating an example electronic system 3500, according to various aspects of the present disclosure. With reference to FIG. 35, some present embodiments, such as for example, and without limitations, the wave tag manager 100, the wave tag requesting device 155, the broadcasting device 158, the wave tag reader/capture device 140, the mobile devices, the servers, the computers, etc., described above, may be implemented using the electronic system 3500. The electronic system 3500 may be used to execute any of the processes, methods, controls, or operating system applications described above. The electronic system 3500 may be a computer (e.g., a desktop computer, laptop computer, a personal computer, a tablet computer, a server computer, a mainframe, a blade computer, etc.), a phone (e.g., a smartphone), a personal digital assistant (PDA), or any other sort of electronic device. Such an electronic system may include various types of computer-readable media and interfaces for various other types of computer readable media. The electronic system 3500 may include a bus 3505, processing unit(s) 3510, a system memory 3520, a read-only memory (ROM) 3530, a permanent storage device 3535, input devices 3540, and output devices 3545.

The bus 3505 may collectively represent all system, peripheral, and chipset buses that communicatively connect the numerous internal devices of the electronic system 3500. For example, the bus 3505 may communicatively connect the processing unit(s) 3510 with the read-only memory 3530, the system memory 3520, and the permanent storage device 3535.

From these various memory units, the processing unit(s) 3510 may retrieve instructions to execute and data to process in order to execute the processes of the present embodiments. The processing unit(s) may be a single processor or a multi-core processor in different embodiments.

The read-only-memory 3530 may store static data and instructions that are needed by the processing unit(s) 3510 and other modules of the electronic system. The permanent storage device 3535, on the other hand, may be a read-and-write memory device. This device is a non-volatile memory unit that may store instructions and data even when the electronic system 3500 is off. Some present embodiments may use a mass-storage device (such as a magnetic or optical disk and its corresponding disk drive) as the permanent storage device 3535.

Other embodiments may use a removable storage device (such as a floppy disk, flash drive, etc.) as the permanent storage device. Like the permanent storage device 3535, the system memory 3520 may be a read-and-write memory device. However, unlike storage device 3535, the system memory may be a volatile read-and-write memory, such as random access memory. The system memory may store some of the instructions and data that the processor needs at runtime. In some embodiments, the processes may be stored in the system memory 3520, the permanent storage device 3535, and/or the read-only memory 3530. From these various memory units, the processing unit(s) 3510 may retrieve instructions to execute and data to process in order to execute the processes of some embodiments.

The bus 3505 may also connect to the input and output devices 3540 and 3545. The input devices may enable the user to communicate information and select commands to the electronic system. The input devices 3540 may include alphanumeric keyboards and pointing devices (also called "cursor control devices"). The output devices 3545 may display images generated by the electronic system. The output devices may include printers and display devices, such as cathode ray tubes (CRT) or liquid crystal displays (LCD). Some embodiments may include devices such as a touchscreen that function as both input and output devices.

Finally, as shown in FIG. 35, the bus 3505 may also couple the electronic system 3500 to a network 3525 through a network adapter (not shown). In this manner, the computer may be a part of a network of computers (such as a local area network ("LAN"), a wide area network ("WAN"), an Intranet, or a network of networks, such as the Internet. Any or all components of the electronic system 3500 may be used in conjunction with the present embodiments.

Some embodiments may include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments may be performed by one or more integrated circuits, such as application specific integrated circuits (ASICs) or field programmable gate arrays (FPGAs). In some embodiments, such integrated circuits may execute instructions that are stored on the circuit itself. Some of the present embodiments may include flexible circuit, also rereferred to as flexible printed circuit boards (PCBs). The flexible circuits may provide dynamic flexing and increased heat dissipation and may be used in the embodiments that require circuits with smaller footprint, increased package density, more tolerance to vibrations, and/or less weight.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, non-transitory, physical objects that store information in a form that is readable by a computer. These terms exclude any wireless signals or wired download.

What is claimed is:

1. A method of accessing and managing content in a network based on unique standardized hierarchical identifications of products, the method comprising:
   receiving a notification that a first electronic device has completed an ownership event associated with a first product, the first product comprising a first unique standardized hierarchical identification in a plurality of unique standardized hierarchical identifications, each unique standardized hierarchical identification comprising a plurality of hierarchical sections, each hierarchical section identifying a subsection in a plurality of hierarchical subsections of the network;
   assigning a first plurality of temporarily owned profiles to the first electronic device to access and manage content in the network, wherein each profile in the first plurality of temporarily owned profiles is associated with one hierarchical section in the plurality of hierarchical sections of the first product, wherein a temporarily owned profile associated with a lowest level in the first unique standardized hierarchical identification is associated with an item identification of the first product, wherein each profile associated with a hierarchical level of the first unique standardized hierarchical identification other than the lowest hierarchical level is associated with a hierarchical subsection of the network;
   at a display of the first electronic device, displaying hierarchical identifications of a plurality of profiles assigned to a plurality of electronic devices other than the first electronic device, each electronic device in the plurality of electronic devices associated with a product with a hierarchical identification comprising at least one hierarchical section common with a hierarchical section of the hierarchical identification of the first product;
   receiving a set of one or more requests from the first electronic device to make content in the first plurality of temporarily owned profile visible to a first subset of electronic devices in the plurality of electronic devices and invisible to a second subset of electronic devices in the plurality of electronic devices; and
   making the content in the first plurality of temporarily owned profile visible to the first subset of electronic devices and invisible to the second subset of electronic devices in response to the receiving the set of one or more requests from the first electronic device.

2. The method of claim 1, wherein the ownership event associated with the first product comprises one of a purchasing transaction of the first product completed by the first electronic device, a rental transaction of the first product completed by the first electronic device, and scanning of a bar code on the first product by the first electronic device.

3. The method of claim 1, wherein a first temporarily owned profile in the first plurality of temporarily owned profiles assigned to the first electronic device comprises a customized content added to the first temporarily owned profile by a previous temporary owner of the first temporarily owned profile, wherein the previous temporary owner of the first temporarily owned profile is not associated with the first electronic device, the method further comprising:
   receiving a customized content from the first electronic device to add to the first temporarily owned profile;
   determining whether the first electronic device is authorized to append the customized content to the first temporarily owned profile; and
   appending the customized content to the first temporarily owned profile in response to determining that the first electronic device is authorized to append the customized content to the first temporarily owned profile.

4. The method of claim 1, wherein a first profile associated with a hierarchical level of the first unique standardized hierarchical identification other than the lowest hierarchical level is associated with an organization identification of the first product, the method further comprising:
   providing one or more group nature features comprising one of a chatroom and a forum for the first profile; and
   providing one or more individual nature features comprising one of a profile page, a profile picture, a profile setting, and a bio description for the temporarily owned profile associated with the lowest level in the first unique standardized hierarchical identification.

5. The method of claim 4, wherein a second profile associated with a hierarchical level of the first unique standardized hierarchical identification other than the lowest hierarchical level is associated with a product identification of the first product, the method further comprising:
   providing one or more group nature features comprising one of a chatroom and a forum for the second profile.

6. The method of claim 1, wherein the unique standardized hierarchical identifications comprise Internet Protocol (IP) addresses.

7. The method of claim 1 further comprising:
receiving a notification that a second electronic device has completed an ownership event associated with the first product;
unassigning the first plurality of temporarily owned profiles from the first electronic device; and
assigning the first plurality of temporarily owned profiles to the second electronic device.

8. The method of claim 1 further comprising:
connecting the first electronic device to a social media account associated with the first electronic device; and
adding content from the social media account associated with the first electronic device to a temporality owned profile in the first plurality of temporality owned profiles assigned to the first electronic device.

9. The method of claim 1 further comprising:
connecting the first electronic device to a third-party application associated with the first electronic device; and
adding content from the third-party application associated with the first electronic device to a temporality owned profile in the first plurality of temporality owned profiles assigned to the first electronic device.

10. The method of claim 1, wherein the set of one or more requests is a first set of one or more requests, the method further comprising:
receiving a second set of one or more requests from the first electronic device to make an identity of a person associated with the first electronic device visible to a third subset of electronic devices in the plurality of electronic devices and invisible to a fourth subset of electronic devices the plurality of electronic devices; and
making the identity of the person visible to the third subset of electronic devices and invisible to the fourth subset of electronic devices in response to the receiving the second set of one or more requests from the first electronic device.

11. A non-transitory computer readable medium storing a program for accessing and managing content in a network based on unique standardized hierarchical identifications of products, the program executable by at least one processor, the program comprising sets of instructions for:
receiving a notification that a first electronic device has completed an ownership event associated with a first product, the first product comprising a first unique standardized hierarchical identification in a plurality of unique standardized hierarchical identifications, each unique standardized hierarchical identification comprising a plurality of hierarchical sections, each hierarchical section identifying a subsection in a plurality of hierarchical subsections of the network;
assigning a first plurality of temporarily owned profiles to the first electronic device to access and manage content in the network, wherein each profile in the first plurality of temporarily owned profiles is associated with one hierarchical section in the plurality of hierarchical sections of the first product, wherein a temporarily owned profile associated with a lowest level in the first unique standardized hierarchical identification is associated with an item identification of the first product, wherein each profile associated with a hierarchical level of the first unique standardized hierarchical identification other than the lowest hierarchical level is associated with a hierarchical subsection of the network;
at a display of the first electronic device, displaying hierarchical identifications of a plurality of profiles assigned to a plurality of electronic devices other than the first electronic device, each electronic device in the plurality of electronic devices associated with a product with a hierarchical identification comprising at least one hierarchical section common with a hierarchical section of the hierarchical identification of the first product;
receiving a set of one or more requests from the first electronic device to make content in the first plurality of temporarily owned profile visible to a first subset of electronic devices in the plurality of electronic devices and invisible to a second subset of electronic devices in the plurality of electronic devices; and
making the content in the first plurality of temporarily owned profile visible to the first subset of electronic devices and invisible to the second subset of electronic devices in response to the receiving the set of one or more requests from the first electronic device.

12. The non-transitory computer readable medium of claim 11, wherein the ownership event associated with the first product comprises one of a purchasing transaction of the first product completed by the first electronic device, a rental transaction of the first product completed by the first electronic device, and scanning of a bar code on the first product by the first electronic device.

13. The non-transitory computer readable medium of claim 11, wherein a first temporarily owned profile in the first plurality of temporarily owned profiles assigned to the first electronic device comprises a customized content added to the first temporarily owned profile by a previous temporary owner of the first temporarily owned profile, wherein the previous temporary owner of the first temporarily owned profile is not associated with the first electronic device, the program further comprising sets of instructions for:
receiving a customized content from the first electronic device to add to the first temporarily owned profile;
determining whether the first electronic device is authorized to append the customized content to the first temporarily owned profile; and
appending the customized content to the first temporarily owned profile in response to determining that the first electronic device is authorized to append the customized content to the first temporarily owned profile.

14. The non-transitory computer readable medium of claim 11, wherein a first profile associated with a hierarchical level of the first unique standardized hierarchical identification other than the lowest hierarchical level is associated with an organization identification of the first product, the program further comprising sets of instructions for:
providing one or more group nature features comprising one of a chatroom and a forum for the first profile; and
providing one or more individual nature features comprising one of a profile page, a profile picture, a profile setting, and a bio description for the temporarily owned profile associated with the lowest level in the first unique standardized hierarchical identification.

15. The non-transitory computer readable medium of claim 14, wherein a second profile associated with a hierarchical level of the first unique standardized hierarchical identification other than the lowest hierarchical level is associated with a product identification of the first product, the program further comprising a set of instructions for:

providing one or more group nature features comprising one of a chatroom and a forum for the second profile.

16. The non-transitory computer readable medium of claim 11, wherein the unique standardized hierarchical identifications comprise Internet Protocol (IP) addresses.

17. The non-transitory computer readable medium of claim 11, the program further comprising sets of instructions for:
- receiving a notification that a second electronic device has completed an ownership event associated with the first product;
- unassigning the first plurality of temporarily owned profiles from the first electronic device; and
- assigning the first plurality of temporarily owned profiles to the second electronic device.

18. The non-transitory computer readable medium of claim 11, the program further comprising sets of instructions for:
- connecting the first electronic device to a social media account associated with the first electronic device; and
- adding content from the social media account associated with the first electronic device to a temporality owned profile in the first plurality of temporality owned profiles assigned to the first electronic device.

19. The non-transitory computer readable medium of claim 11, the program further comprising sets of instructions for:
- connecting the first electronic device to a third-party application associated with the first electronic device; and
- adding content from the third-party application associated with the first electronic device to a temporality owned profile in the first plurality of temporality owned profiles assigned to the first electronic device.

20. The non-transitory computer readable medium of claim 11, wherein the set of one or more requests is a first set of one or more requests, the program further comprising sets of instructions for:
- receiving a second set of one or more requests from the first electronic device to make an identity of a person associated with the first electronic device visible to a third subset of electronic devices in the plurality of electronic devices and invisible to a fourth subset of electronic devices the plurality of electronic devices; and
- making the identity of the person visible to the third subset of electronic devices and invisible to the fourth subset of electronic devices in response to the receiving the second set of one or more requests from the first electronic device.

* * * * *